US011503955B2

(12) United States Patent
Ebstein et al.

(10) Patent No.: US 11,503,955 B2
(45) Date of Patent: Nov. 22, 2022

(54) COFFEE GRINDING APPARATUS WITH PORTAFILTER HOLDER ASSEMBLY

(71) Applicant: WHIRLPOOL CORPORATION, Benton Harbor, MI (US)

(72) Inventors: Ryan Ebstein, St. Joseph, MI (US); Daniel F. Galea, St. Joseph, MI (US); Edward Haney, Baroda, MI (US); Neela Lohith Paruchuri, Grand Rapids, MI (US); Norma Richards, Benton Harbor, MI (US); Pravin R. Shewale, Pune (IN); ZhaoYi Yin, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 56 days.

(21) Appl. No.: 16/876,166

(22) Filed: May 18, 2020

(65) Prior Publication Data

US 2020/0275806 A1    Sep. 3, 2020

Related U.S. Application Data

(63) Continuation-in-part of application No. 16/674,687, filed on Nov. 5, 2019.
(Continued)

(51) Int. Cl.
*A47J 42/40* (2006.01)
*A47J 31/06* (2006.01)
(Continued)

(52) U.S. Cl.
CPC ........... *A47J 42/40* (2013.01); *A47J 31/0663* (2013.01); *A47J 31/404* (2013.01); *A47J 31/42* (2013.01); *A47J 31/446* (2013.01); *A47J 42/52* (2013.01)

(58) Field of Classification Search
CPC .. A47J 42/40; A47J 42/38; A47J 42/52; A47J 31/42; A47J 31/0663; A47J 31/0657
(Continued)

(56) References Cited

U.S. PATENT DOCUMENTS

| 344,269 A | * | 6/1886 | Gregory | ...................... 248/188.4 |
| 4,743,039 A | * | 5/1988 | Ellis | ........................ G10C 9/00 |
| | | | | 984/72 |

(Continued)

FOREIGN PATENT DOCUMENTS

| KR | 20180001820 U | 6/2018 |
| WO | 2012138327 A1 | 10/2012 |

OTHER PUBLICATIONS

European Extended Search Report for Application No. 21172358.0, dated Oct. 8, 2021.

*Primary Examiner* — Reginald Alexander
(74) *Attorney, Agent, or Firm* — Price Heneveld LLP

(57) ABSTRACT

A coffee grinding apparatus includes a removable holder assembly having first and second arms that are spaced-apart from one another to define an open receiving area therebetween. The arms each include upper and lower tabs that extend inwardly into the open receiving area first and second distances, respectively. The first and second distances of the upper and lower tabs are configured to retain and support portafilter assemblies of various sizes for filling with coffee grounds using the coffee grinder apparatus. Another holder assembly for use with the coffee grinding apparatus may include opposed abutment surfaces for engaging inner and outer surfaces of a cup portion of various sized portafilter assemblies. Each disclosed holder assembly is configured to attach to a pedestal portion of the coffee grinding apparatus in use, and can be stored in a support base of the coffee grinding apparatus when not in use.

10 Claims, 34 Drawing Sheets

Related U.S. Application Data

(60) Provisional application No. 62/757,318, filed on Nov. 8, 2018.

(51) Int. Cl.
*A47J 31/42* (2006.01)
*A47J 31/40* (2006.01)
*A47J 31/44* (2006.01)
*A47J 42/52* (2006.01)

(58) Field of Classification Search
USPC ............ 99/286, 302 R; 248/188.4, 512, 513, 248/521, 524
See application file for complete search history.

(56) References Cited

U.S. PATENT DOCUMENTS

| | | | |
|---|---|---|---|
| 6,253,662 B1 | 7/2001 | Zelson | |
| 6,631,878 B1 * | 10/2003 | Adam | F16M 7/00 248/188.4 |
| 6,874,739 B1 * | 4/2005 | Gregory | B66F 3/08 248/188.4 |
| 9,427,110 B2 | 8/2016 | Hoare et al. | |
| 2014/0123857 A1 | 5/2014 | Rego | |
| 2015/0136496 A1 | 5/2015 | Rego | |
| 2016/0296061 A1 | 10/2016 | Psarologos et al. | |

* cited by examiner

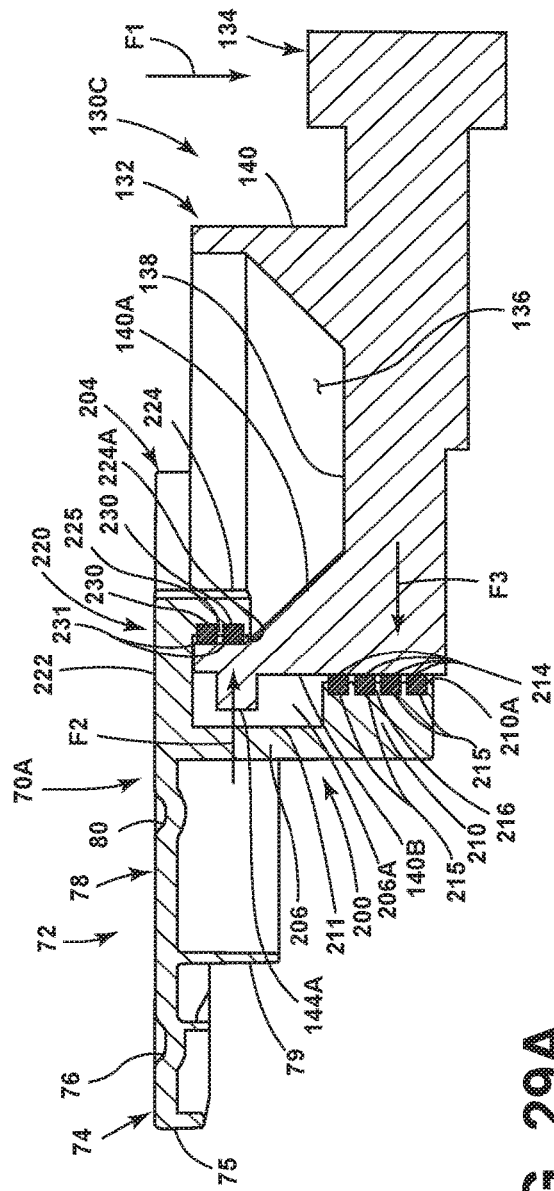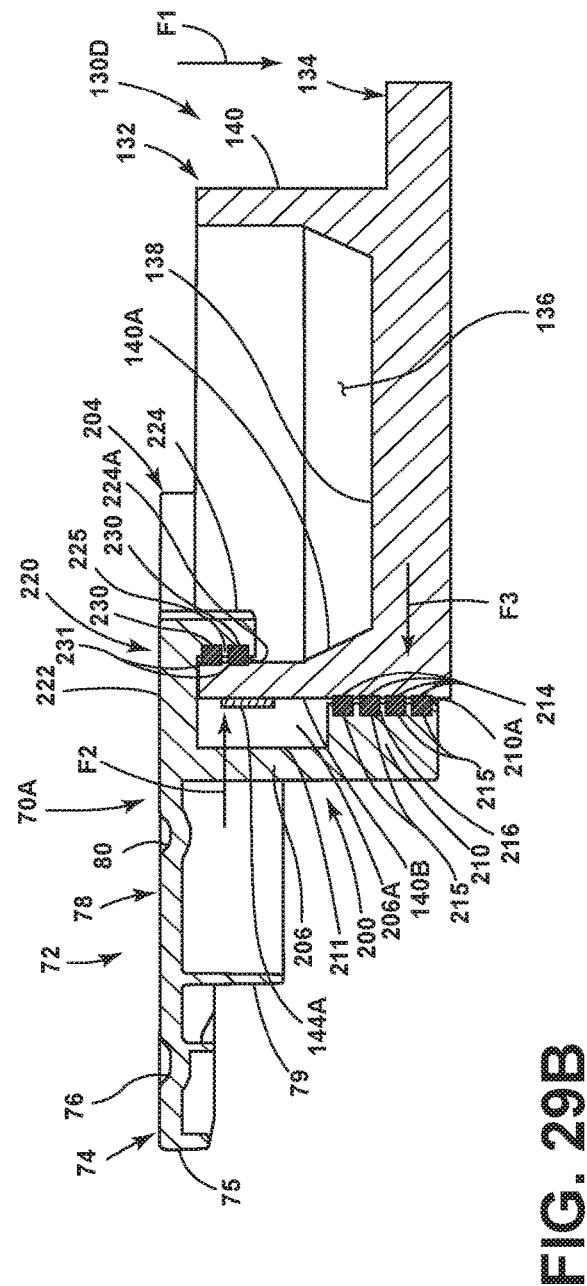

COFFEE GRINDING APPARATUS WITH PORTAFILTER HOLDER ASSEMBLY

CROSS-REFERENCE TO RELATED APPLICATION

This application is a continuation in part of U.S. patent application Ser. No. 16/674,687, filed on Nov. 5, 2019, entitled COFFEE GRINDING APPARATUS WITH PORTAFILTER HOLDER ASSEMBLY, which claims priority to and the benefit under 35 U.S.C. § 119(e) of U.S. Provisional Patent Application No. 62/757,318, filed on Nov. 8, 2018, entitled COFFEE GRINDING APPARATUS WITH PORTAFILTER HOLDER ASSEMBLY, the entire disclosure of which is hereby incorporated herein by reference.

BACKGROUND

The present concept generally related to a coffee grinding apparatus and, more particularly, to a coffee grinding apparatus having a holder assembly configured to retain various sized portafilter assemblies for receiving grounds from the coffee grinding apparatus.

SUMMARY

One aspect of the present concept includes a coffee grinding apparatus having a support base with a storage cavity and a removable cover assembly for selectively closing an opening to the storage cavity, wherein the removable cover assembly includes a support surface as positioned over the opening to the storage cavity. A pedestal portion extends upwardly from the support base and includes a first surface disposed adjacent to the support surface of the cover assembly. The first surface of the pedestal portion further includes an access aperture opening into an inwardly extending receiving hub. A motor housing is supported on and extends outwardly from the pedestal portion. A portion of the motor housing is disposed above and spaced-apart from the support surface of the cover assembly to define a receiving area therebetween. A holder assembly includes a stem and first and second arms spaced-apart from one another and outwardly extending from the stem to define a receiving area therebetween. Upper and lower tabs are disposed on the first arm and inwardly extend into the receiving area between the first and second arms. Upper and lower tabs are disposed on the second arm and inwardly extend into the receiving area between the first and second arms. The upper and lower tabs of the second arm are configured in an opposed manner relative to the upper and lower tabs of the first arm. The upper tab of the first arm is spaced-apart from the upper tab of the second arm a first distance, and the lower tab of the first arm is spaced-apart from the lower tab of the second arm a second distance that is different than the first distance.

Another aspect of the present concept includes a holder assembly having an outwardly extending stem. First and second arms are spaced-apart from one another and outwardly extend from a front portion of the stem to define an open receiving area between the first and second arms. The first and second arms each include opposed upper and lower tabs vertically spaced-apart from one another and extending inwardly into the open receiving area. The upper tab of the first arm is spaced-apart from the upper tab of the second arm a first distance. The lower tab of the first arm is spaced-apart from the lower tab of the second arm a second distance that is greater than the first distance.

Another aspect of the present concept includes a holder assembly for a coffee grinding apparatus, wherein the holder assembly includes a stem having front and rear portions with a first arm outwardly extending from the front portion of the stem. The first arm includes a sidewall having an inner surface with first and second tabs vertically spaced-apart from one another and inwardly extending from the outer surface of the sidewall of the first arm. A second arm outwardly extends from the front portion of the stem and includes a sidewall having an inner surface with first and second tabs vertically spaced-apart from one another and inwardly extending from the outer surface of the sidewall of the second arm. The first and second tabs of the second arm are configured in an opposed manner relative to the first and second tabs of the first arm to define a receiving area therebetween. The first and second tabs of the first arm and the first and second tabs of the second arm extend into the receiving area.

Another aspect of the present concept includes a coffee grinding apparatus having a support base with a storage cavity. A pedestal portion extends upwardly from the support base and includes a first surface with an access aperture opening into a receiving hub. A holder assembly includes a stem having front and rear portions and a head portion disposed on the front portion of the stem. The head portion includes a sidewall with upper and lower portions, wherein the sidewall is outwardly curved to define first and second arms spaced-apart from one another which further define a receiving area therebetween. The sidewall of the head portion includes a first abutment surface disposed on the lower portion of the sidewall. The holder assembly further includes a bracket having a first portion extending inwardly towards the receiving area, and a second portion extending downwardly from the first portion. The second portion of the bracket includes a second abutment surface disposed above the first abutment surface.

Another aspect of the present disclosure includes a holder assembly for a coffee grinding apparatus having a stem with front and rear portions and a head portion disposed on the front portion of the stem. The head portion includes a sidewall with upper and lower portions. The sidewall is outwardly curved and includes a first abutment surface disposed on the lower portion of the sidewall and facing a first direction. A bracket having includes a first portion extending outwardly from the upper portion of the sidewall and a second portion extending downwardly from the first portion. The second portion of the bracket includes a second abutment surface disposed above the first abutment surface. The second abutment surface is facing a second direction that is opposed to the first direction of the first abutment surface.

Another aspect of the present disclosure includes a holder assembly for a coffee grinding apparatus having a stem with front and rear portions and a bracket having a first portion extending outwardly from the front portion of the stem and a second portion extending downwardly from the first portion. The second portion of the bracket includes an inwardly facing abutment surface. A head portion is operably coupled to the stem and includes an upright sidewall with an outwardly facing abutment surface disposed on the sidewall.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 29A is a cross-sectional view of a portafilter assembly and the holder assembly of FIG. 21 engaged with one another;

FIG. 29B is a cross-sectional view of a portafilter assembly and the holder assembly of FIG. 21 engaged with one another;

DETAILED DESCRIPTION OF EMBODIMENTS

Figure 1:
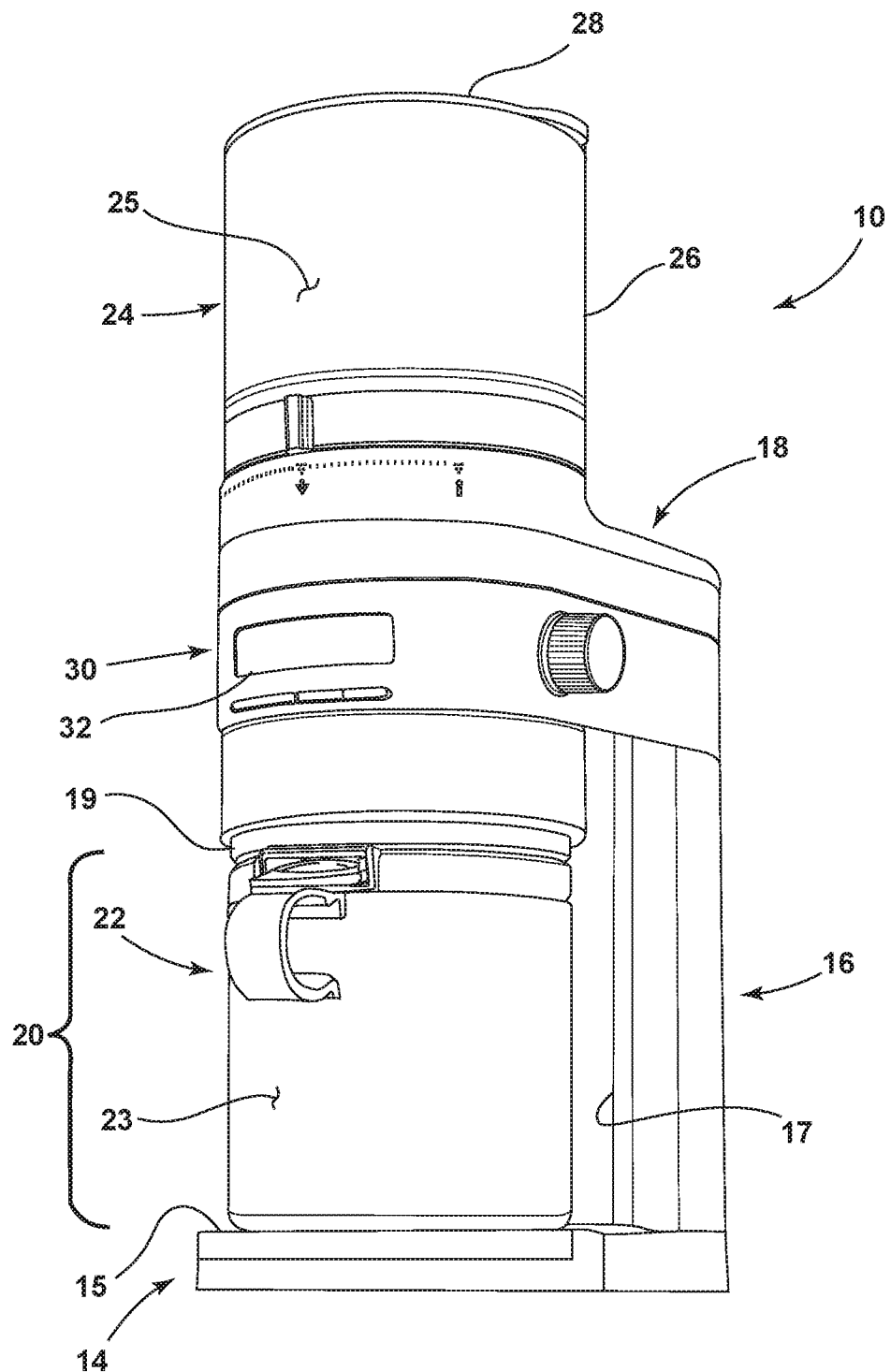
FIG. 1 is a front perspective view of a coffee grinding apparatus according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
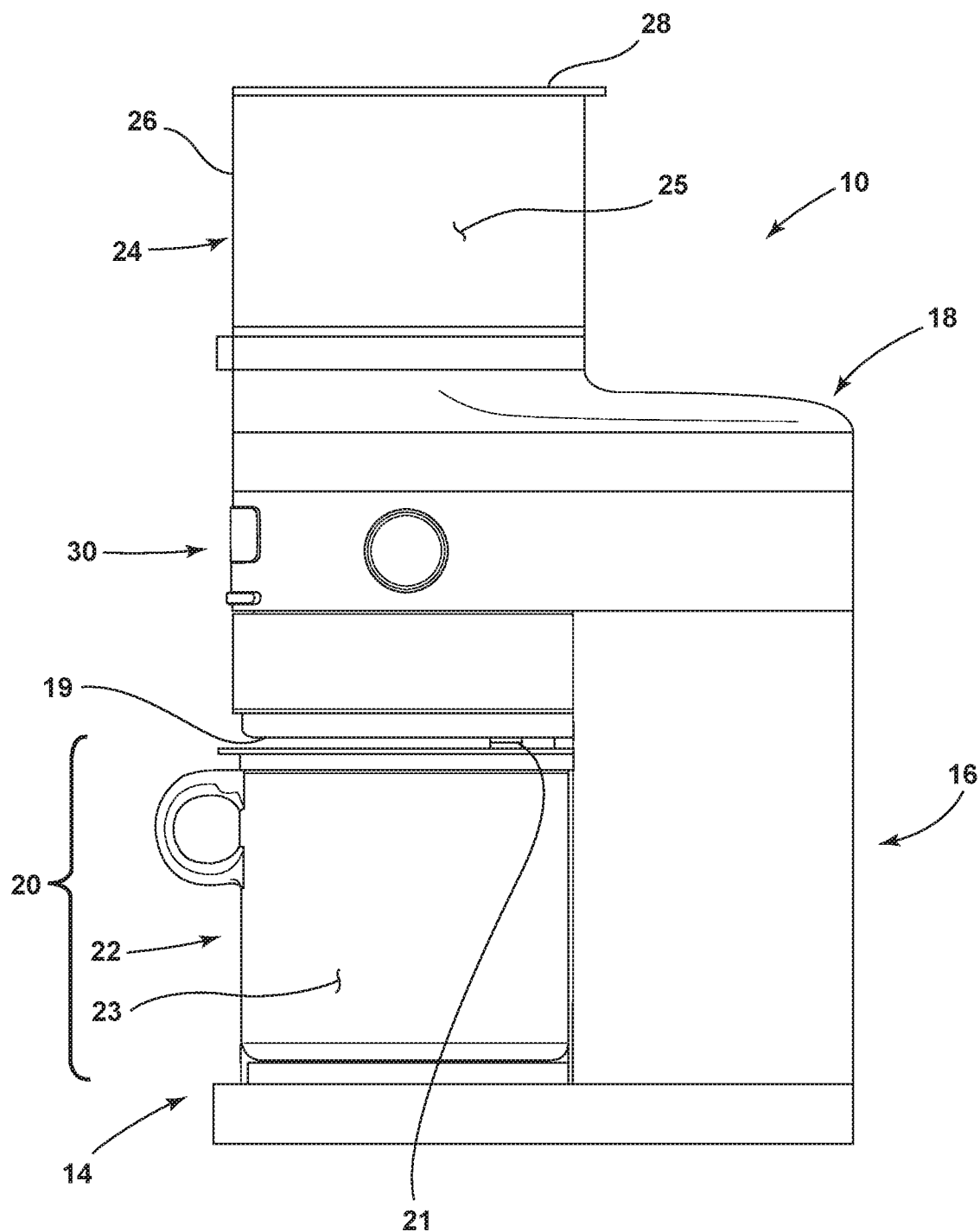
FIG. 2 is a side elevation view of the coffee grinding apparatus of FIG. 1.

Referring now to FIGS. 1-2, a coffee grinding apparatus 10 is shown having a body portion 12 which includes a support base 14, a pedestal portion 16 which extends upwardly from the support base 14, and a motor housing 18 which is supported by the pedestal portion 16 and extends over the support base 14 to define a receiving area 20 therebetween. Specifically, the receiving area 20 is defined by a support surface 15 of the support base 14, a first surface 17 of the pedestal portion 16, and a bottom surface 19 of the motor housing 18. The motor housing 18 is contemplated to house a motor which is further contemplated to power a grinder assembly which may also be housed in the motor housing 18. The grinder assembly is contemplated to be a burr grinder having burr grinding elements configured to grind coffee beans as powered by the motor. The coffee grinding apparatus 10 is also contemplated to include a power cord for plugging into a household receptacle for powering the coffee grinding apparatus 10.

As further shown in FIG. 1, the coffee grinding apparatus 10 includes a lower vessel or collection jar 22 having a vessel body which generally defines a cavity 23 for collecting ground coffee as ground and expelled by the grinder assembly through an outlet 21 (FIG. 2) disposed on the bottom surface 19 of the motor housing 18 during a grinding procedure. The collection jar 22 is configured to be laterally received in the receiving area 20. As noted above, the receiving area 20 is defined between the motor housing 18, and specifically the bottom surface 19 having outlet 21 thereof, the first surface 17 of the pedestal portion 16, and the support surface 15 of the support base 14 on which the collection jar 22 is removeably supported and received.

As further shown in FIG. 1, the coffee grinding apparatus 10 also includes a hopper 24 disposed on an upper portion of the motor housing 18. The hopper 24 includes a vessel body portion 26 which defines a cavity 25 configured to hold coffee beans for grinding by the coffee grinding apparatus 10. The hopper 24 further includes a lid 28 for closing the cavity 25 thereof.

As further shown in FIG. 1, the body portion 12 of the coffee grinding apparatus 10 also includes a user interface 30 disposed on a front portion of the motor housing 18 which may include a display screen 32 and a variety of buttons, knobs and other selection devices as further described below.

Figure 3:
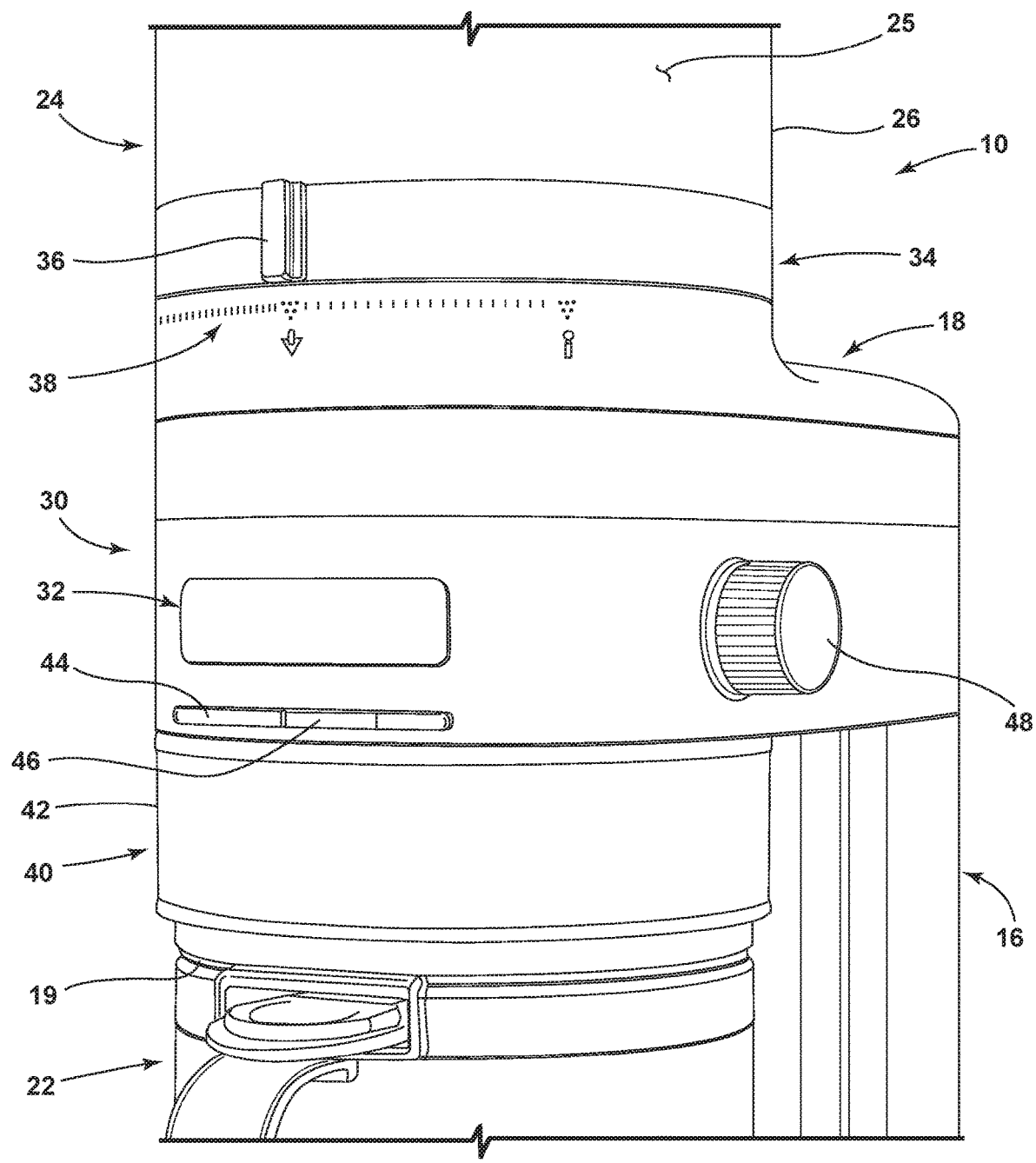
FIG. 3 is a fragmentary front perspective view of a middle portion of the coffee grinding apparatus of FIG. 1.

With reference to FIG. 3, the user interface 30 includes an upper rotary member 34 disposed on an upper portion of the motor housing 18 and having an outwardly extending handle 36 configured to be engaged by a user for rotating the upper rotary member 34. In use, the upper rotary member 34 is configured to select a grind setting which may be guided by markings 38 disposed on the motor housing 18 for a grind setting selection by a user. It is contemplated that rotation of the upper rotary member 34 provides for various settings between the burr grinding elements housed in the motor housing 18 to provide ground coffee suitable for various brewing techniques, such as French press, siphon, pour over, espresso, and other like settings. As further shown in FIG. 3, a lower rotary member 40 is disposed on a lower portion of the motor housing 18 and includes a textured band 42 configured to be engaged by a user for rotating the lower rotary member 40. In use, the lower rotary member 40 is configured to select a volume of ground coffee to be deposited into the collection jar 22. Selection of the volume of ground coffee may be guided by markings disposed on the motor housing 18. It is contemplated that rotation of the lower rotary member 40 provides for various run times of the grinder assembly to provide a specific volume of ground coffee suitable for various brewing techniques, such as French press, siphon, pour over, espresso, and other like settings.

With further reference to FIG. 3, button 44 may be used to select a preset grinding program and button 46 may be sued as a start/stop button for a grinding sequence. The user interface 30 further includes a rotary knob 48 that can be used to fine tune the amount of coffee grounds that are dispensed in a grinding procedure. Thus, a user can use the lower rotary member 40 as a macro adjustment of the amount of ground coffee to be dispensed in a grinding procedure. Further, a user can personalize the amount of ground coffee dispensed in a grinding procedure by using the rotary knob 48 to micro adjust the ground coffee amount setting. Select settings, or all settings selected by a user, can be displayed on the display screen 32 of the user interface 30.

Figure 4:
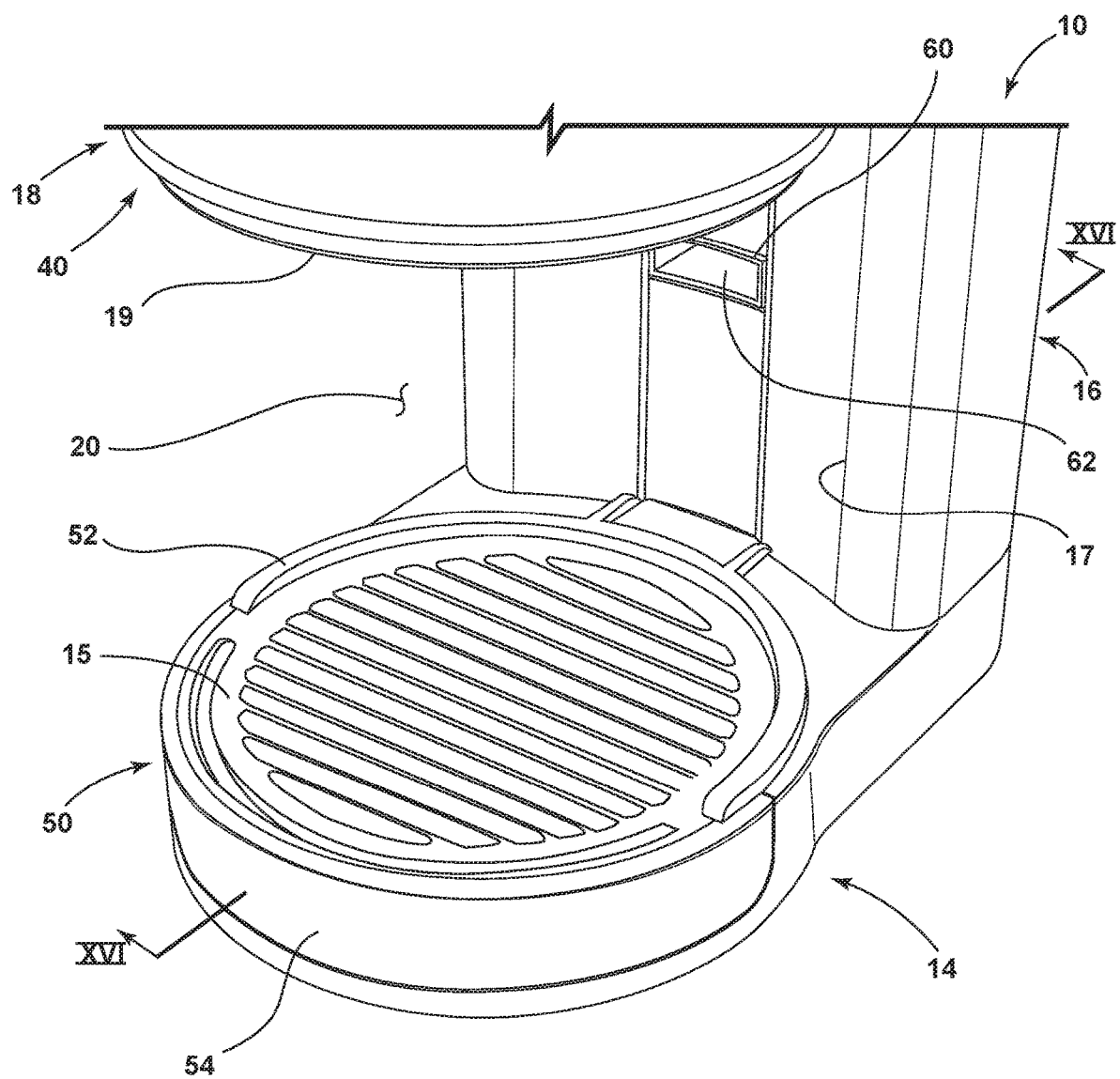
FIG. 4 is a fragmentary front perspective view of a support base of the coffee grinding apparatus of FIG. 1.

Referring now to FIG. 4, the coffee grinding apparatus 10 is shown with the collection jar 22 removed from the receiving area 20. With the collection jar 22 removed from the receiving area 20, the support surface 15 of the support base 14 is shown. Further, with the collection jar 22 removed from the receiving area 20, the first surface 17 of the pedestal portion 16 is also revealed. The support surface 15 is a substantially horizontal part of a cover assembly 50 that is removeably received on the support base 14 of the coffee grinding apparatus 10. The cover assembly 50 includes a rear rim 52 and a rounded front portion in the form of a front wall 54 with the support surface 15 disposed therebetween. In use, the rear rim 52 provides an abutment surface to abut the collection jar 22 as the collection jar 22 is laterally received in the receiving area 20. When the collection jar 22 is fully received in the receiving area 20 (having abutted the rear rim 52 of the cover assembly 50), the collection jar 22 is considered to be properly positioned for receiving ground coffee from the coffee grinding apparatus 10. As noted above, the cover assembly 50 is a removable member that selectively provides access to a storage cavity 160 (FIG. 16) disposed within the support base 14, as further described below. As shown on the first surface 17 of the pedestal portion 16 of the coffee grinding apparatus 10, an access aperture 60 opens into a receiving hub 62 which extends inwardly from the first surface 17 into an interior portion 162 (FIG. 16) of the pedestal portion 16. In the embodiment shown in FIG. 4, the access aperture 60 and receiving hub 62 are configured in a rectangular-shaped configuration, but may include any other configuration suitable for engaging a holder assembly, as further described below.

Figure 5A:
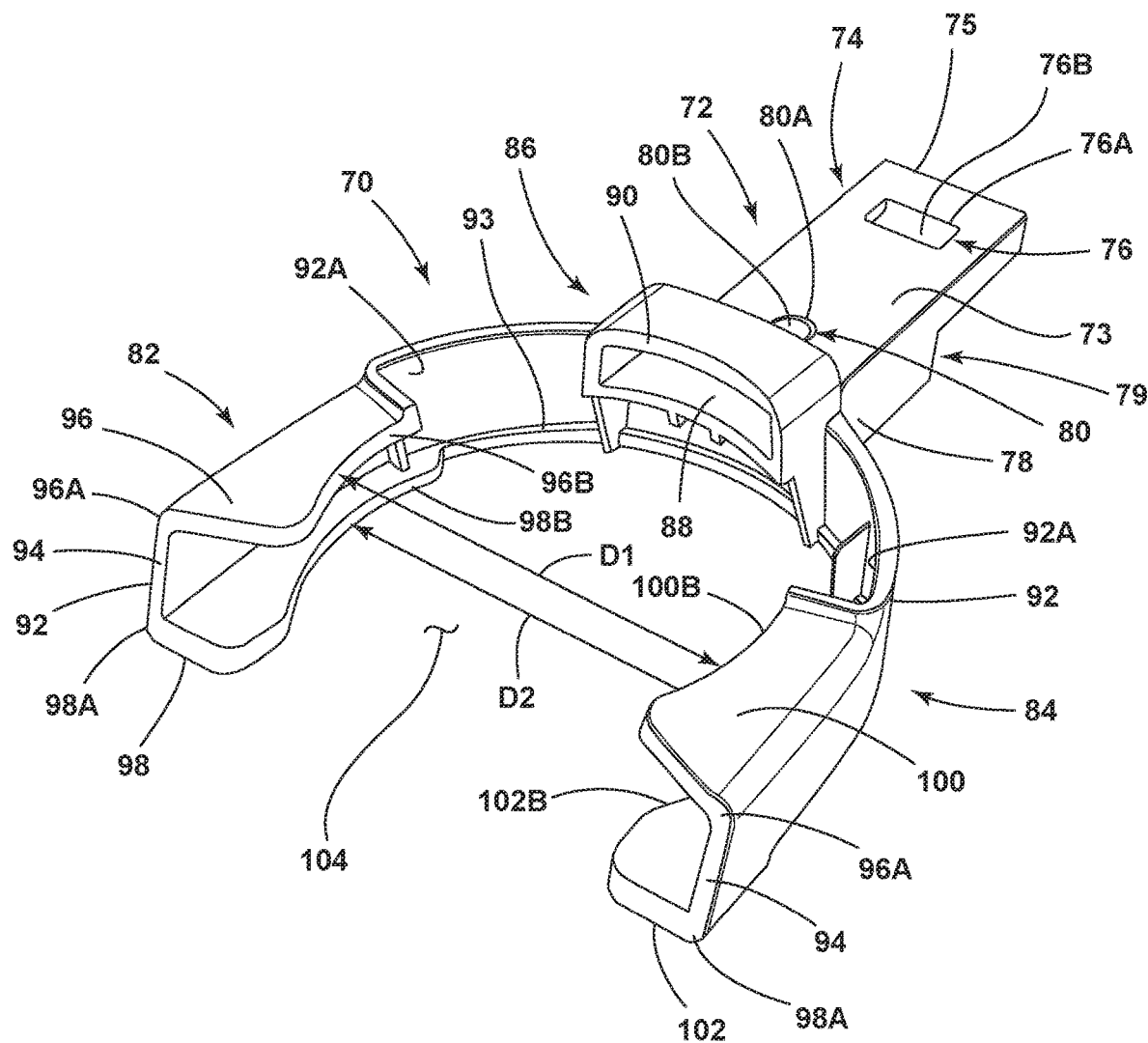
FIG. 5A is a top perspective view of a holder assembly.

Referring now to FIG. 5A, a holder assembly 70 according to an embodiment of the present concept is shown. The holder assembly 70 includes a stem 72 having an upper surface 73, a front portion 78, and a rear portion 74 disposed at a distal end 75 thereof. The rear portion 74 of the stem 72 of the holder assembly 70 is contemplated to be removeably received in the receiving hub 62 of the pedestal portion 16 of the coffee grinding apparatus 10. In the embodiment shown in FIG. 5A, the rear portion 74 of the stem 72 includes a first recess 76 disposed therein which inwardly extends from the upper surface 73 of the stem 72. In the embodiment shown in FIG. 5A, the first recess 76 is disposed adjacent to the distal end 75 of the stem 72 and includes a rectangular upper opening 76A with a curved bottom wall 76B. The first recess 76 is contemplated to receive a protruding detent feature positioned within the receiving hub 62 of the pedestal portion 16 of the coffee grinding apparatus 10, as further described below with reference to FIGS. 16 and 17. At the front portion 78 of the stem 72, a second recess 80 is shown inwardly extending from the upper surface 73 of the stem 72. In the embodiment shown in FIG. 5A, the second recess 80 is disposed adjacent to the front portion 78 of the stem 72 and includes a circular upper opening 80A with a rounded bottom wall 80B. In use, the second recess 80 is configured to receive a reciprocal detent feature that is disposed within the storage cavity 160 (FIG. 16) of the support base 14, as further described below. The front portion 78 of the stem 72 is separated from the rear portion 74 by a stepped configuration defining an abutment portion 79 positioned therebetween. In use, the abutment portion 79 is configured to abut the first surface 17 of the pedestal portion 16 when the rear portion 74 of the stem 72 is inserted into the receiving hub 62 of the pedestal portion 16.

As further shown in FIG. 5A, the holder assembly 70 further includes first and second arms 82, 84 which outwardly extend from the front portion 78 of the stem 72. The first and second arms 82, 84 are interconnected to one another and the stem 72 by a central portion 86 of the holder assembly 70. As shown in FIG. 5A, the central portion 86 of the holder assembly 70 includes a slot 88. In the embodiment shown in FIG. 5A, the slot 88 includes a generally rectangular-shaped opening 90. The first and second arms 82, 84 are generally mirror images of one another, such that like reference numerals may be used to describe features disposed on both the first and second arms 82, 84. As shown in FIG. 5A, the first and second arms 82, 84 each include a substantially upright sidewall 92 extending from the central portion 86 of the holder assembly 70 to a distal end 94 in an outwardly curved manner. The upright sidewall 92 includes a lower lip 93. With regards to first arm 82, upper and lower tabs 96, 98 inwardly extend from an outer surface 92A of the upright sidewall 92 at upper and lower portions 96A, 98A of the upright sidewall 92. Similarly, with regards to second arm 84, upper and lower tabs 100, 102 inwardly extend from the outer surface 92A of the upright sidewall 92 at upper and lower portions 96A, 98A of the upright sidewall 92. Specifically, as shown in FIG. 5A, the upper and lower tabs 96, 98 of the first arm 82 and the upper and lower tabs 100, 102 of the second arm 84 inwardly extend towards a central receiving area 104 defined between the first and second arms 82, 84. Thus, the upper and lower tabs 96, 98 of the first arm 82 and the upper and lower tabs 100, 102 of the second arm 84 inwardly extend towards one another as well. The upper and lower tabs 96, 98 of the first arm 82 and the upper and lower tabs 100, 102 of the second arm 84 are vertically spaced-apart from each other and are configured to hold various sized portafilter assemblies during a grinding procedure. The upper and lower tabs 96, 98 of the first arm 82 include curved innermost edges 96B, 98B that are configured to generally engage the sidewalls of a portafilter head, as further described below. Similarly, the upper and lower tabs 100, 102 of the second arm 84 also include curved innermost edges 100B, 102B that are configured to generally engage the sidewalls of a portafilter head, as further described below.

As specifically shown in FIG. 5A, the innermost edge 96B of the upper tab 96 of the first arm 82 is spaced-apart from the innermost edge 100B of the upper tab 100 of the second arm 84 by a distance D1. As further shown in FIG. 5A, the innermost edge 98B of the lower tab 98 of the first arm 82 is spaced-apart from the innermost edge 102B of the lower tab 102 of the second arm 84 by a distance D2. It is contemplated that the distance D2 between the innermost edges 98B, 102B of the lower tabs 98, 102 of the first and second arms 82, 84, respectively, is greater than the distance D1 between the innermost edges 96B, 100B of the upper tabs 96, 100 of the first and second arms 82, 84, respectively. The varying distances D1, D2 of the innermost edges 98B, 102B and 96B, 100B of the first and second arms 82, 84 provides for a holder assembly 70 that can accommodate portafilter assemblies having different sized heads. It is contemplated that the curved nature of the innermost edges 98B, 102B of the lower tabs 98, 102 of the first and second arms 82, 84 provides for a diameter therebetween of approximately 58 mm (as illustrated by reference numeral D1). It is contemplated that the curved nature of the innermost edges 96B, 100B of the upper tabs 96, 100 of the first and second arms 82, 84 provides for a diameter therebetween of approximately 54 mm (as illustrated by reference numeral D1). As such, it is contemplated that the distance D2 is greater than the distance D1, such that the upper tabs 96, 100 of the first and second arms 82, 84 inwardly extend further into the receiving area 104 as compared to the lower tabs 98, 102 of the first and second arms 82, 84. The approximate measurements noted above for the distances D1, D2 are exemplary only and longer/shorter distances are also contemplated for use with the present concept for accommodating various portafilter assemblies.

Figure 5B:
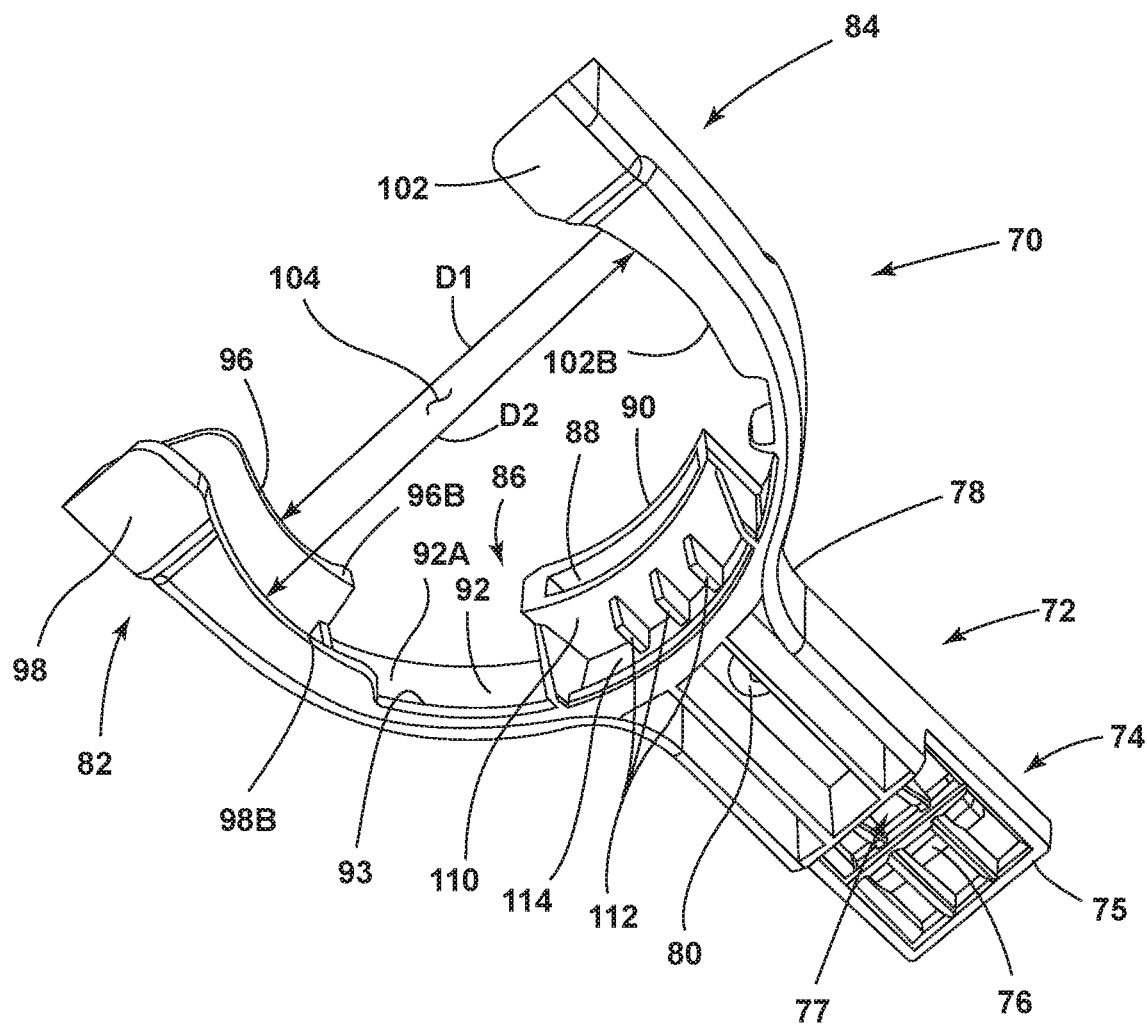
FIG. 5B is a bottom perspective view of the holder assembly of FIG. 5A.

Referring now to FIG. 5B, the holder assembly 70 is shown from a bottom view. As shown in FIG. 5B, the slot 88 of the central portion 86 of the holder assembly 70 includes a bottom surface 110 having a plurality of fins 112 extending downwardly therefrom. The fins 112 interconnect the bottom surface 110 of the slot 88 with the outer surface 92A of the sidewall 92. A spacing 114 is provided between the fins 112 and the lower lip 93 of the sidewall 92 as configured on the holder assembly 70. The spacing 114 is configured to receive an engagement feature of a portafilter assembly, as further described below. As further shown in FIG. 5B, a third recess 77 is positioned on the underside of the rear portion 74 of the stem 72 adjacent the first recess 76.

Figure 6:
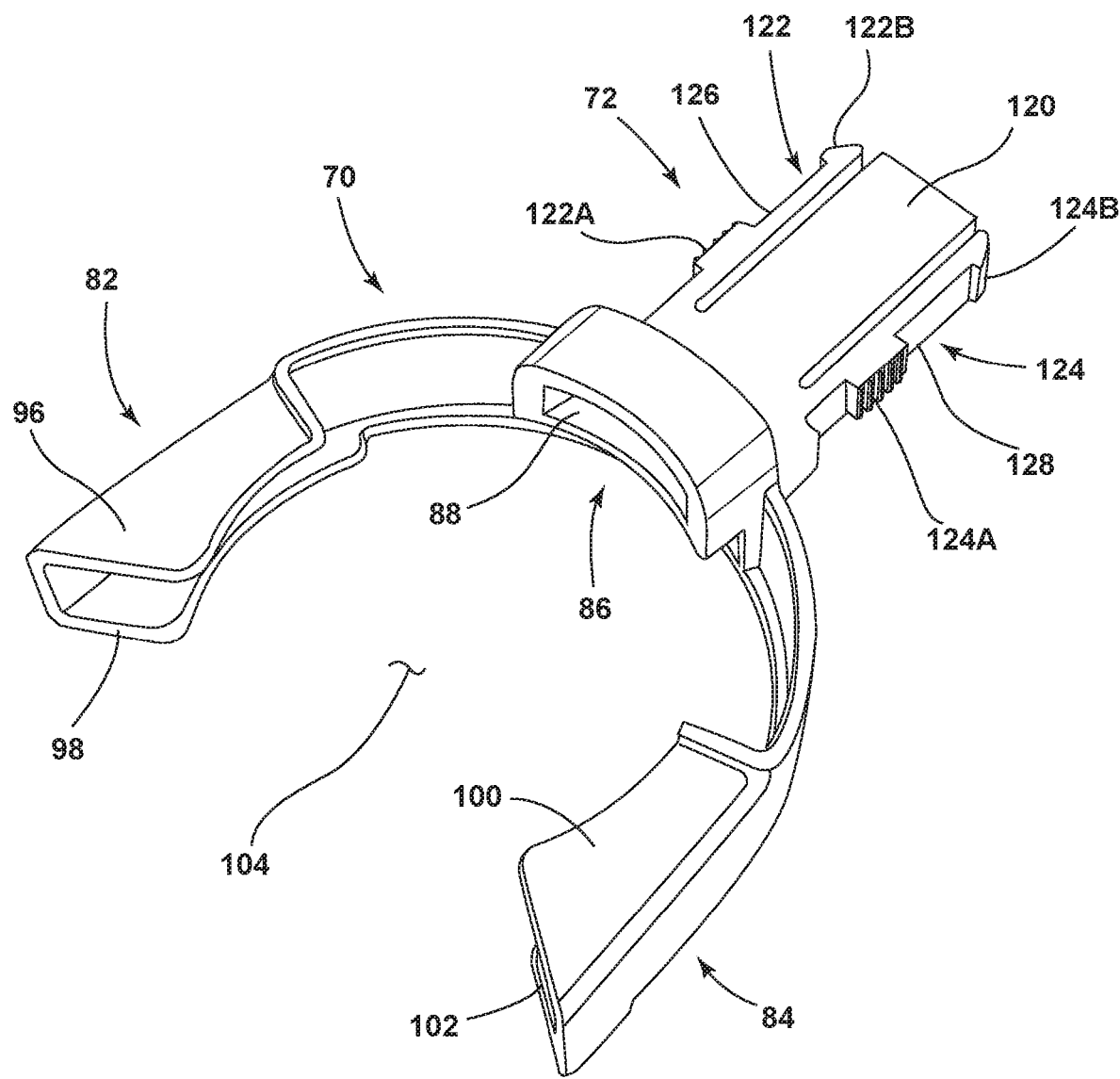
FIG. 6 is a top perspective view of a holder assembly according to another embodiment.

Referring now to FIG. 6, another embodiment of a holder assembly 70A is shown having several features which are shared features with holder assembly 70 described above. The holder assembly 70A may include similar reference numerals for features in common with holder assembly 70. In the embodiment shown in FIG. 6, the holder assembly 70A includes a stem 72A having a body portion 120 with first and second clip members 122, 124 disposed on opposite sides thereof. The first clip member 122 includes an engagement portion 122A and a barb 122B disposed on opposite ends of a body portion 126. Similarly, the second clip member 124 includes an engagement portion 124A and a barb 124B disposed on opposite ends of a body portion 128. In use, the first and second clip members 122, 124 are contemplated to have flexibly resilient body portions 126, 128, respectively, such that the first and second clip members 122, 124 can clip the holder assembly 70A into place on the pedestal portion 16 of the coffee grinding apparatus 10. As such, it is contemplated that the receiving hub 62 of the pedestal portion 16 of the coffee grinding apparatus 10 may include recesses on sidewalls thereof that are configured to receive the barbs 122B and 124B on opposite sides of the receiving hub 62. A user may engage the engagement portions 122A, 124A to inwardly flex the body portions 126, 128 of the first and second clip members 122, 124 to release the barbs 122B and 124B from the reciprocal engagement features disposed within the receiving hub 62.

Figure 7:
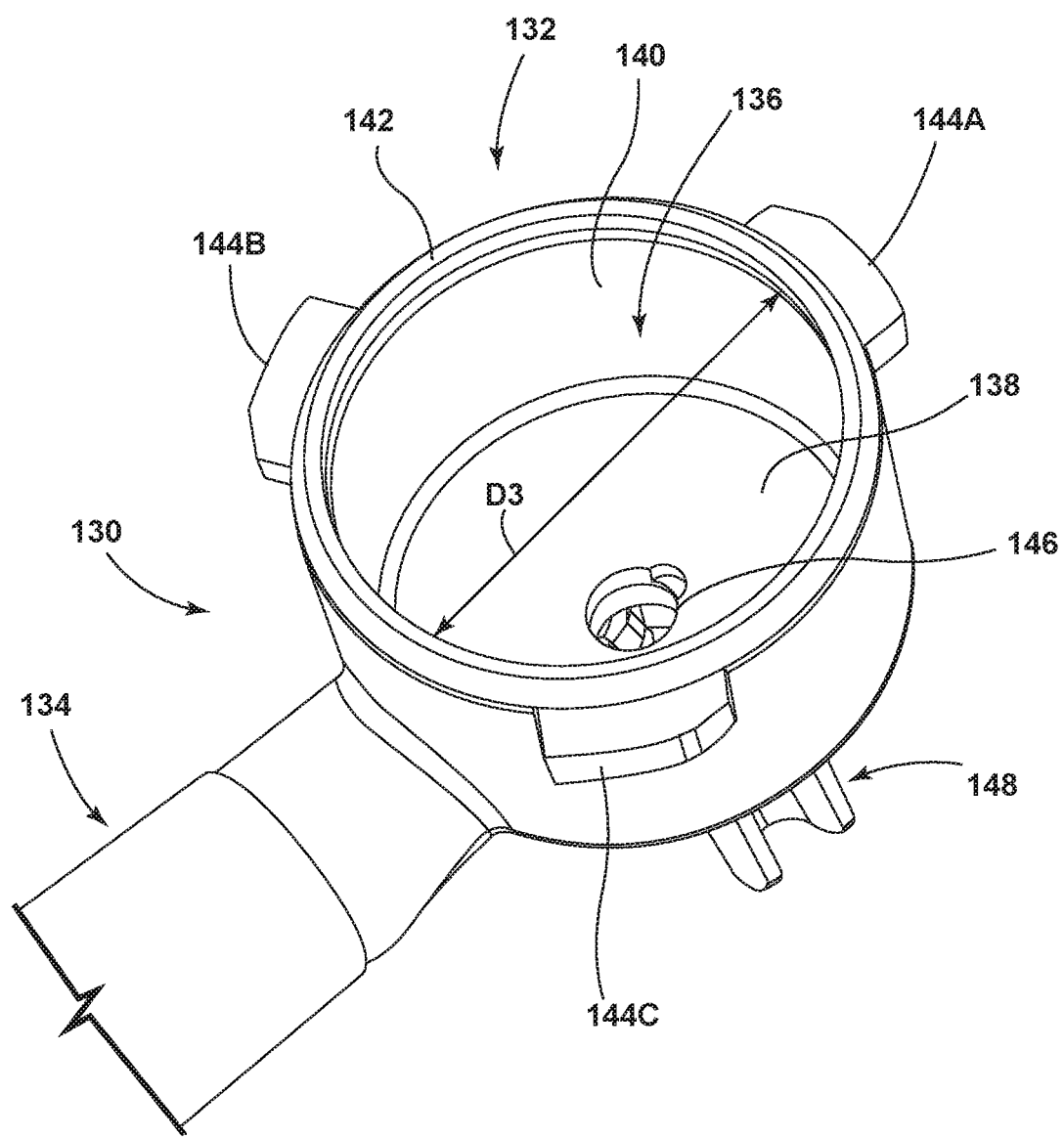
FIG. 7 is a fragmentary top perspective view of a portafilter assembly.

Referring now to FIG. 7, a portafilter assembly 130 is shown having a cup portion 132 and a handle portion 134. The cup portion 132 is contemplated to be a metal member having a compartment 136 that is defined by a bottom wall 138 having an upwardly extending sidewall 140 with inner and outer surfaces 140A, 140B, and an upper rim 142. In the embodiment shown in FIG. 7, the sidewall 140 of the cup portion 132 includes a diameter having a distance D3. Engagement features 144A, 144B, 144C are shown in the form of male bayonet features that outwardly extend from the upper rim 142 and are configured to couple the portafilter assembly 130 to a group head of a conventional espresso making machine. Different types and sizes of group heads can be accommodated by alteration of the engagement features 144A, 144B, 144C to suit any particular espresso machine. The compartment 136 is configured to receive ground coffee from the coffee grinding apparatus 10 for use in a coffee making procedure. An outlet 146 is shown positioned on the bottom wall 138 of the compartment 136 and generally leads to a spout 148 which is used to dispense brewed coffee into a vessel.

Figure 8:
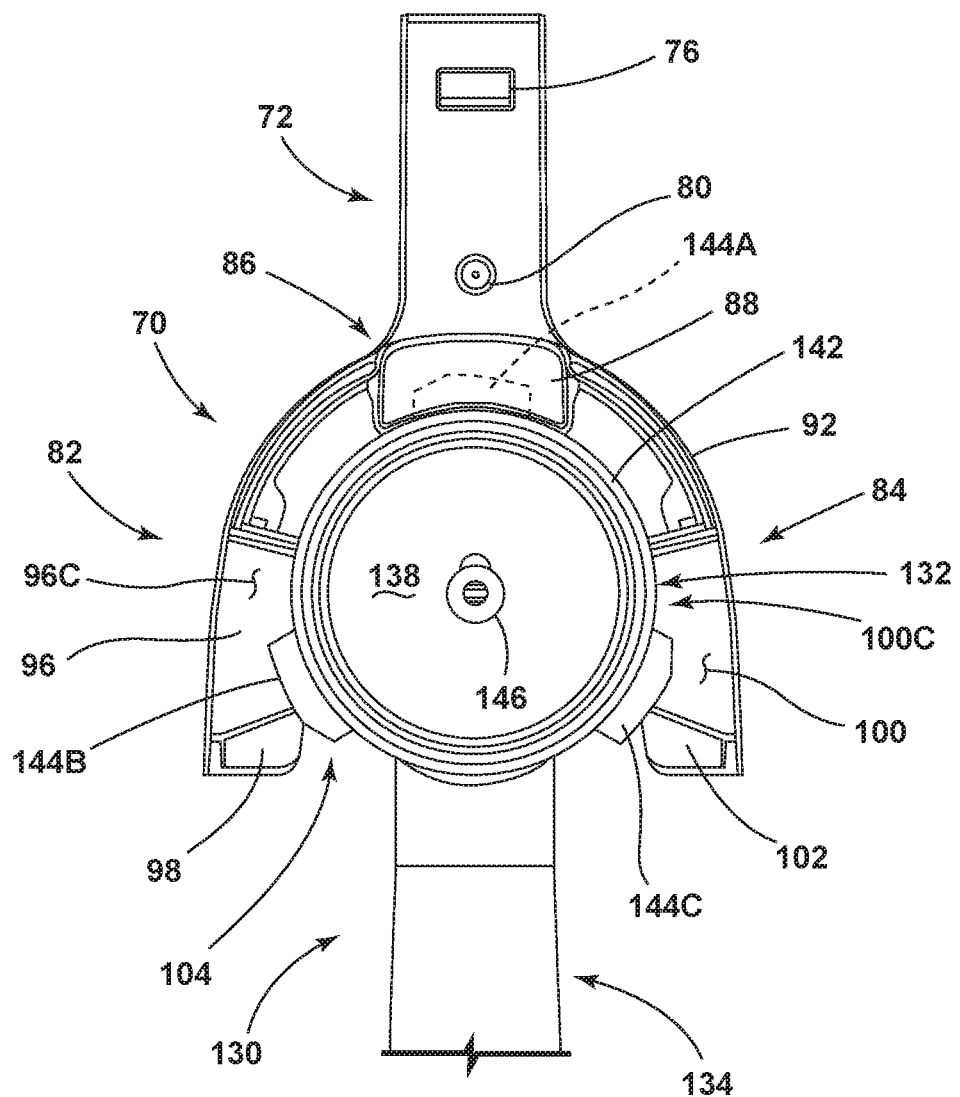
FIG. 8 is a fragmentary top plan view of the portafilter assembly of FIG. 7 as received in the holder assembly of FIG. 5A.

Referring now to FIG. 8, the portafilter assembly 130 is shown with the cup portion 132 thereof received in the receiving area 104 of the holder assembly 70. In the embodiment shown in FIG. 8, the outwardly extending engagement features 144B, 144C are positioned on upper surfaces 96C, 100C of the upper tabs 96, 100 of the first and second arms 82, 84, respectively. Engagement feature 144A is shown in phantom to indicate that the engagement feature 144A is received within the slot 88 disposed at the central portion 86 of the holder assembly 70. In this way, the cup portion 132 is fully received within the receiving area 104 of the holder assembly 70 as defined between the curved inner edges 96B, 100B of the upper tabs 96, 100 of the holder assembly 70. Thus, the circumference of the compartment 136 (having the diameter indicated at reference numeral D3) of the portafilter assembly 130 is sized to fit within the distance D1 provided between the curved inner edges 96B, 100B of the upper tabs 96, 100 of the holder assembly 70.

Figure 9:
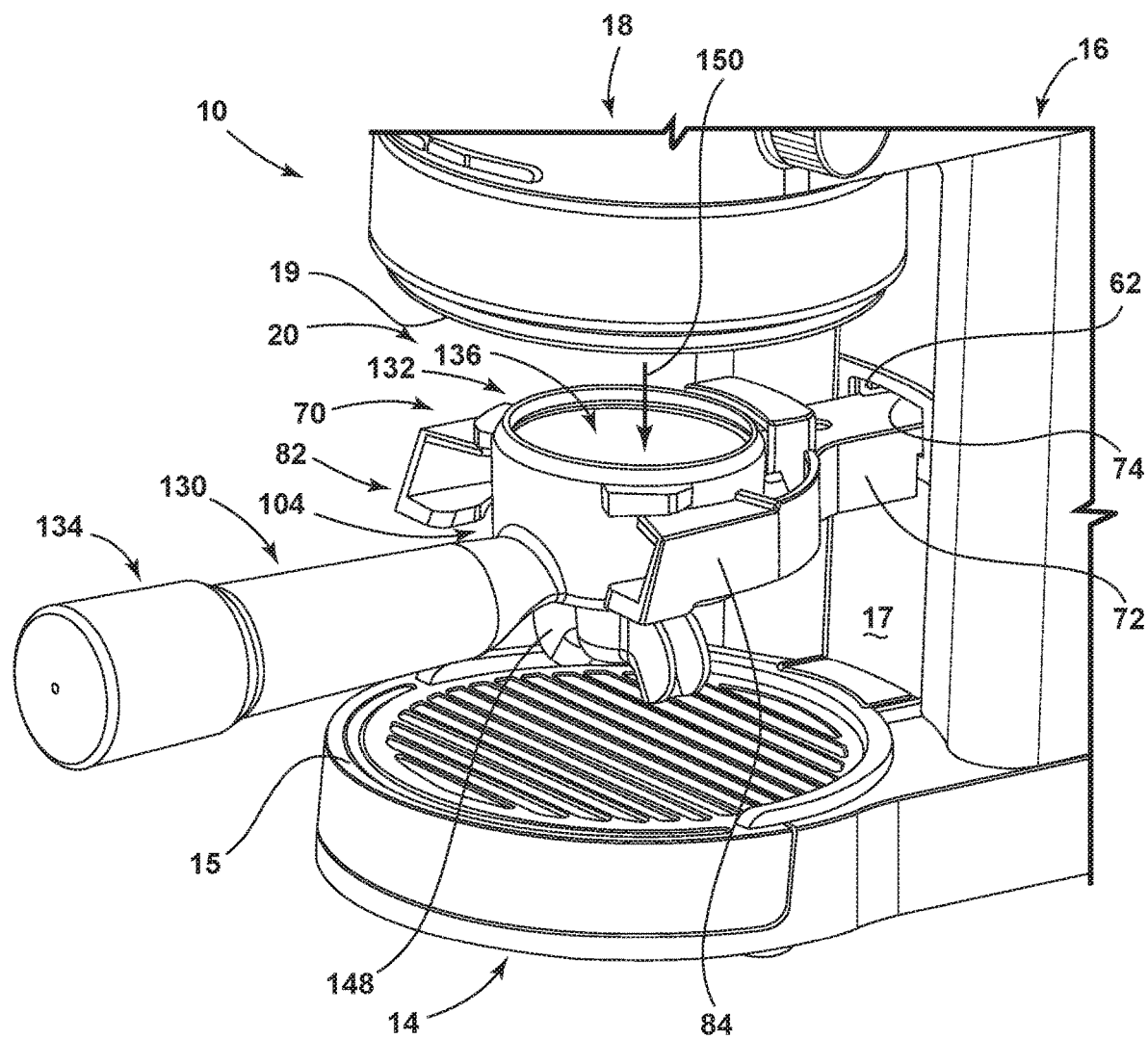
FIG. 9 is a fragmentary front perspective view of the portafilter assembly and holder assembly of FIG. 8 as received in the coffee grinding apparatus of FIG. 1.

Referring now to FIG. 9, the holder assembly 70 is shown coupled to the pedestal portion 16 of the coffee grinding apparatus 10. Specifically, the rear portion 74 of the stem 72 of the holder assembly 70 is shown inserted into receiving hub 62 disposed on the first surface 17 of the pedestal portion 16 of the coffee grinding apparatus 10. In this way, the holder assembly 70 extends outwardly from the first surface 17 of the pedestal portion 16 to position the first and second arms 82, 84, and the receiving area 104 disposed therebetween, into the receiving area 20 defined between the support base 14 and motor housing 18 of the coffee grinding apparatus 10. As further shown in FIG. 9, the portafilter assembly 130 is shown with the cup portion 132 thereof received in the receiving area 104 of the holder assembly 70 in a manner as described above with reference to FIG. 8. Thus, it is contemplated that the compartment 136 of the portafilter assembly 130 is positioned below the outlet 21 (FIG. 2) of the coffee grinding apparatus 10 to receive ground coffee along a path as indicated by arrow 150 when the holder assembly 70 is fully received within the pedestal portion 16 of the coffee grinding apparatus 10 and when the portafilter assembly 130 is fully received in the receiving area 104 of the holder assembly 70.

Figure 10:
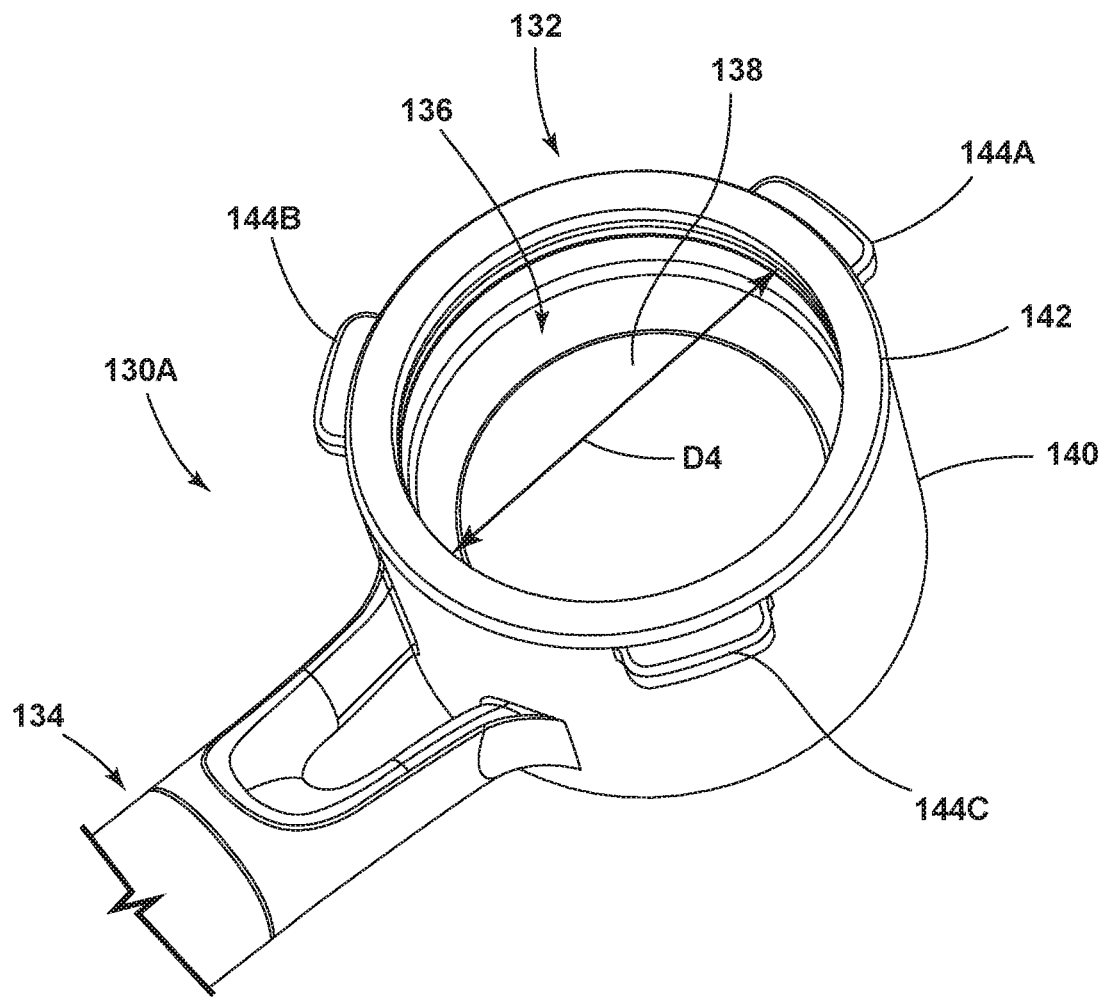
FIG. 10 is a fragmentary top perspective view of another portafilter assembly.

Referring now to FIG. 10, another embodiment of a portafilter assembly 130A is shown having similar features identified above with reference to portafilter assembly 130. As such, like reference numerals will be used to identify common features between portafilter assembly 130A and portafilter assembly 130. As shown in FIG. 10, portafilter assembly 130A includes a handle portion 134 and a cup portion 132 having a compartment 136 with a sidewall 140 and an upper rim 142. In the embodiment shown in FIG. 10, the sidewall 140 of the cup portion 132 includes a diameter having a distance D4. Engagement features 144A, 144B, 144C are shown in the form of male bayonet features that outwardly extend from the upper rim 142. Distance D4 associated with the compartment 136 of portafilter assembly 130A is contemplated to be longer than distance D3 associated with the compartment 136 of portafilter assembly 130. While a larger compartment 136 is associated with portafilter assembly 130A as compared to the portafilter assembly 130, the same holder assembly 70 can be used to support both portafilter assemblies 130, 130A during a coffee grinding procedure, as further described below.

Figure 11:
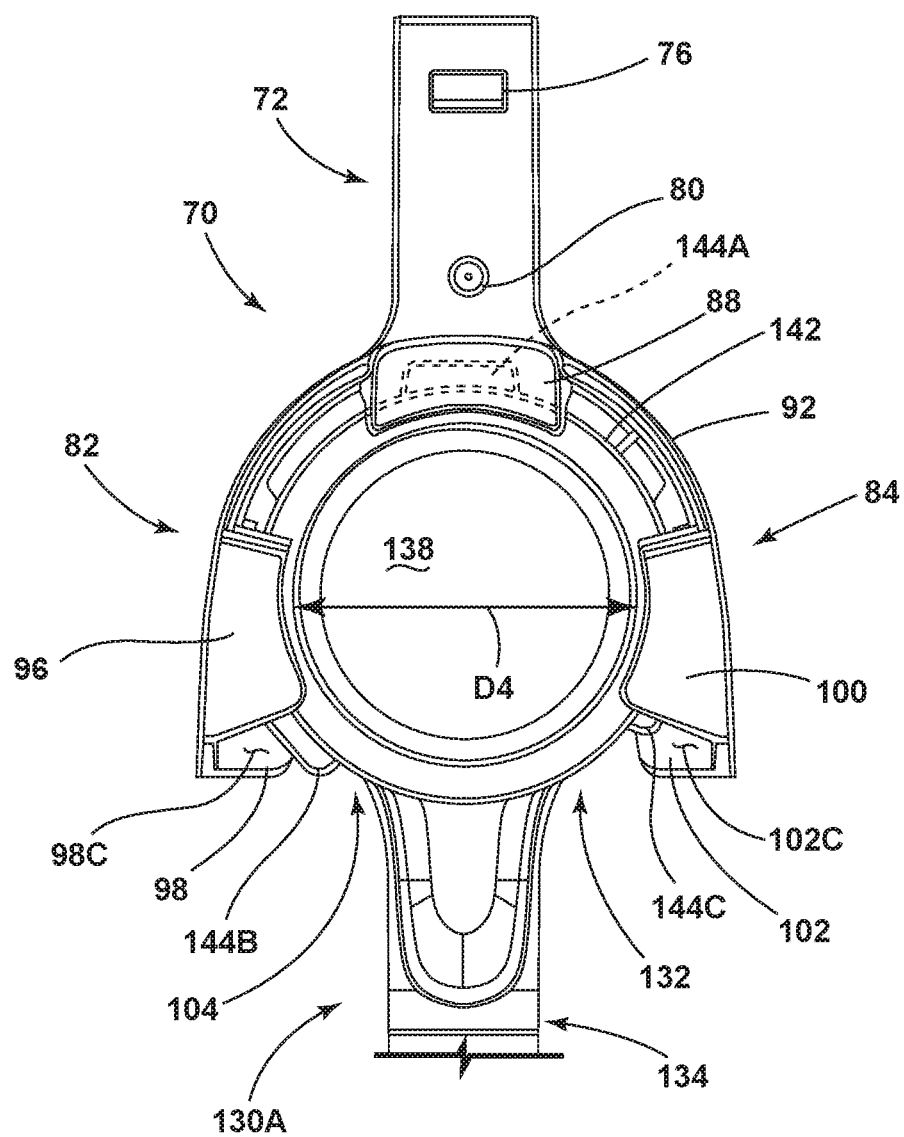
FIG. 11 is a fragmentary top plan view of the portafilter assembly of FIG. 10 as received in the holder assembly of FIG. 5A.

Referring now to FIG. 11, the portafilter assembly 130A is shown with the cup portion 132 thereof received in the receiving area 104 of the holder assembly 70. In the embodiment shown in FIG. 11, the outwardly extending engagement features 144B, 144C are positioned on upper surfaces 98C, 102C of the lower tabs 98, 102 of the first and second arms 82, 84, respectively. Engagement feature 144A is shown in phantom to indicate that the engagement feature 144A is received within the spacing 114 (FIG. 5B) disposed below the slot 88 of the central portion 86 of the holder assembly 70. As received in the spacing 114, the fins 112 (FIG. 5B) of the holder assembly 70 cooperate to positively retain the engagement feature 144A, such that the cup portion 132 stays in the receiving area against the weight of the handle portion 134. In this way, the cup portion 132 of the portafilter assembly 130A is fully received within the receiving area 104 of the holder assembly 70 as defined between the curved inner edges 98B, 102B of the lower tabs 98, 102 of the holder assembly 70. Thus, the circumference of the compartment 136 (having the diameter indicated at reference numeral D4) of the portafilter assembly 130A is sized to fit within the distance D2 provided between the curved inner edges 98B, 102B of the lower tabs 98, 102 of the holder assembly 70.

Figure 12:
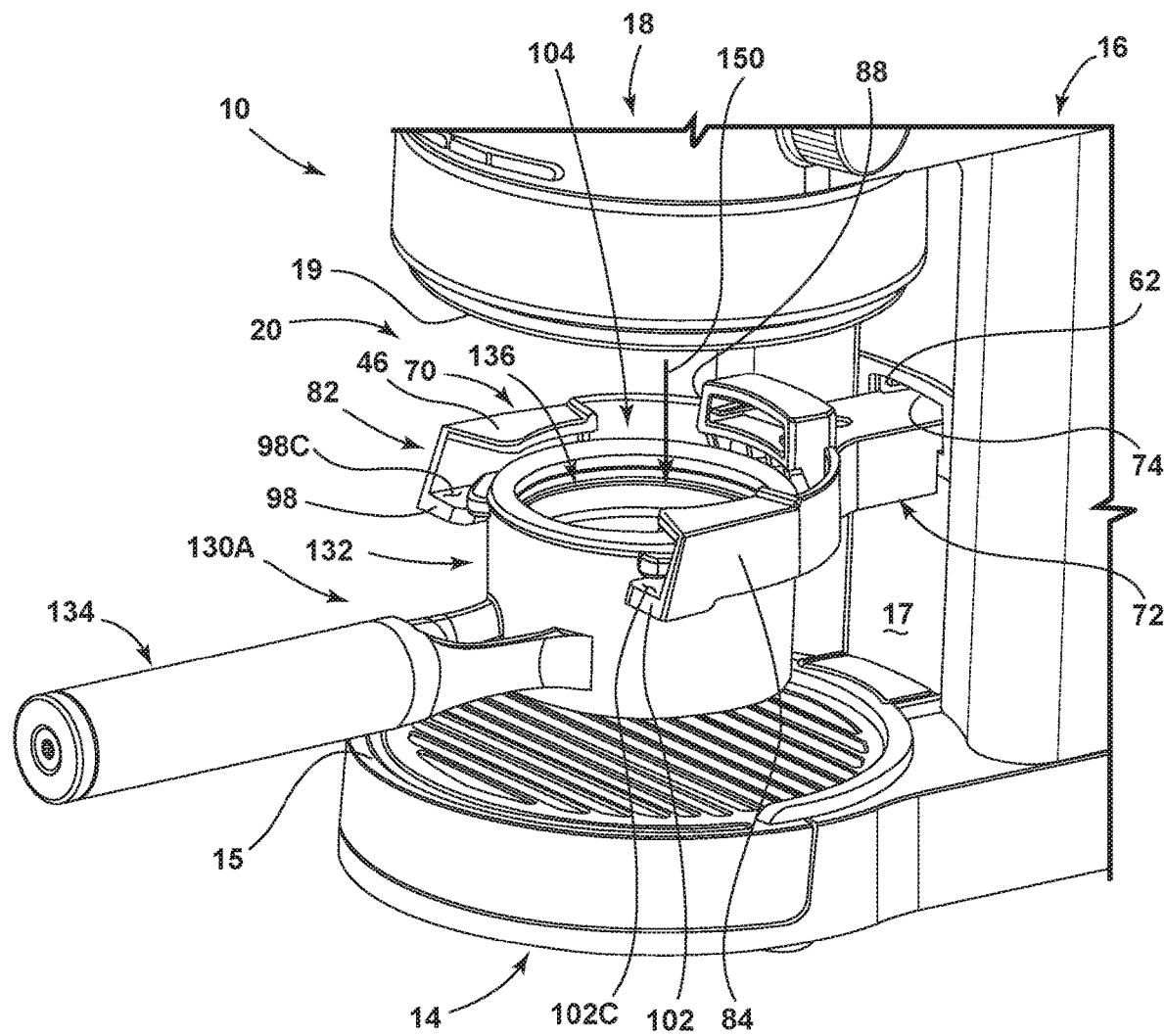
FIG. 12 is a fragmentary front perspective view of the portafilter assembly and holder assembly of FIG. 11 as received in the coffee grinding apparatus of FIG. 1.

Referring now to FIG. 12, the holder assembly 70 is shown coupled to the pedestal portion 16 of the coffee grinding apparatus 10. Specifically, the rear portion 74 of the stem 72 of the holder assembly 70 is shown inserted into receiving hub 62 disposed on the first surface 17 of the pedestal portion 16 of the coffee grinding apparatus 10. In this way, the holder assembly 70 extends outwardly from the first surface 17 of the pedestal portion 16 to position the first and second arms 82, 84, and the receiving area 104 disposed therebetween, into the receiving area 20 defined between the support base 14 and motor housing 18 of the coffee grinding apparatus 10. As further shown in FIG. 12, the portafilter assembly 130A is shown with the cup portion 132 thereof received in the receiving area 104 of the holder assembly 70 in a manner as described above with reference to FIG. 11. Thus, it is contemplated that the compartment 136 of the portafilter assembly 130A is positioned below the outlet 21 (FIG. 2) of the coffee grinding apparatus 10 to receive ground coffee along the path as indicated by arrow 150 when the holder assembly 70 is fully received within the pedestal portion 16 of the coffee grinding apparatus 10 and when the portafilter assembly 130A is fully received in the receiving area 104 of the holder assembly 70.

It is noted that the holder assembly 70 shown in FIG. 12 is the same holder assembly shown in FIG. 9. In FIG. 12, the portafilter assembly 130A is positioned within the receiving area 104 of the holder assembly 70 along the lower tabs 98, 102 of the holder assembly 70, wherein the distance between the curved inner edges 98B, 102B of the lower tabs 98, 102 is indicated as reference numeral D2 (FIG. 5B). In FIG. 9, the portafilter assembly 130 is positioned within the receiving area 104 of the holder assembly 70 along the upper tabs 96, 100 of the holder assembly 70, wherein the distance between the curved inner edges 96B, 100B of the upper tabs 96, 100 is indicated as reference numeral D1 (FIG. 5A). The portafilter assembly 130 shown in FIGS. 7-9 is contemplated to have a cup portion 132 with a diameter D3 of approximately 54 mm. The portafilter assembly 130A shown in FIGS. 10-12 is contemplated to have a cup portion 132 with a diameter D4 of approximately 58 mm. Thus, the same holder assembly 70 is configured to accommodate portafilter assemblies 130, 130A of various sizes. With a holder assembly 70 able to accommodate portafilter assemblies of various sizes, such as portafilter assemblies 130, 130A, the coffee grinding apparatus 10 of the present concept is able to provide various doses of coffee grounds that are specifically tailored for the portafilter assembly being used with the coffee grinding apparatus 10.

Figure 13:
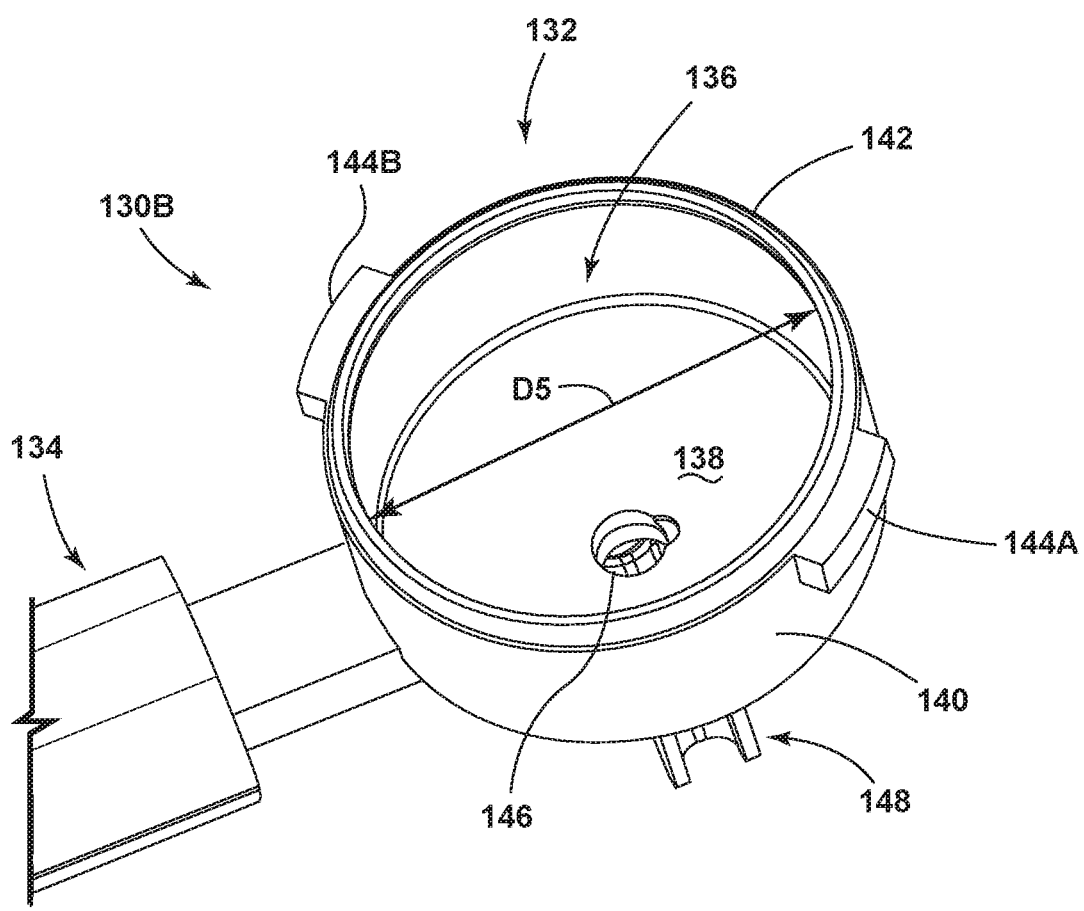
FIG. 13 is a fragmentary top perspective view of another portafilter assembly.

Referring now to FIG. 13, another embodiment of a portafilter assembly 130B is shown having similar features identified above with reference to portafilter assemblies 130 and 130A. As such, like reference numerals will be used to identify common features between portafilter assembly 130B and portafilter assemblies 130, 130A. As shown in FIG. 13, portafilter assembly 130B includes a handle portion 134 and a cup portion 132 having a compartment 136 with a sidewall 140 and an upper rim 142. In the embodiment shown in FIG. 13, the sidewall 140 of the cup portion 132 includes a diameter having a distance D5. Engagement features 144A, and 144B are shown in the form of male bayonet features or tabs that outwardly extend from the upper rim 142. Thus, portafilter assembly 130B includes only two engagement features 144A, 144B, as compared to the three engagement features (144A-144C) shown disposed on portafilter assemblies 130, 130A. Distance D5 associated with the compartment 136 of portafilter assembly 130B is contemplated to be longer than distance D3 associated with the compartment 136 of portafilter assembly 130, and is also contemplated to be roughly the same as distance D4 associated with the compartment 136 of portafilter assembly 130A. While a larger compartment 136 is associated with portafilter assembly 130B as compared to the portafilter assembly 130, the same holder assembly 70 can be used to support both portafilter assemblies 130, 130B during a coffee grinding procedure, as noted above.

Figure 14:
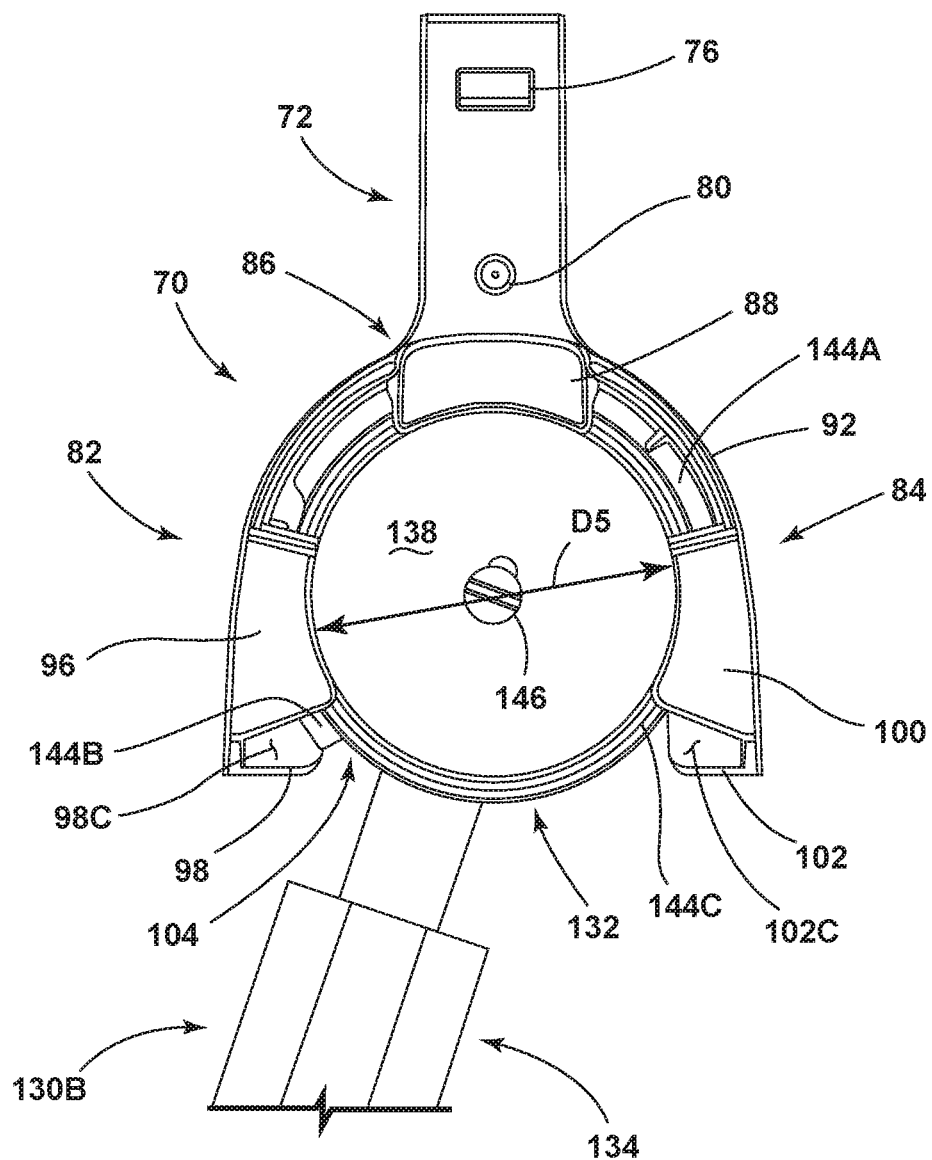
FIG. 14 is a fragmentary top plan view of the portafilter assembly of FIG. 13 as received in the holder assembly of FIG. 5A.

Referring now to FIG. 14, the portafilter assembly 130B is shown with the cup portion 132 thereof received in the receiving area 104 of the holder assembly 70. In the embodiment shown in FIG. 14, with the handle portion 134 rotated slightly, the outwardly extending engagement features 144B, 144A are positioned on upper surfaces 98C, 102C of the lower tabs 98, 102 of the first and second arms 82, 84, respectively. In this way, the cup portion 132 of the portafilter assembly 130B is fully received within the receiving area 104 of the holder assembly 70 as defined between the curved inner edges 98B, 102B of the lower tabs 98, 102 of the holder assembly 70. Thus, the circumference of the compartment 136 (having the diameter indicated at reference numeral D5) of the portafilter assembly 130B is sized to fit within the distance D2 provided between the curved inner edges 98B, 102B of the lower tabs 98, 102 of the holder assembly 70.

Figure 15:
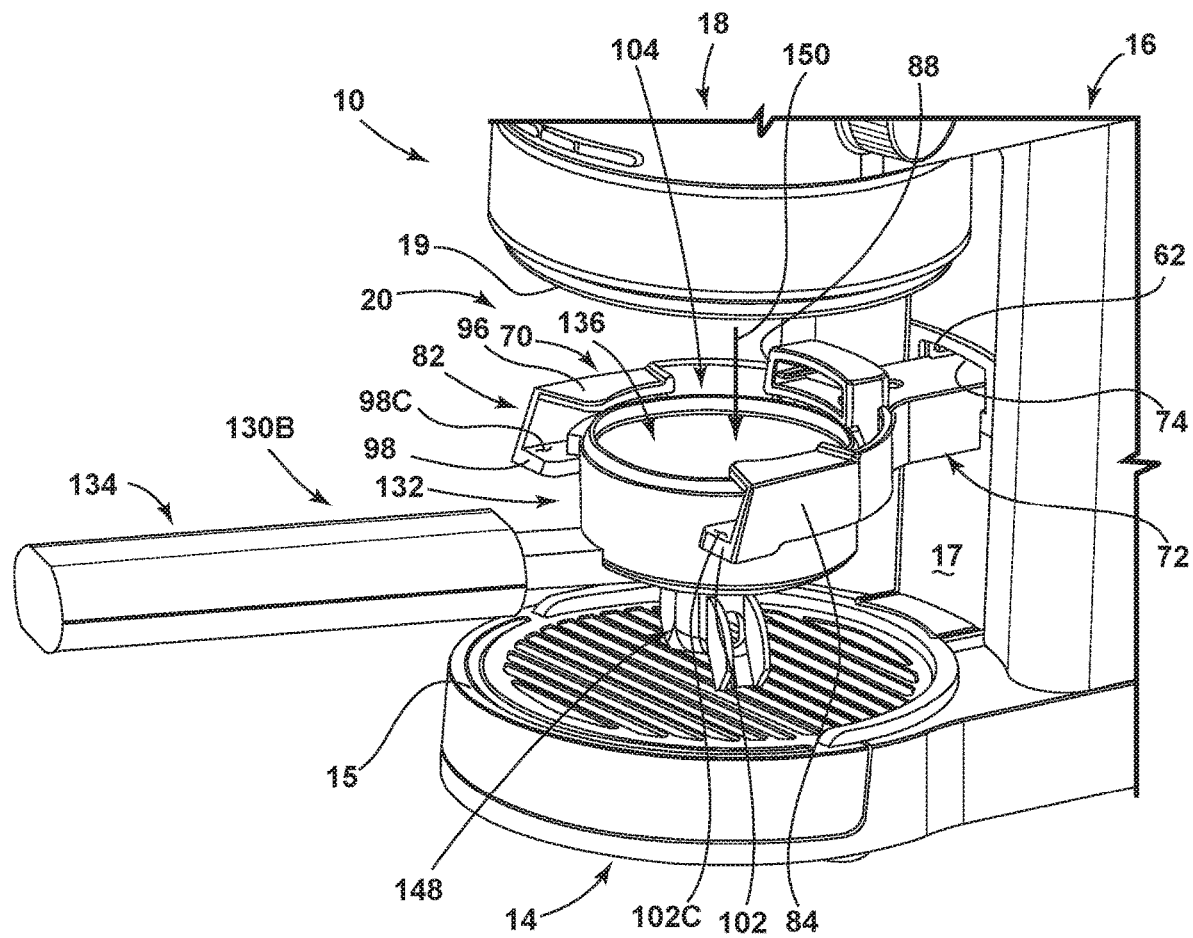
FIG. 15 is a fragmentary front perspective view of the portafilter assembly and holder assembly of FIG. 14 as received in the coffee grinding apparatus of FIG. 1.

Referring now to FIG. 15, the holder assembly 70 is shown coupled to the pedestal portion 16 of the coffee grinding apparatus 10. Specifically, the rear portion 74 of the stem 72 of the holder assembly 70 is shown inserted into receiving hub 62 disposed on the first surface 17 of the pedestal portion 16 of the coffee grinding apparatus 10. As further shown in FIG. 15, the portafilter assembly 130B is shown with the cup portion 132 thereof received in the receiving area 104 of the holder assembly 70 in a manner as described above with reference to FIG. 14. Thus, it is contemplated that the compartment 136 of the portafilter assembly 130B is positioned below the outlet 21 (FIG. 2) of the coffee grinding apparatus 10 to receive ground coffee along the path as indicated by arrow 150 when the holder assembly 70 is fully received within the pedestal portion 16 of the coffee grinding apparatus 10 and when the portafilter assembly 130B is fully received in the receiving area 104 of the holder assembly 70.

Figure 16:
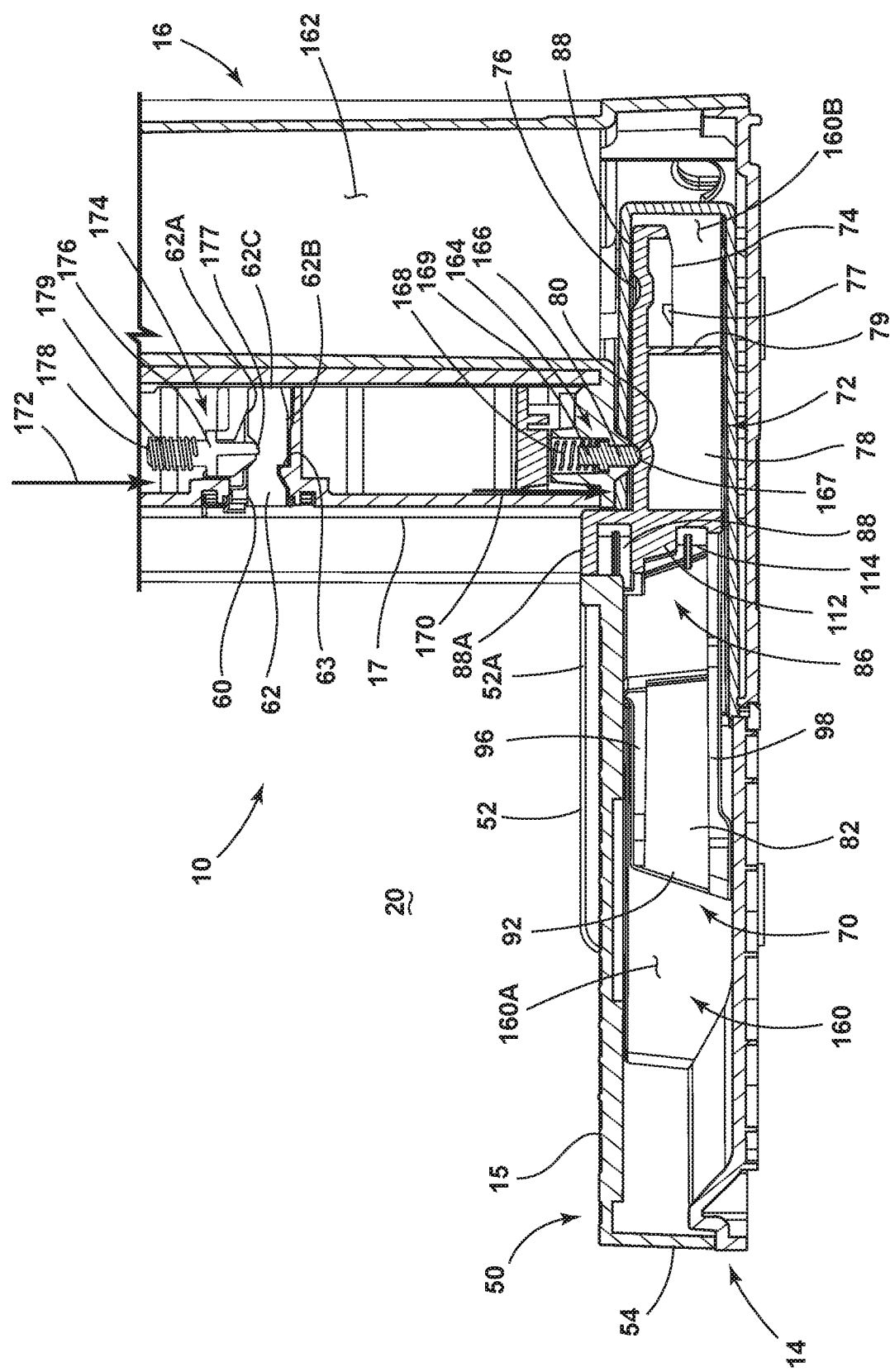
FIG. 16 is a fragmentary cross-sectional view of the support base of FIG. 4 taken at line XVI showing a holder assembly stowed within a storage cavity of the support base.

Referring now to FIG. 16, a cross-sectional view of the coffee grinding apparatus 10 is shown wherein a storage cavity 160 of the support base 14 is revealed. As noted above, the storage cavity 160 is an internal cavity selectively accessed via the removable cover assembly 50. In the embodiment shown in FIG. 16, the holder assembly 70 is shown stored within the storage cavity 160. It is contemplated that the holder assembly 70 can be stored within the storage cavity 160 of the support base 14 of the coffee grinding apparatus 10 when not in use. As further shown in FIG. 16, an upper wall 88A of the slot 88 aligns with an upper surface 52A of the rear rim 52 of the cover assembly 50. As such, the slot 88 of the holder assembly 70 is positioned between the rear rim 52 of the cover assembly 50 and the pedestal portion 16 of the coffee grinding apparatus 10 when the holder assembly 70 is stored within the storage cavity 160.

As further shown in FIG. 16, the storage cavity 160 extends below the pedestal portion 16 of the coffee grinding apparatus 10. In an interior portion 162 of the pedestal portion 16 of the coffee grinding apparatus 10, a first detent feature 164 is disposed. The first detent feature 164 includes a detent member 166 having a distal end 167 and a stem portion 169. The stem portion 169 of the detent member 166 is coupled to a biasing member 168, shown in the form of a coil spring in FIG. 16. The biasing member 168 biases the detent member 166 downwardly in a direction as indicated by arrow 170. Under pressure, the detent member 166 is configured to move upwardly against the downward pressure of the biasing member 168 to retract into the interior portion 162 of the pedestal portion 16 of the coffee grinding apparatus 10. Thus, the detent member 166 is a retractable detent member. As shown in FIG. 16, the distal end 167 of the detent member 166 is received within the second recess 80 disposed on the upper surface 73 of the stem 72 of the holder assembly 70. In this way, the first detent feature 164 is configured to provide tactile feedback to a user to indicate when the holder assembly 70 is properly stored within the storage cavity 160 of the support base 14. Once properly stored in the storage cavity 160 of the support base 14, the holder assembly 70 is positively captured will not move about within the storage cavity 160 as the coffee grinding apparatus 10 is moved.

As further shown in FIG. 16, a second detent feature 174 is disposed within the interior portion 162 of the pedestal portion 16 of the coffee grinding apparatus 10. The second detent feature 174 includes a detent member 176 having a distal end 177 and a stem portion 179. The stem portion 179 of the detent member 176 is coupled to a biasing member 178, shown in the form of a coil spring in FIG. 16. The biasing member 178 biases the detent member 176 downwardly in a direction as indicated by arrow 172. Under pressure, the detent member 176 is configured to move upwardly against the downward pressure of the biasing member 178 to retract into the interior portion 162 of the pedestal portion 16 of the coffee grinding apparatus 10. Thus, the detent member 176 is a retractable detent member. As further shown in FIG. 16, the second detent feature 174 is positioned within the receiving hub 62 which inwardly extends from the first surface 17 of the pedestal portion 16. The receiving hub 62 includes a top wall 62A, a bottom wall 62B and a rear wall 62C. The distal end 177 of the detent member 176 extends into the receiving hub 62 through the top wall 62A. A protruding engagement feature 63 upwardly extends from the bottom wall 62B of the receiving hub 62. As noted above, the receiving hub 62 is used to receive the rear portion 74 of the holder assembly 70, as further described below. As such, the first and second detent features 164, 174 are retractable detent features of the coffee grinding apparatus 10.

Figure 17:
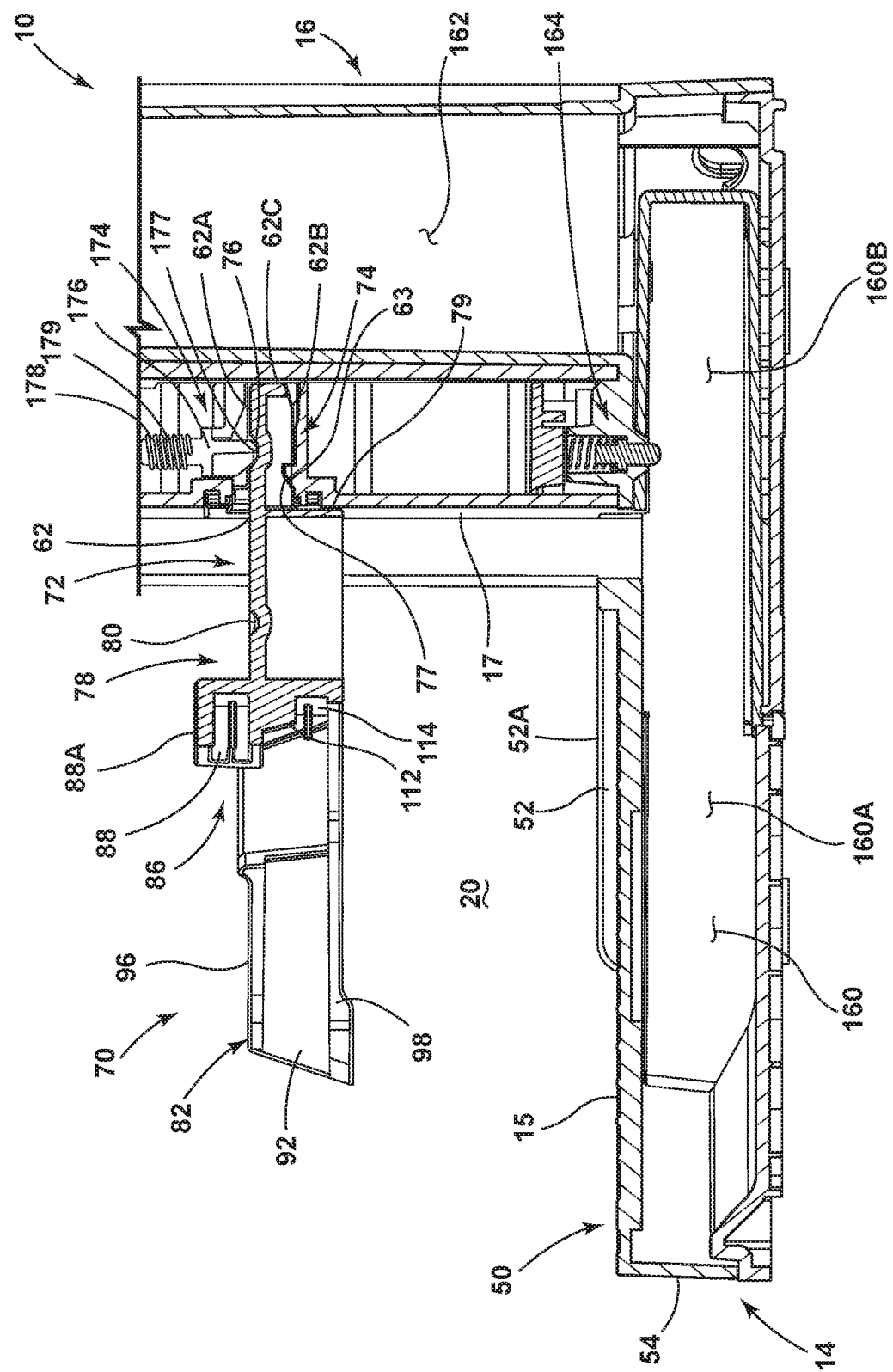
FIG. 17 is a fragmentary cross-sectional view of the support base of FIG. 4 taken at line XVI showing the holder assembly received in a receiving hub of a pedestal portion.

Referring now to FIG. 17, the holder assembly 70 has been removed from the storage cavity 160 of the support base 14 and has been positioned in the receiving area 20 of the coffee grinding apparatus 10. Specifically, the rear portion 74 of the stem 72 of the holder assembly 70 has been received within the receiving hub 62 of the pedestal portion 16. As fully received within the receiving hub 62, the rear portion 74 of the stem 72 of the holder assembly 70 is configured such that the first recess 76 thereof is engaged with the distal end 177 of the second detent feature 174. Further, the upwardly protruding engagement feature 63 of the receiving hub 62 is received in the third recess 77 (FIG. 5B) disposed on the second portion of the stem 72 of the holder assembly 70 at an underside thereof. Further, the abutment portion 79 positioned between the front portion 78 and the rear portion 74 of the stem 72 of the holder assembly 70 is abutting the first surface 17 of the pedestal portion 16 of the coffee grinding apparatus 10 when the holder assembly 70 is fully received in the receiving area 20. As further shown in FIG. 17, with the holder assembly 70 removed from the storage cavity 160, the storage cavity 160 is shown as having a front portion 160A disposed below the receiving area 20 and a rear slot portion 160B positioned below the pedestal portion 16 of the coffee grinding apparatus 10. In use, and as shown in FIG. 16, the arms 82, 84 of the holder assembly 70 are positioned within the front portion 160A of the storage cavity 160 when the holder assembly 70 is fully received in the storage cavity 160. Further, and as also shown in FIG. 16, the stem 72 of the holder assembly 70 is positioned within the rear slot portion 160B of the storage cavity 160 when the holder assembly 70 is fully received in the storage cavity 160.

Figure 18:
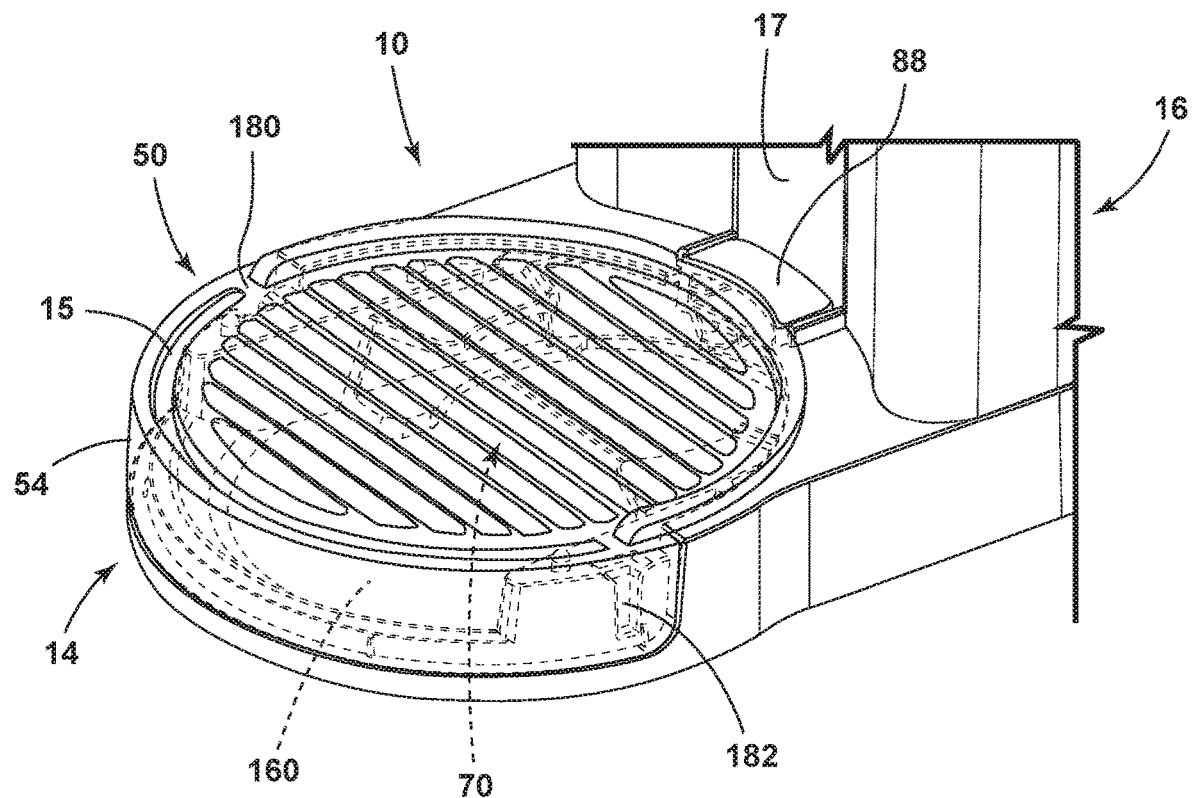
FIG. 18 is a fragmentary front perspective view of the support base of the coffee grinding apparatus of FIG. 1 with a cover assembly shown in phantom.
Figure 19:
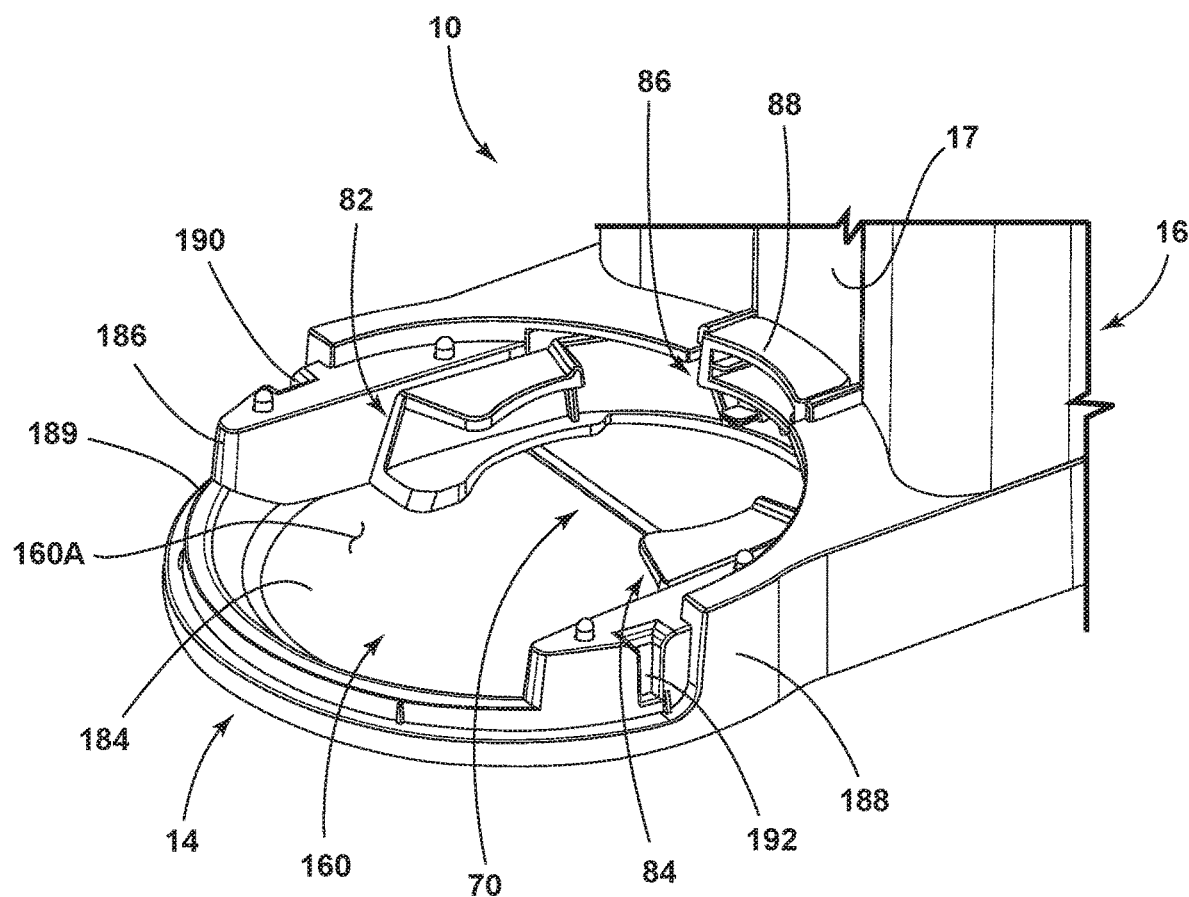
FIG. 19 is a fragmentary front perspective view of the support base of the coffee grinding apparatus of FIG. 18 with the cover assembly removed to reveal a storage cavity having a holder assembly stowed therein.

Referring now to FIG. 18, the cover assembly 50 is shown in phantom to reveal the holder assembly 70 as stowed in the storage cavity 160 of the support base 14. As shown in FIG. 18, the front wall 54 of the cover assembly 50 includes first and second tabs 180, 182 disposed on an inner surface of the front wall 54. Referring now to FIG. 19, the cover assembly 50 has been removed to reveal the holder assembly 70 as stowed in the storage cavity 160 of the support base 14. The support base 14 includes a bottom wall 184 in first and second sidewalls 186, 188 extending upwardly from the bottom wall 184. The front portion 160A of the storage cavity 160 is generally defined by the bottom wall 184 in the first and second sidewalls 186, 188. As shown in FIG. 19, the first and second sidewalls 186, 188 include vertically disposed slots 190, 192, respectively, which are configured to receive the first and second tabs 180, 182 of the cover assembly 50 when the cover assembly 50 is positioned over the opening 189 of the storage cavity 160. In FIG. 19, the holder assembly 70 is fully stowed within the storage cavity 160, such that the first and second arms 82, 84 of the holder assembly 70 are positioned within the front portion 160A of the storage cavity 160. The stem 72 of the holder assembly 70 is contemplated to be positioned within the slot portion 160B (FIGS. 16, 17 and 20) of the storage cavity 160 when the holder assembly 70 is fully received in the storage cavity 160.

Figure 20:
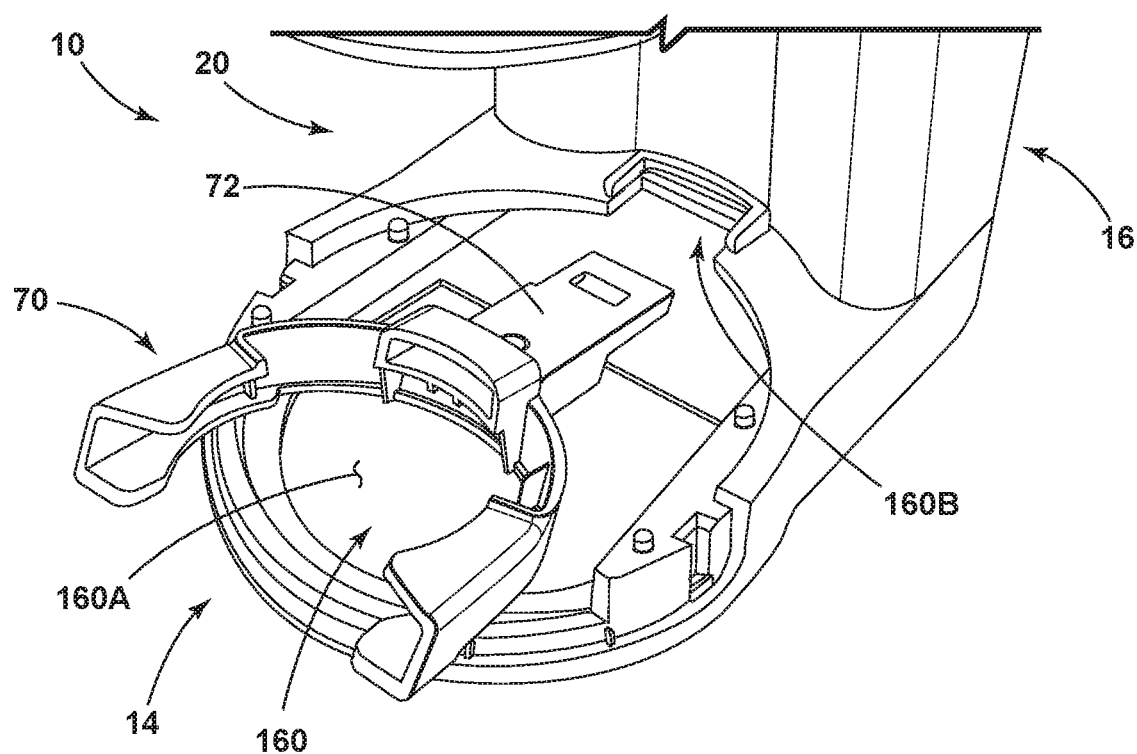
FIG. 20 is a fragmentary front perspective view of the support base of the coffee grinding apparatus of FIG. 19 showing the holder assembly being removed from the storage cavity.

Referring now to FIG. 20, the holder assembly 70 is shown as being removed from the storage cavity 160 and the stem 72 of the holder assembly 70 is shown being removed from the slot portion 160B of the storage cavity 160. With a removable cover assembly 50, the storage cavity 160 can be easily opened and closed, and provides a convenient place to store and house the holder assembly 70 when not in use.

As noted above, and with reference to FIG. 18, the coffee grinding apparatus 10 of the present concept includes a support base 14 with a storage cavity 160 and a removable cover assembly 50 for selectively closing the opening 189 to the storage cavity 160. The removable cover assembly 50 includes a support surface 15 as positioned over the opening 189 to the storage cavity 160. A pedestal portion 16 extends upwardly from the support base 14 and includes a first surface 17 that disposed adjacent to the support surface 15 of the cover assembly 50. With reference to FIG. 17, the first surface 17 of the pedestal portion 16 further includes an access aperture 60 opening into an inwardly extending receiving hub 62. A motor housing 18 is supported on and extends outwardly from the pedestal portion 16. A portion of the motor housing 18 is disposed above and spaced-apart from the support surface 15 of the cover assembly 50 to define a receiving area 20 therebetween. With reference to FIGS. 5A, 5B, the holder assembly 70 includes a stem 72 and first and second arms 82, 84 spaced-apart from one another and outwardly extending from the stem 72 to define a receiving area 104 therebetween. Upper and lower tabs 96, 98 are disposed on the first arm 82 and inwardly extend into the receiving area 104 between the first and second arms 82, 84. Upper and lower tabs 100, 102 are disposed on the second arm 84 and inwardly extend into the receiving area 104 between the first and second arms 82, 84. The upper and lower tabs 100, 102 of the second arm 84 are configured in an opposed manner relative to the upper and lower tabs 96, 98 of the first arm 82. The upper tab 96 of the first arm 82 is spaced-apart from the upper tab 100 of the second arm 84 a first distance D1, and the lower tab 98 of the first arm 82 is spaced-apart from the lower tab 102 of the second arm 84 a second distance D2 that is different than the first distance D1.

With further reference to FIGS. 5A, 5B, the holder assembly 70 includes an outwardly extending stem 72. First and second arms 82, 84 are spaced-apart from one another and outwardly extend from a front portion 78 of the stem 72 to define an open receiving area 104 positioned between the first and second arms 82, 84. The first and second arms 82, 84 each include opposed upper and lower tabs 96, 98 and 100, 102, respectively, where are vertically spaced-apart from one another and which extend inwardly into the open receiving area 104. The upper tab 96 of the first arm 82 is spaced-apart from the upper tab 100 of the second arm 84 a first distance D1. The lower tab 98 of the first arm 82 is spaced-apart from the lower tab 102 of the second arm 84 a second distance D2 that is greater than the first distance D1.

Figure 21:
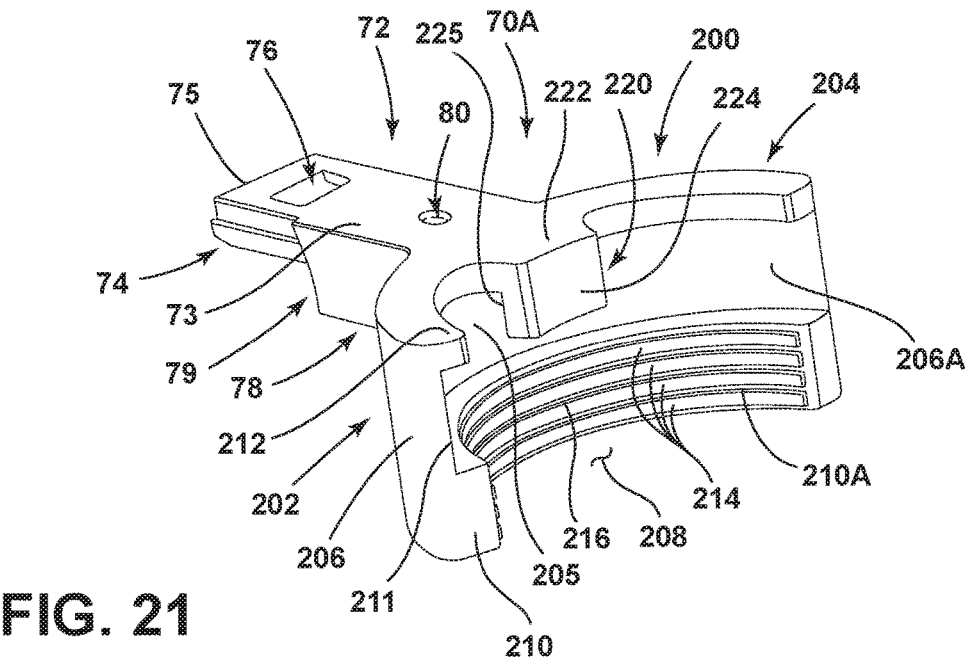
FIG. 21 is a front top perspective view of a holder assembly according to another embodiment.

Referring now to FIG. 21, a holder assembly 70A according to an embodiment of the present concept is shown. The holder assembly 70A includes a number of shared features as found on holder assembly 70 shown in FIGS. 5A and 5B, and described above. Common features between the holder assemblies 70, 70A will be represented using like reference numerals. Specifically, the stem 72 of the holder assembly 70A includes the rear portion 74 that is contemplated to be removeably received in the receiving hub 62 of the pedestal portion 16 of the coffee grinding apparatus 10. In the embodiment shown in FIG. 21, the rear portion 74 of the stem 72 of the holder assembly 70A includes the first recess 76 disposed therein which inwardly extends from the upper surface 73 of the stem 72. As noted above, the first recess 76 is contemplated to receive the second detent feature 174 positioned within the receiving hub 62 of the pedestal portion 16 of the coffee grinding apparatus 10, as further described below with reference to FIG. 28. The front portion 78 of the stem 72 is separated from the rear portion 74 by a stepped configuration defining an abutment portion 79 positioned therebetween. In use, the abutment portion 79 is configured to abut the first surface 17 of the pedestal portion 16 when the rear portion 74 of the stem 72 is inserted into the receiving hub 62 of the pedestal portion 16. At the front portion 78 of the stem 72, the second recess 80 is shown inwardly extending from the upper surface 73 of the stem 72, and is configured to receive a reciprocal detent feature 164 disposed within the storage cavity 160 (FIG. 25) of the support base 14, as further described below.

As further shown in FIG. 21, the holder assembly 70A further includes a head portion 200 defined by first and second arms 202, 204 which outwardly extend from the front portion 78 of the stem 72 at a central portion 205 of the head portion 200. The first and second arms 202, 204 are interconnected to one another and the stem 72 of the holder assembly 70A. The first and second arms 202, 204 are generally mirror images of one another and define a receiving area 208 therebetween. As shown in FIG. 21, the head portion 200 of the holder assembly 70A includes an upright sidewall 206 that at least partially defines the first and second arms 202, 204. The upright sidewall 206 is positioned in an outwardly curved manner. The upright sidewall 206 includes a first tab 210 disposed at a lower portion 206B of the sidewall 206, and a second tab 212 disposed at an upper portion 206C of the sidewall 206. The first and second tabs 210, 212 are vertically offset from one another and inwardly extend from an outer surface 206A of the upright sidewall 206 at the lower and upper portions 206B, 206C of the upright sidewall 206, respectively, towards the receiving area 208. As vertically spaced-apart from one another, the first and second tabs 210, 212 define an inset portion 211 therebetween. Thus, the first and second tabs 210, 212 of the first and second arms 202, 204 of the head portion 200 inwardly extend towards the central receiving area 208 defined between the first and second arms 202, 204. As shown in FIG. 21, the first and second tabs 210, 212 of the head portion 200 are vertically spaced-apart from each other and are configured to help support various sized portafilter assemblies on the holder assembly 70A during a grinding procedure, as further described below.

In the embodiment shown in FIG. 21, a number of bumper members 214 are shown disposed on an outer surface 210A of the first tab 210. The bumper members 214 extend outwardly from the outer surface 210A of the first tab 210, such that the bumper members 214 extend inwardly into the receiving area 208. It is contemplated that the bumper members 214 are flexibly resilient members, such as deformable foam members or rubberized bumpers, that assist in holding a portafilter assembly in place in the holder assembly 70A. The bumper members 214 may be adhered to the outer surface 210A of the first tab 210 or may be received in inset channels 215 (FIG. 23) disposed along the first tab 210. The bumper members 214 may include a slip resistant surface to help hold a portafilter assembly in place. The first tab 210 defines an outwardly curved and outwardly facing first abutment surface 216 of the head portion 200 along the outer surface 210A thereof and the bumper members 214 disposed thereon. In this way, the head portion 200 of the holder assembly 70A includes an outwardly facing first abutment surface 216 along the lower portion 206B of the sidewall 206 having outwardly facing bumper members 214.

As further shown in FIG. 21, the head portion 200 of the holder assembly 70A further includes a bracket 220 outwardly extending from the front portion 78 of the stem 72 and inwardly extending into or towards the receiving area 208. In the embodiment shown in FIG. 21, the bracket 220 is positioned above the first tab 210 and includes a first portion 222 inwardly extending into the receiving area 208. Specifically, in the embodiment of FIG. 21, the first portion 222 of the bracket 220 extends inwardly into the receiving area from the upper portion 206C of the sidewall 206 at the second tab 212. A second portion 224 of the bracket 220 downwardly extends from the first portion 222 into the receiving area 208. The second portion 224 of the bracket 220 includes a second abutment surface 225. The second abutment surface 225 of FIG. 21 is also outwardly curved, like the first abutment surface 216, but is inwardly facing, as opposed to the outwardly facing and outwardly curved first abutment surface 216 of the first tab 210. So, the first and second abutment surfaces 216, 225 face in opposite directions and operate in concert with one another to hold portafilter assemblies of various sizes in-place during a grinding procedure, as further described below. The second abutment surface 225 may include any number of bumper members, similar to bumper members 214 of the first tab 210, to actively engage a portafilter assembly, as further described below with reference to FIG. 23. Thus, the first and second abutment surfaces 216, 225 are opposing surfaces, wherein the first abutment surface 216 is vertically offset and horizontally inset relative to the second abutment surface 225. Specifically, the second abutment surface 225 is positioned above the first abutment surface 216 and is also positioned outboard relative to the second abutment surface 225.

Figure 22:
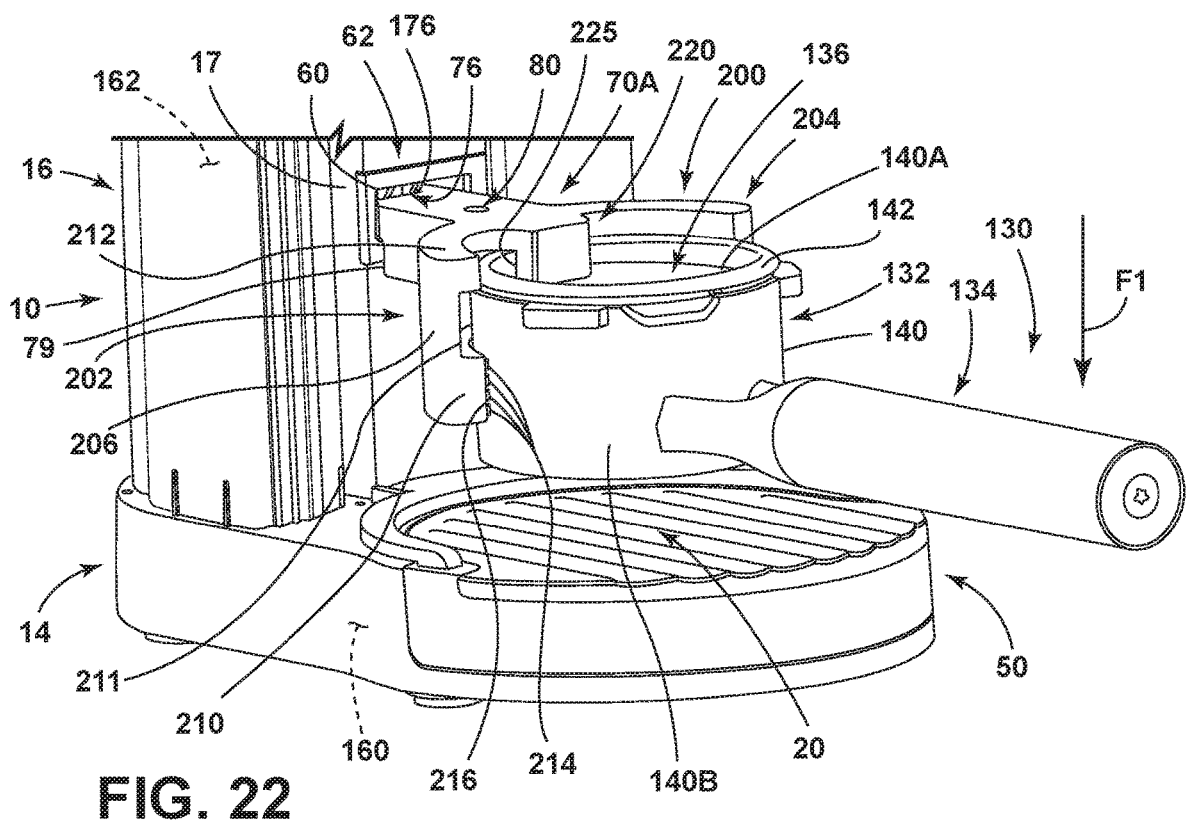
FIG. 22 is a fragmentary top perspective view of a portafilter assembly and the holder assembly of FIG. 21 as received in the coffee grinding apparatus of FIG. 1.

Referring now to FIG. 22, the holder assembly 70A is shown coupled to the pedestal portion 16 of the coffee grinding apparatus 10. Specifically, the rear portion 74 of the stem 72 of the holder assembly 70A is shown inserted into receiving hub 62 disposed on the first surface 17 of the pedestal portion 16 of the coffee grinding apparatus 10. In this way, the holder assembly 70 extends outwardly from the first surface 17 of the pedestal portion 16 to position the head portion 200, and the receiving area 208 thereof, into the receiving area 20 defined between the support base 14 and motor housing 18 (FIG. 15) of the coffee grinding apparatus 10. As further shown in FIG. 22, the portafilter assembly 130 is shown with the cup portion 132 thereof received in the receiving area 208 of the holder assembly 70A. Thus, it is contemplated that the compartment 136 of the cup portion 132 of the portafilter assembly 130 is positioned below the outlet 21 (FIG. 2) of the coffee grinding apparatus 10 to receive ground coffee during a coffee grinding procedure. The holder assembly 70A is shown having detent member 176 received in the first recess 76 of the stem 72. Abutment portion 79 of the holder assembly 70A is shown abutting the first surface 17 of the coffee grinding apparatus 10 to help support the weight of the holder assembly 70A as further supporting the portafilter assembly 130. The second abutment surface 225 of the holder assembly 70A is shown abutting the inner surface 140A of the cup portion 132 of the portafilter assembly 130. Similarly, the first abutment surface 216 of the holder assembly 70A is shown abutting the outer surface 140B of the cup portion 132 of the portafilter assembly 130. In this way, the first and second abutment surfaces 216, 225 cooperate to hold the portafilter assembly 130 in-place against a downward force of the portafilter assembly indicated by arrow F1.

Figure 23:
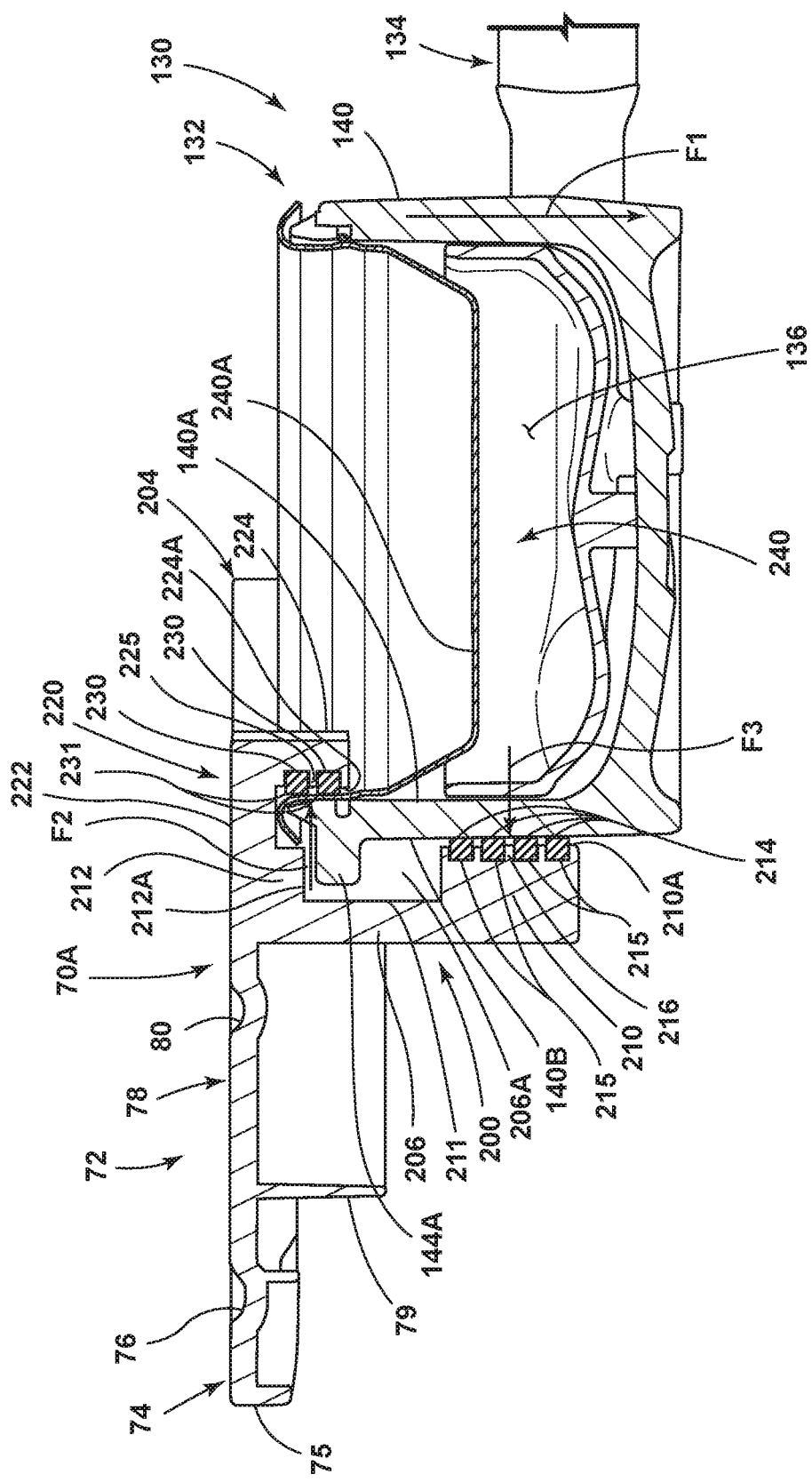
FIG. 23 is a cross-sectional view of the portafilter assembly and the holder assembly of FIG. 22 engaged with one another.

Referring now to FIG. 23, the portafilter assembly 130 is shown being supported by the holder assembly 70A. The second tab 212 of the head portion 200 of the holder assembly 70A is shown having an undersurface 212A that may abut the top surface of an engagement feature 144A outwardly extending from the sidewall 140 of the cup portion 132 of the portafilter assembly 130. In the embodiment shown in FIG. 23, the bumper members 214 of the first tab 210 of the head portion 200 of the holder assembly 70A are shown disposed in inset channels 215 inwardly extending from the outer surface 210A of the first tab 210. The bracket 220 also includes bumper members 231 disposed in inset channels 230 inwardly extending from the outer surface 224A of the second portion 224 of the bracket 220. In this way, the bumper members 231 of the bracket 220, along with the outer surface 224A of the second portion 224 of the bracket 220, define the inwardly facing second abutment surface 225 of the holder assembly 70A.

As specifically shown in FIG. 23, the embodiment of the portafilter assembly 130 illustrated therein includes an insert 240 having an inner surface 240A. The insert 240 is received within the compartment 136 of the cup portion 132 of the portafilter assembly 130. A variety of inserts may be used to correspond to various volumes of ground coffee anticipated to be received by the portafilter assembly 130 during a grinding procedure. With the insert 240 received in the compartment 136 of the cup portion 132 of the portafilter assembly 130, the second abutment surface 225 of the bracket 220 of the holder assembly 70A engages the inner surface 240A of the insert 240. Without the insert 240 in place, is contemplated that the second abutment surface 225 of the bracket 220 of the holder assembly 70A would engage the inner surface 140A of the sidewall 140 of the cup portion 132 of the portafilter assembly 130, much like the arrangement described below with reference to FIGS. 29A and 29B. This engagement between the inner surface 240A and the second abutment surface 225 combats an outwardly directed force indicated by the arrow F2, that is a resulting force of the downwardly directed force F1 provided by the weight of the portafilter assembly 130. An inwardly directed force indicated by the arrow F3 is also a resulting force of the downwardly directed force F1 provided by the weight of the portafilter assembly 130. The inwardly directed force indicated by the arrow F3 draws the outer surface 140B of the sidewall 140 of the cup portion 132 of the portafilter assembly 130 into engagement with the first abutment surface 216 of the first tab 210 of the head portion 200 of the holder assembly 70A. In this way, the opposing forces indicated by arrows F2 and F3 are combated by the engagement of the cup portion 132 of the portafilter assembly 130 with the first and second abutment surfaces 216, 225 of the head portion 200 of the holder assembly 70A. Having the bumper members 214 and 231 disposed on the respective first and second abutment surfaces 216, 225, the metal cup portion 132 of the portafilter assembly 130 (and/or the insert 240 thereof) is positively captured between the first and second abutment surfaces 216, 225 to retain the portafilter assembly 130 in-place on the head portion 200 of the holder assembly 70A. It is further contemplated that an engagement between the top surface of the engagement feature 144A and at the undersurface 212A of the second tab 212 may also combat the outwardly directed forces indicated by arrow F2 of the portafilter assembly 130.

Figure 24:
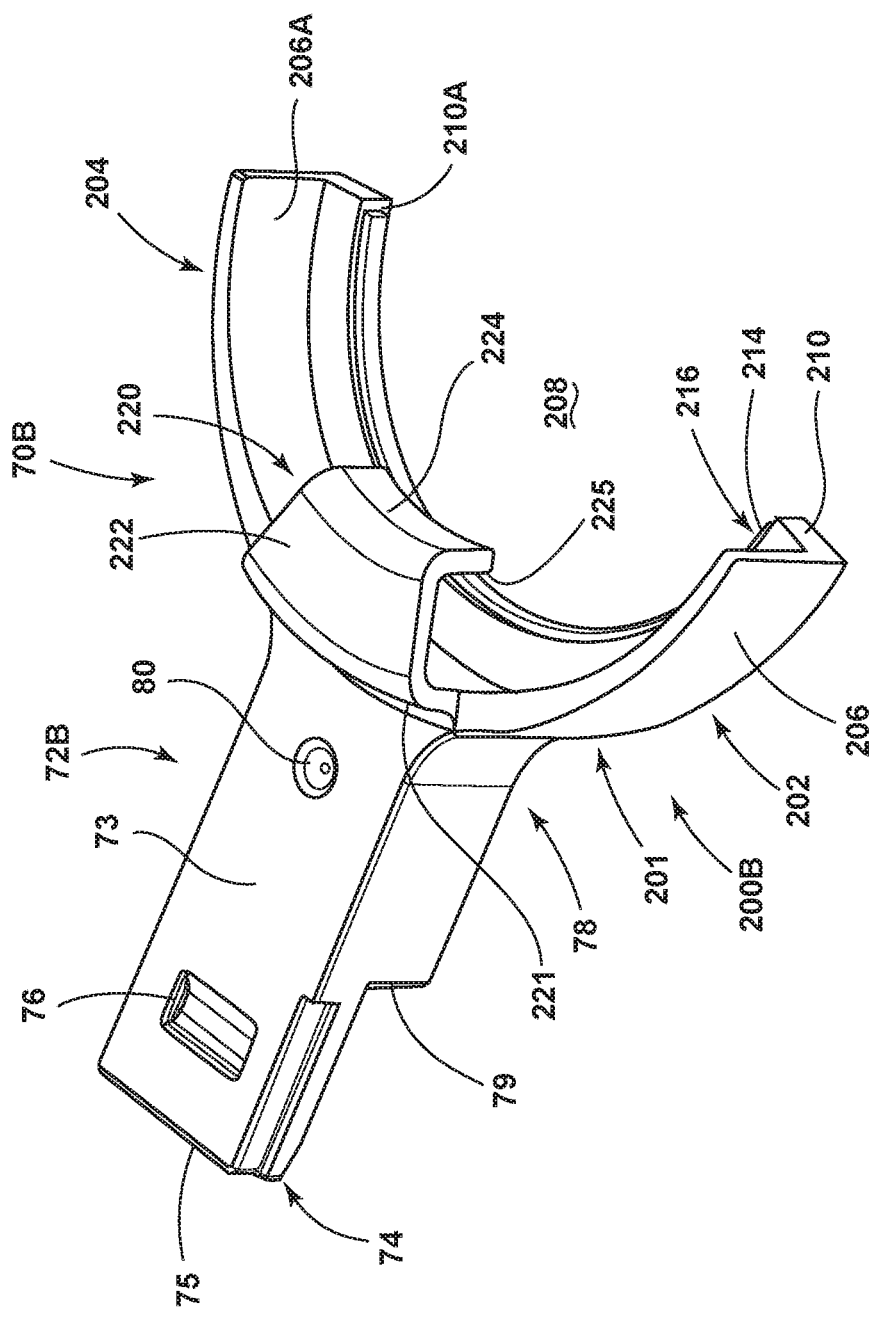
FIG. 24 is a front top perspective view of a holder assembly according to another embodiment.

Referring now to FIG. 24, another embodiment of a holder assembly 70B is shown. The holder assembly 70B includes a number of shared features as found on holder assembly 70 shown in FIGS. 5A and 5B, and holder assembly 70A shown in FIG. 21. Common features between the holder assemblies 70, 70A and 70B will be represented using like reference numerals. In the embodiment shown in FIG. 24, the holder assembly 70B includes a stem 72B is contemplated to be comprised of a metal material. The holder assemblies 70 and 70A described above are contemplated to be comprised of a one-piece polymeric injection molded material that creates a unitary member. The holder assembly 70B is contemplated to be a two-part member having a metal stem 72B to provide a rigid engagement with the coffee grinding apparatus 10 using the rear portion 74 thereof and the first and second recesses 76, 80. The holder assembly 70B further includes a head portion 200B. The bracket 220 of the head portion 200B is comprised of the metal material of the stem 72B and includes an upwardly turned the base portion 221 from which the first portion 222 of the bracket 220 inwardly extends into the receiving area 208. The second portion 224 of the bracket 220 downwardly extends from the first portion 222 to define the inwardly facing second abutment surface 225 of the head portion 200B. The head portion 200B of the holder assembly 70B further includes a front portion 201 that includes the downwardly extending sidewall 206 and the first tab 210 which inwardly extends into the receiving area 208 from the outer surface 206A of the sidewall 206 at the lower portion 206B of the sidewall 206. The sidewall 206 of the front portion 201 of the head portion 200B defines the first and second arms 202, 204 of the head portion 200B, with the receiving area 208 disposed therebetween. A bumper member 214 is shown disposed on the outer surface 210A of the first tab 210 to define the first abutment surface 216 of the head portion 200B. The first and second abutment surfaces 216, 225 are configured to cooperate to positively capture a cup portion of a portafilter assembly against opposing forces in a similar manner as described above with regards to portafilter assembly 130 shown engaged with holder assembly 70A against opposing forces F2, F3.

Figure 25:
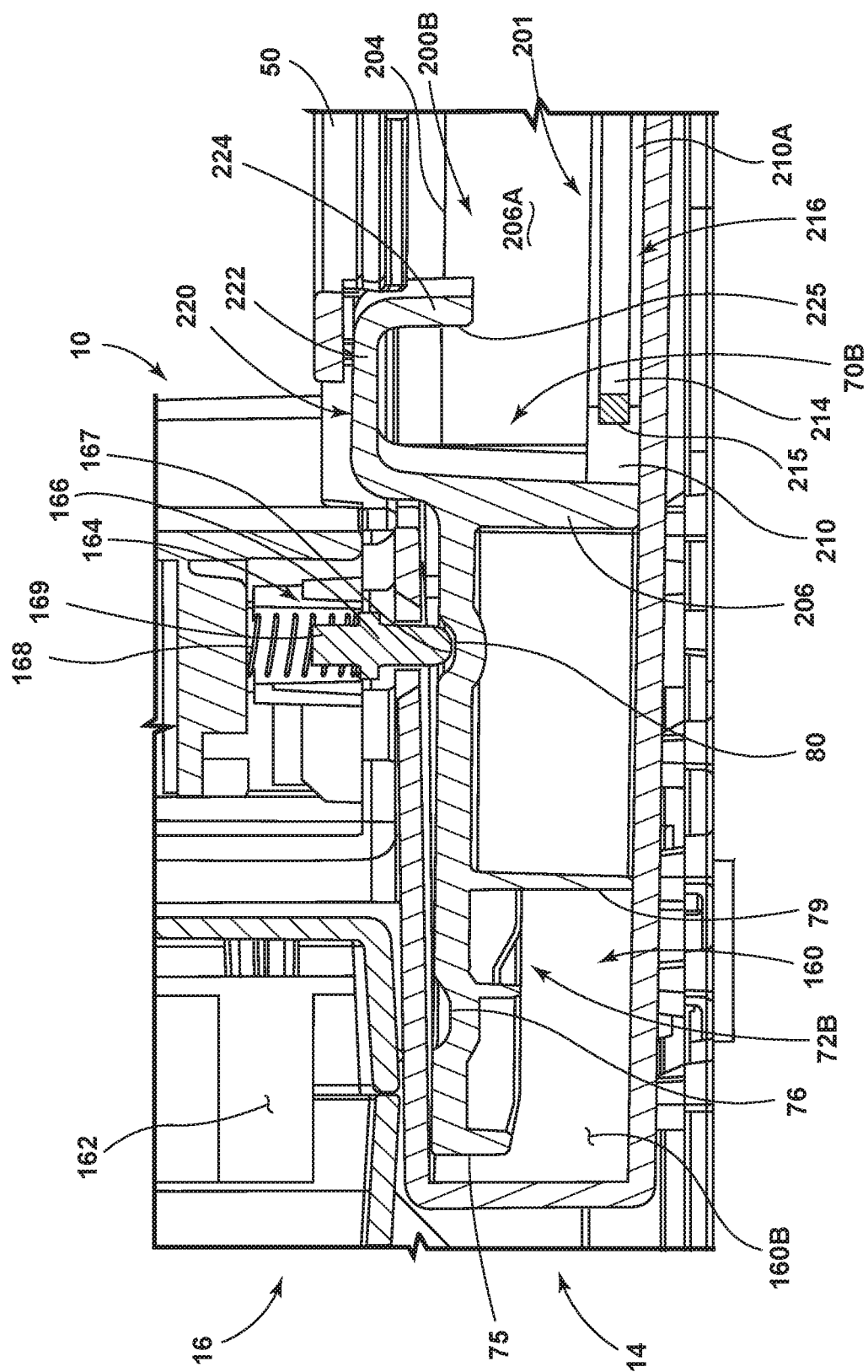
FIG. 25 is a fragmentary cross-sectional view of the support base of FIG. 4 taken at line XVI showing the holder assembly of FIG. 24 received in the storage cavity of the support base.

Referring now to FIG. 25, a cross-sectional view of the coffee grinding apparatus 10 is shown, wherein the storage cavity 160 of the support base 14 is revealed. As noted above, the storage cavity 160 is an internal cavity selectively accessed via the removable cover assembly 50. In the embodiment shown in FIG. 25, the holder assembly 70B is shown stored within the storage cavity 160. It is contemplated that the holder assembly 70B can be stored within the storage cavity 160 of the support base 14 of the coffee grinding apparatus 10 when not in use. In the interior portion 162 of the pedestal portion 16 of the coffee grinding apparatus 10, the first detent feature 164 is positioned, such that the distal end 167 of the detent member 166 is received within the second recess 80 disposed on the upper surface 73 of the stem 72B of the holder assembly 70B.

Figure 26B:
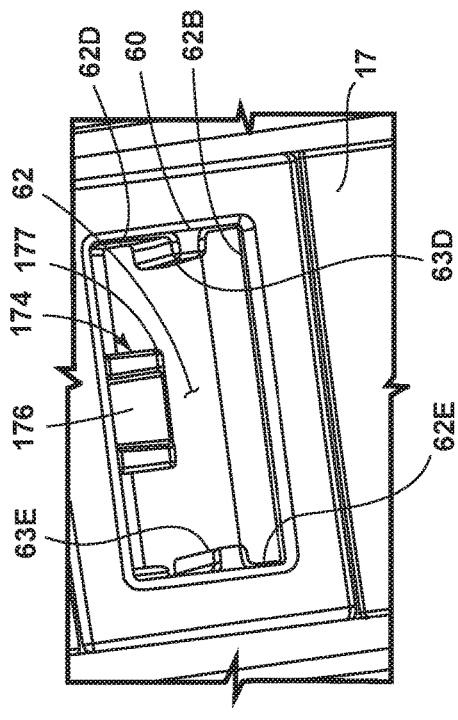
FIG. 26B is a fragmentary front perspective view of the receiving hub of FIG. 26A.
Figure 26A:
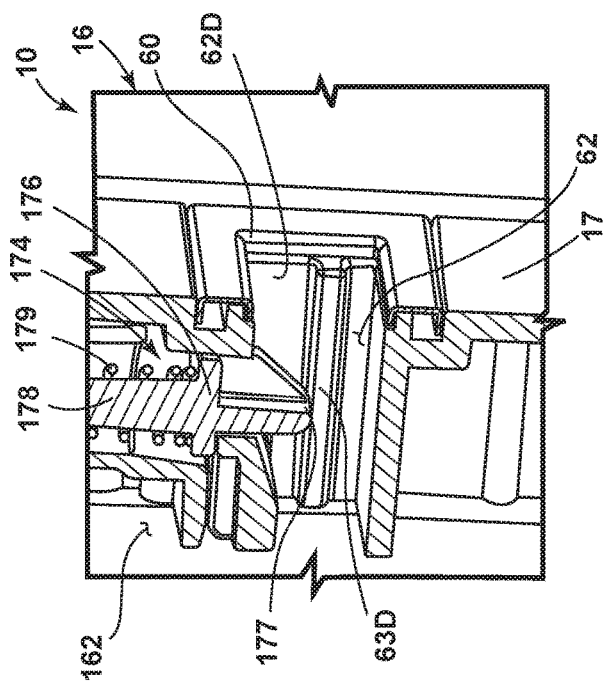
FIG. 26A is a fragmentary cross-sectional view of a receiving hub.

Referring now to FIG. 26A, a cross-sectional view of the coffee grinding apparatus 10 is shown, wherein the second detent feature 174 is illustrated within the interior portion 162 of the pedestal portion 16 of the coffee grinding apparatus 10. The detent member 176 of the second detent feature 174 is shown having the distal end 177 retractably positioned within the receiving hub 62 of the pedestal portion 16. The receiving hub 62 includes a first sidewall 62D having a first rail member 63D extending outwardly therefrom. Thus, the first rail member 63D extends into the receiving hub 62 from the first sidewall 62D. With reference to FIG. 26B, the receiving hub 62 further includes a second sidewall 62E having a second rail member 63E extending outwardly therefrom. Thus, the second rail member 63E extends into the receiving hub 62 from the second sidewall 62E to provide an opposed rail member to the first rail member 63D.

Figure 27:
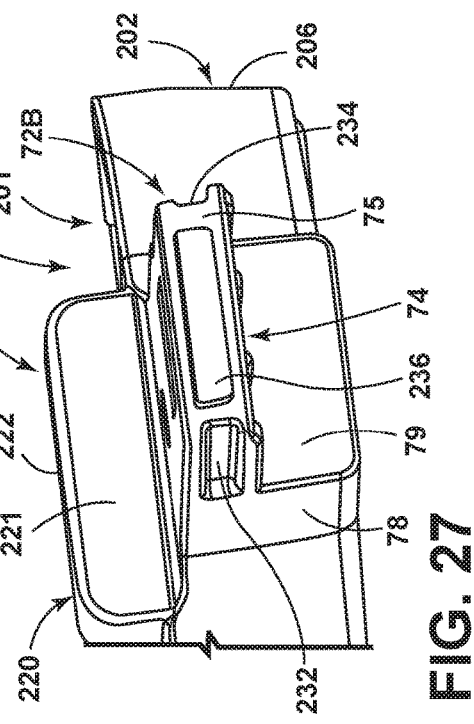
FIG. 27 is a fragmentary rear perspective view of a holder assembly according to another embodiment.

Referring now to FIG. 27, another embodiment of the holder assembly 70B is shown with dual inset portions 232, 234 disposed on opposite sides of the rear portion 74 of the stem 72B. As the rear portion 74 of the stem 72B of the holder assembly 70B is received in the receiving hub 62 of the coffee grinding apparatus, the first and second rail members 63D, 63E will be received in the respective inset portions 232, 234 of the rear portion 74 of the stem 72B of the holder assembly 70B. Thus, the receiving hub 62 includes the retractable detent feature 174, and may include the inwardly extending first and second rail members 63D, 63E as well as the upwardly protruding engagement feature 63 (FIGS. 16, 17) to help secure the rear portion 74 of the stem 72B of the holder assembly 70B within the receiving hub 62. In the embodiment shown in FIG. 27, the distal end 75 of the holder assembly 70B includes a magnetic member 236 disposed thereon. As used herein, the term "magnetic member" is used to describe a magnetic material that will have an associated counterpart to which it is magnetically attracted. Thus, the magnetic member 236 may include a metal material, such as a metal plate, or may also include a magnet that generates a magnetic field. It is further contemplated that the magnet member 236 can be an exposed member which would physically contact its associated counterpart, or can be an embedded magnetic member that is concealed by the holder assembly 70B. The magnetic forces in a magnetic coupling system of the present concept can also be formed between a grouping of magnetic members and a magnetically attractive material, such as iron, nickel, cobalt and other like metallic materials. It is further contemplated that the magnetic member 236 could be a permanent magnet which are termed "permanent" in that they create their own magnetic field which persists against influences which might otherwise demagnetize them.

Figure 28:
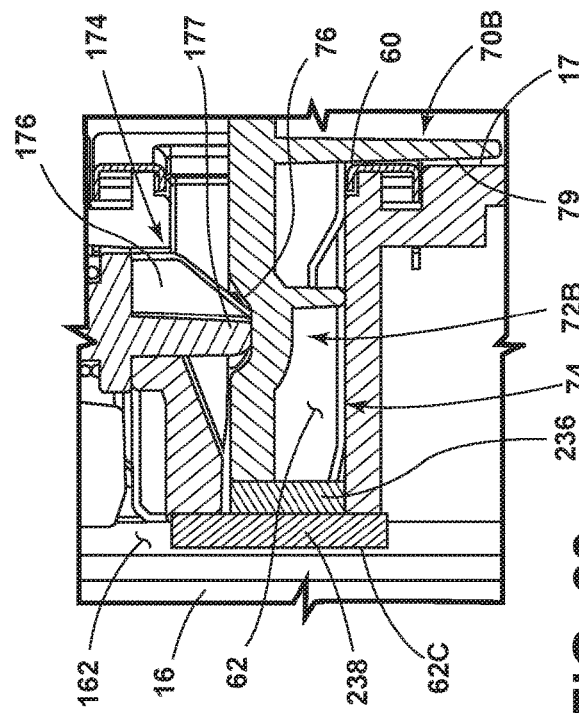
FIG. 28 is a fragmentary cross-sectional view of the holder assembly of FIG. 27 received in a receiving hub of FIGS. 26A and 26B.

Referring now to FIG. 28, the holder assembly 70B is shown with the rear portion 74 thereof received within the receiving hub 62 of the coffee grinding apparatus 10. As shown in FIG. 28, the detent member 176 of the second detent feature 174 is shown with the distal end 177 thereof received in the first recess 76 of the stem 72B of the holder assembly 70B. In the rear wall 62C of the receiving hub 62, another magnetic member 238 is disposed. Magnetic member 238 is contemplated to be a reciprocal magnetic member to magnetic member 236 positioned on the stem 72B of the holder assembly 70B. Thus, it is contemplated that the magnetic members 236, 238 may both be capable of generating opposite magnetic fields that attract one another. Further, it is catapulted that the magnetic members 236, 238 may include one magnetic field generating material, along with one magnetically attractive material. In the embodiment shown in FIG. 28, the magnetic member 236 of the holder assembly 70B is shown in contact with the magnetic member 238 of the receiving hub 62. In this way, the magnetic member 238 of the receiving hub 62 is magnetically coupled to the magnetic member 236 of the holder assembly 70B to further secure the holder assembly 70B within the receiving hub 62. This magnetic coupling also provides tactile feedback to the user that the holder assembly 70B is fully received within the receiving hub 62 of the coffee grinding apparatus 10.

Referring now to FIGS. 29A and 29B, a portafilter assembly is shown received in a holder assembly 70A previously described above with reference to FIG. 21. The holder assembly 70A of FIGS. 29A and 29B differs from the holder assembly 70A (FIG. 21) described above in that the holder assembly 70A of FIGS. 29A and 29B does not include a second tab 212 disposed on the head portion 200 of the holder assembly 70A. As specifically shown in FIG. 29A, a portafilter assembly 130C includes a cup portion 132 having a compartment 136 of a first volume. The first volume of the portafilter assembly 130C is generally determined by the contours of the sidewall 140 of the cup portion 132. As shown in FIG. 29A, the second abutment surface 225 of the bracket 220 of the holder assembly 70A engages the inner surface 140A of the sidewall 140 of the cup portion 132 of the portafilter assembly 130. This engagement between the inner surface 140A and the second abutment surface 225 of the holder assembly 70A combats the outwardly directed force indicated by the arrow F2, which, as noted above, is a resulting force of the downwardly directed force F1 provided by the weight of the portafilter assembly 130C. The inwardly directed force indicated by the arrow F3, also a resulting force of the downwardly directed force F1 provided by the weight of the portafilter assembly 130C, draws the outer surface 140B of the sidewall 140 of the cup portion 132 of the portafilter assembly 130C into engagement with the first abutment surface 216 of the first tab 210 of the head portion 200 of the holder assembly 70A. In this way, the opposing forces indicated by arrows F2 and F3 are combated by the engagement of the cup portion 132 of the portafilter assembly 130C with the first and second abutment surfaces 216, 225 of the holder assembly 70A. Thus, the outwardly facing first abutment surface 216 of the head portion 200 faces a first direction that is opposed to the direction indicated by arrow F3. Similarly, the inwardly facing second abutment surface 225 of the bracket 220 faces a second direction that is opposed to the direction indicated by arrow F2. Thus, the first direction of the outwardly facing first abutment surface 216 of the head portion 200 is an opposed direction to the second direction of the inwardly facing second abutment surface 225 of the bracket 220.

A similar arrangement is shown in FIG. 29B, wherein a portafilter assembly 130D is engaged with the holder assembly 70A, and includes a cup portion 132 having a compartment 136 of a second volume. The second volume of the portafilter assembly 130D is illustrated in FIG. 29B as being larger than the first volume of the portafilter assembly 130C illustrated in FIG. 29A. The second volume of the compartment 136 of the portafilter assembly 130D is also generally determined by the contours of the sidewall 140 of the cup portion 132. The opposing forces indicated by arrows F2 and F3 are combated by the engagement of the cup portion 132 of the portafilter assembly 130D with the first and second abutment surfaces 216, 225 of the holder assembly 70A. Thus, the holder assembly 70A of the present concept is configured to support and engage portafilter assemblies (such as portafilter assemblies 130C, 130D and other like assemblies) having various sized cup portions and corresponding compartments, such that ground coffee a various amounts can be provided to fill available capacities of a portafilter assembly engaged with the holder assembly 70A.

Figure 30:
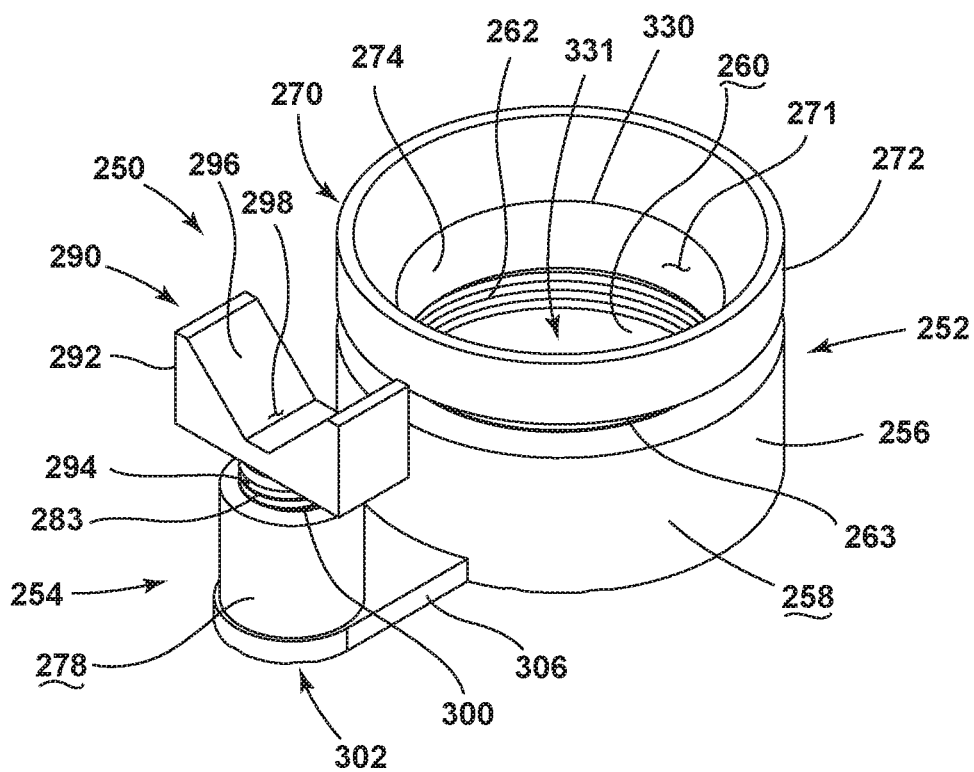
FIG. 30 is a top perspective view of a holder assembly according to an embodiment of the present concept.
Figure 31:
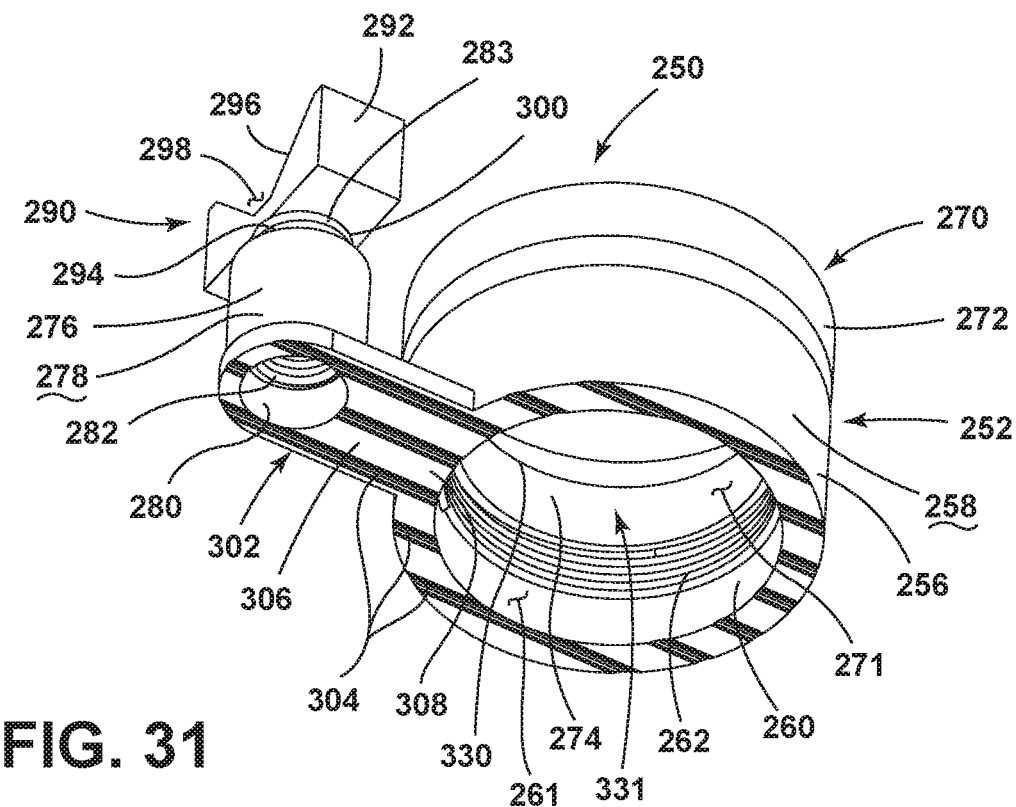
FIG. 31 is a bottom perspective view of the holder assembly of FIG. 30.
Figure 37:
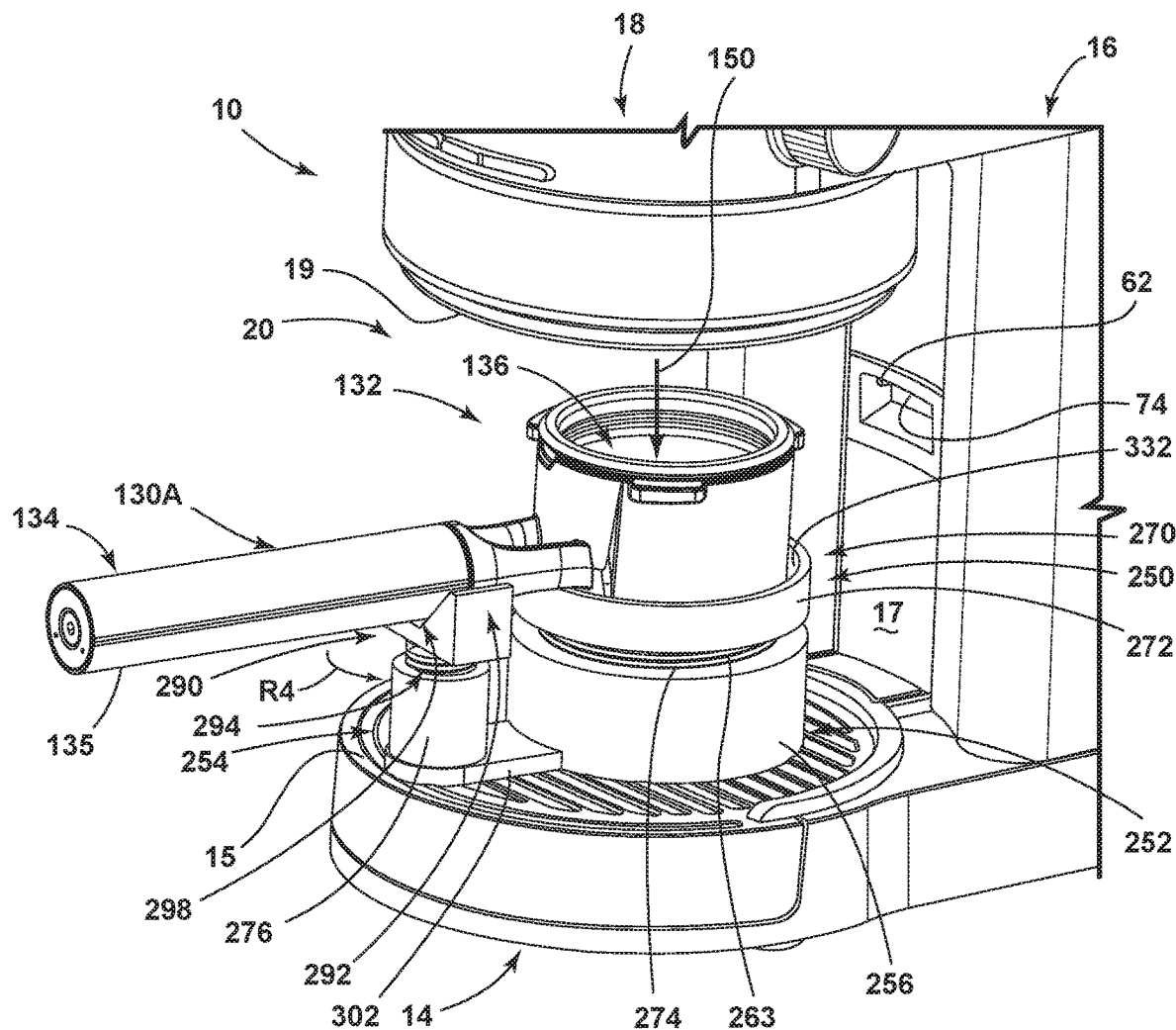
FIG. 37 is a top perspective view of the holder assembly and portafilter assembly of FIG. 35 received in the receiving area of the coffee grinding apparatus of FIG. 1.
Figure 38:
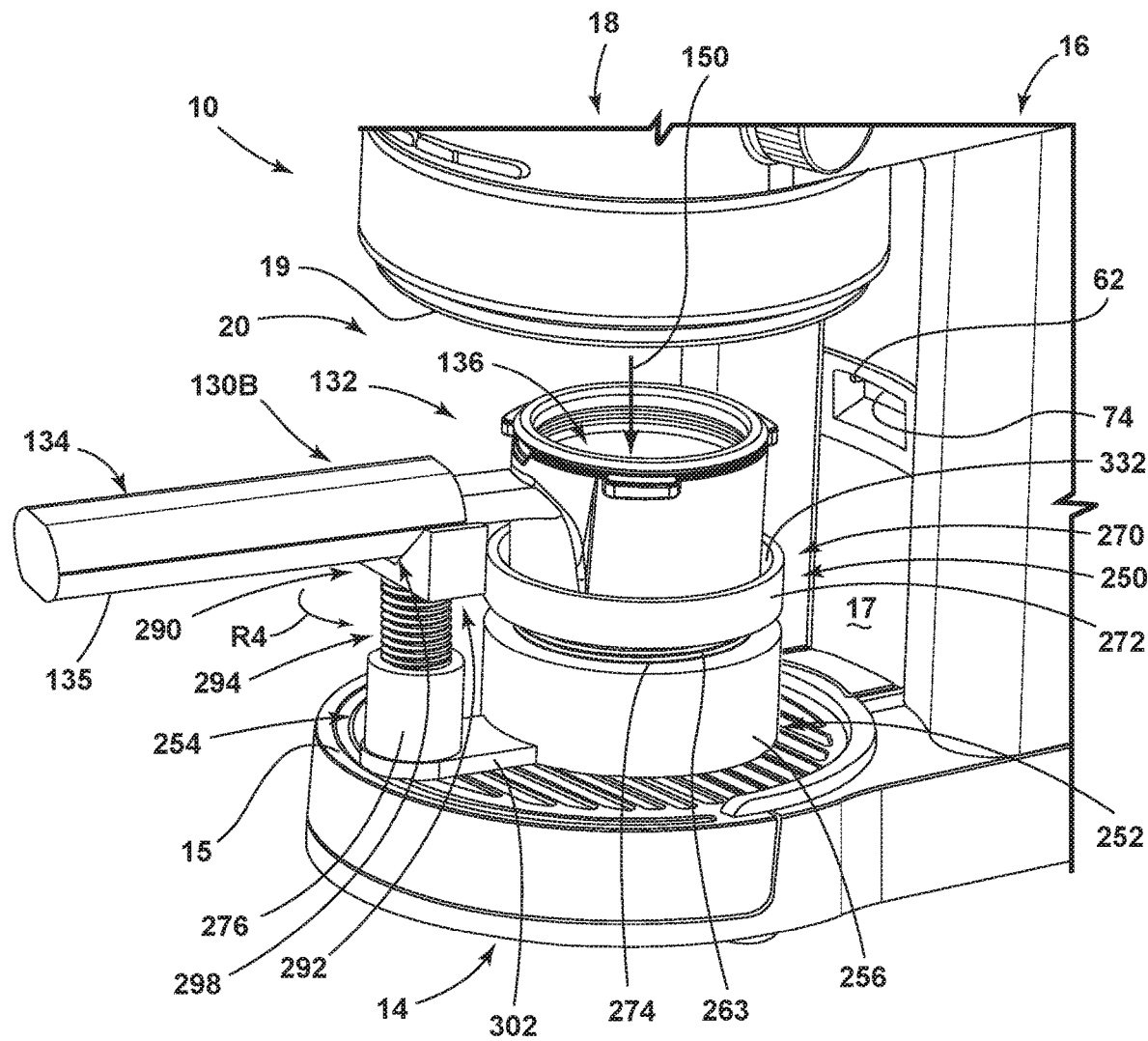
FIG. 38 is a top perspective view of the holder assembly of FIG. 37 supporting the portafilter assembly of FIG. 13 within the receiving area of the coffee grinding apparatus.

Referring now to FIGS. 30 and 31, another embodiment of a holder assembly 250 is shown for use with the coffee grinding apparatus 10 (FIGS. 1 and 2). Specifically, the holder assembly 250 is configured to be removeably received in the receiving area 20 of the coffee grinding apparatus 10, as best shown in FIGS. 37 and 38. As shown in FIGS. 30 and 31, the holder assembly 250 includes a first mounting hub 252 and a second mounting hub 254. The first mounting hub 252 includes an upwardly extending hub body 256 with an annular outer surface 258 and an annular inner surface 260, such that the hub body 256 generally defines an upwardly extending cylinder having a hollow interior portion 261. The annular inner surface 260 of the first mounting hub 252 includes a threaded portion 262. In FIGS. 30 and 31, a holder member 270 is operably coupled to the first mounting hub 252. The holder member 270 includes an upper collar portion 272 that surrounds an open aperture 330 and a hollow interior portion 271. The hollow interior portion 261 of the first mounting hub 252 and the hollow interior portion 271 of the holder member 270 align to define a combined hollow interior portion 331 as best shown in FIG. 31. The upper collar portion 272 of the holder member 270 is disposed above a lower mounting portion 274 that is rotatably coupled to the first mounting hub 252 at the annular inner surface 260 of the first mounting hub 252. As shown, the lower mounting portion 274 of the holder member 270 includes a threaded portion 263 that is complimentary to the threaded portion 262 of the first mounting hub 252. In this way, the holder member 270 is vertically adjustable relative to the first mounting hub 252 as threadingly coupled thereto at the respective threaded portions 262, 263.

As further shown in FIGS. 30 and 31, the second mounting hub 254 is spaced-apart from the first mounting hub 252 and includes an upwardly extending hub body 276 with an annular outer surface 278 and an annular inner surface 280. Thus, much like the first mounting hub 252, the hub body 276 of the second mounting hub 254 generally defines an upwardly extending cylinder. As specifically shown in FIG. 31, the annular inner surface 280 of the second mounting hub 254 includes a threaded portion 282. As further shown in FIGS. 30 and 31, a brace member 290 is operably coupled to the second mounting hub 254. The brace member 290 includes a pedestal portion 292 that is disposed over a mounting post 294. The pedestal portion 292 of the brace member 290 includes an upper surface 296 having an inwardly disposed notch 298. The mounting post 294 of the brace member 290 is rotatably coupled to the second mounting hub 254 at the annular inner surface 280 of the second mounting hub 254. As further shown in FIGS. 30 and 31, the mounting post 294 of the brace member 290 includes an annular outer surface 300 having a threaded portion 283 that is complementary to the threaded portion 282 of the annular inner surface 280 of the second mounting hub 254. In this way, the brace member 290 is vertically adjustable relative to the second mounting hub 254 as threadingly coupled thereto at the respective threaded portions 282, 283.

With further reference to FIGS. 30 and 31, the holder assembly 250 includes a base plate 302 from which the first and second mounting hubs 252, 254 upwardly extend. Specifically, the first and second mounting hubs 252, 254 are spaced-apart from each other a fixed distance defined by a tab 306 of the base plate 302 that interconnects the first and second mounting hubs 252, 254. It is contemplated that the base plate 302 and the first and second mounting hubs 252, 254 may be integrally formed to define a unitary or monolithic structure. In the embodiment shown in FIG. 31, the base plate 302 includes a plurality of ribbed sections 304 that may be etched into a bottom surface 308 of the base plate 302.

Figure 32:
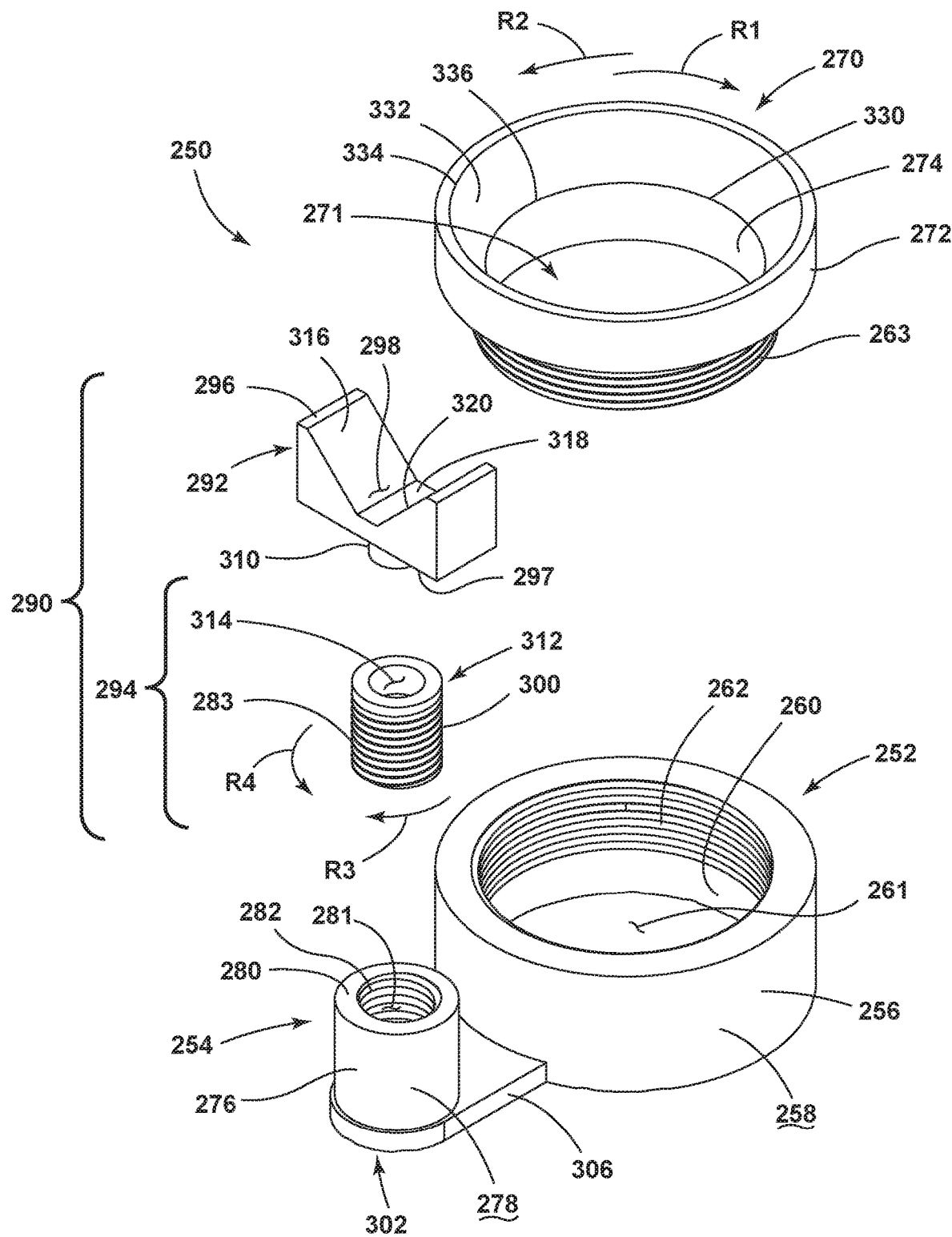
FIG. 32 is an exploded top perspective view of the holder assembly of FIG. 30.

Referring now to FIG. 32, the holder assembly 250 is shown in an exploded view. In the exploded view of FIG. 32, the brace member 290 is shown having the pedestal portion 292 having a mounting boss 310 downwardly extending from a lower surface 297 of the pedestal portion 292. The mounting boss 310 is configured to be received within an interior portion 314 of a threaded connector 312 to define the mounting post 294 of the brace member 290. Thus, the annular outer surface 300 and threaded portion 283 of the mounting post 294 is defined by the threaded connector 312 as positioned on the mounting boss 310 of the pedestal portion 292. As noted above, the mounting post 294 of the brace member 290 is configured to be received in and threadingly engaged with the threaded portion 282 of the annular inner surface 280 of the second mounting hub 254 that surrounds a hollow interior portion 281 of the second mounting hub 254.

With further reference to FIG. 32, the pedestal portion 292 of the brace member 290 includes the upper surface 296 which is defined by first and second angled portions 316, 318 having a generally flat portion 320 disposed therebetween. The first and second angled portion 316, 318 are angled inwardly towards one another at opposed angles to define the notch 298 therebetween along with the generally flat portion 320. It is contemplated that multiple embodiments of a notch may be provided along the upper surface 296 of the pedestal portion 292, such as a continuously curved notch, a V-shaped notch or a U-shaped notch, for example. In use, the notch 298 defines a cradle for receiving and retaining a handle of a portafilter assembly during a coffee grinding procedure, as further described below.

With further reference to FIG. 32, the holder member 270 is shown having the collar portion 272 surrounding the open aperture 330 and the hollow interior portion 271. The collar portion 272 is disposed above the mounting portion 274 and includes an annular inner surface 332 that is disposed at an inward angle. Thus, the annular inner surface 332 of the collar portion 272 is an angled inner surface that tapers inwardly towards the hollow interior portion 271 from an upper portion 334 of the annular inner surface 332 to a lower portion 336 of the annular inner surface 332. In this way, the collar portion 272 defines a receiving cradle for a cup portion of a portafilter assembly, wherein the cup portion of a portafilter assembly may abut the annular inner surface 332 of the collar portion 272 as supported thereon, as further described below.

With further reference to FIG. 32, the mounting portion 274 of the holder member 270 includes the threaded portion 263 that is complementary to the threaded portion 262 of the first mounting hub 252. In this way, the holder assembly 270 can be threadingly engaged with the first mounting hub 252 at the respective threaded portions 262,263. Thus, rotational movement of the holder member 270 in a first direction R1 engages the holder member 270 with the first mounting hub 252 in a threaded engagement, such that the holder member 270 and the first mounting hub 252 are coupled to one another, as shown in FIGS. 30 and 31. Once threadingly engaged and coupled to one another, further rotation of the holder member 270 along the first direction R1 lowers the upper collar portion 272 relative to the first mounting hub 252. Conversely, rotational movement of the holder member 270 in a second direction R2 that is opposed to the first direction R1 raises the upper collar portion 272 relative to the first mounting hub 252. In this way, the holder member 270 is vertically adjustable as coupled to the first mounting hub 252 by a threaded engagement therebetween. Further rotational movement of the holder member 270 in the second direction R2 will release the holder member 270 from engagement with the first mounting hub 252. In this way, the holder member 270 is releasably coupled to the first mounting hub 252. It is also contemplated that the holder member 270 and the first mounting hub 252 may be reverse threaded, so long as rotational movement in the first and second directions allows for vertical adjustment of the holder member 270 relative to the first mounting hub 252.

Figure 33:
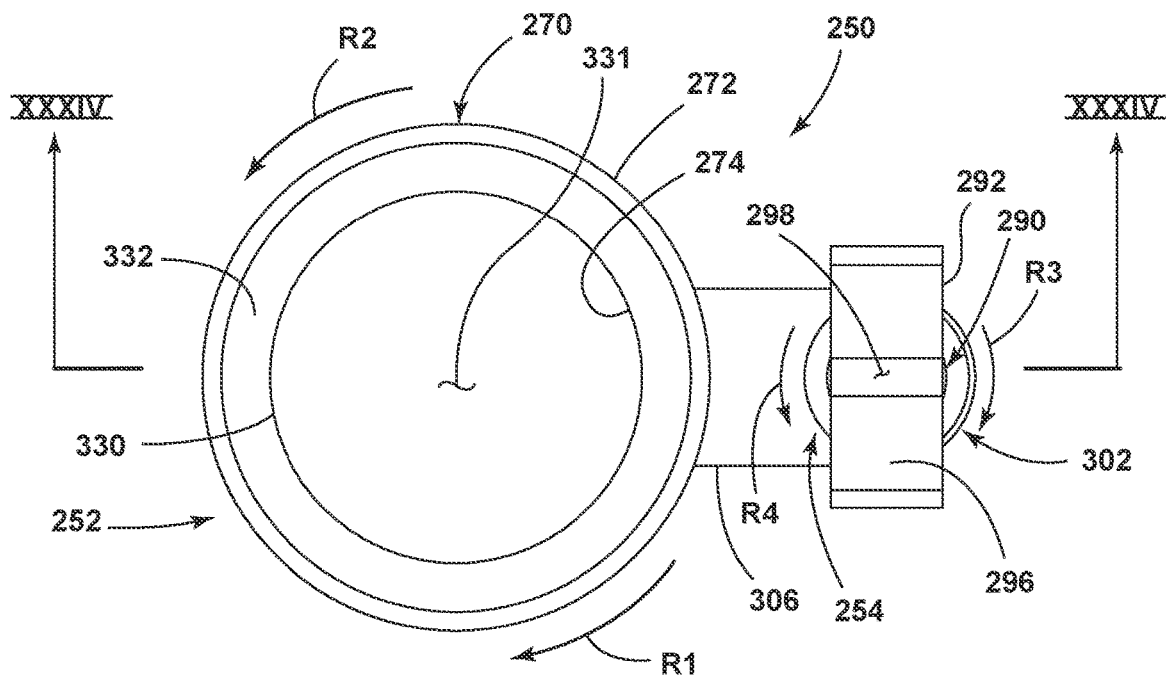
FIG. 33 is a top plan view of the holder assembly of FIG. 30.

Referring now to FIG. 33, the holder assembly 250 is shown from a top perspective view with the first and second rotational directions R1, R2 of the holder member 270 shown in opposed directions for vertical adjustment of the holder member 270 relative to the first mounting hub 252. Similarly, the view of the holder assembly 250 provided in FIG. 33 shows the brace member 290 operably coupled to the second mounting hub 254 for rotational movement along the opposed directions R3, R4 for vertical adjustment of the same.

Figure 34:
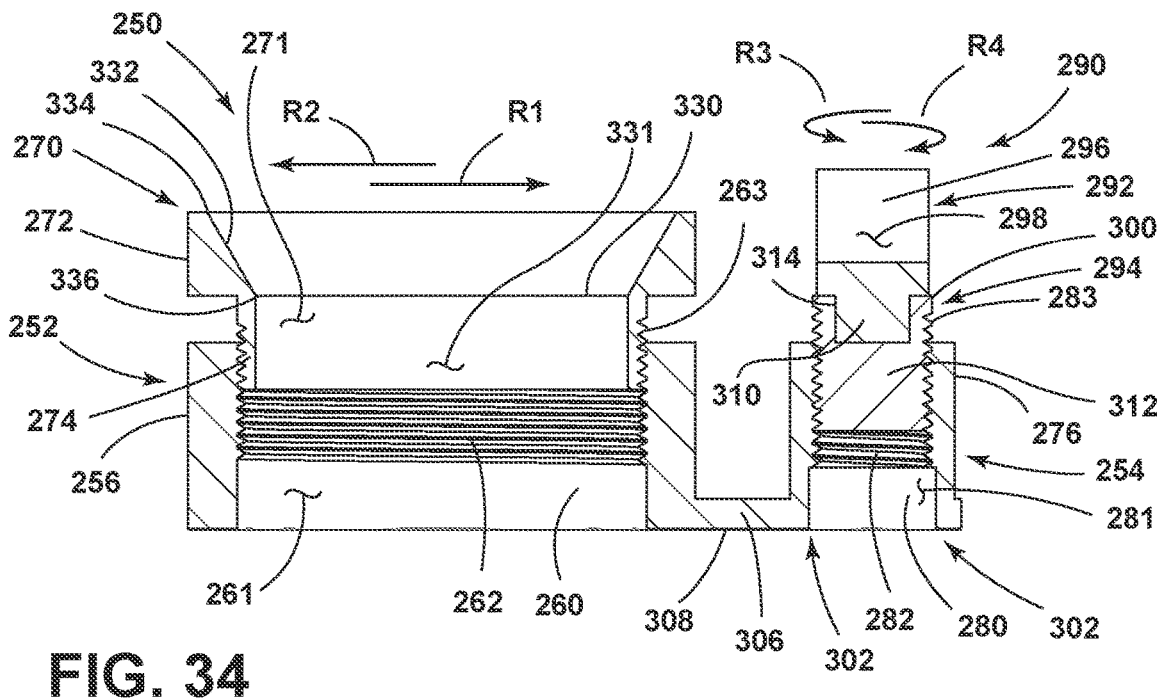
FIG. 34 is a cross-sectional view of the holder assembly of FIG. 33 taken at line XXXIV.

Referring now to FIG. 34, the brace member 290 is shown as being threadingly engaged with the second mounting hub 254 at the respective threaded portions 282, 283. Specifically, the annular outer surface 300 of the mounting post 294 includes the threaded portion 283 that is a complementary or reciprocal threaded portion to the threaded portion 282 of the annular inner surface 280 of the second mounting hub 254. Thus, rotational movement of the brace member 290 in the first direction R3 lowers the pedestal portion 292 relative to the second mounting hub 254, as the brace member 290 and the second mounting hub 254 become more threadingly engaged. Conversely, rotational movement of the brace member 290 in the second direction R4, that is opposed to the first direction R3, raises the pedestal portion 292 of the brace member 290. Continued rotation of the brace member 290 along the second direction R4 is contemplated to decouple the brace member 290 from the second mounting hub 254. In this way, the brace number 290 and the second mounting hub 254 are removably coupled to one another. The annular inner surface 280 of the second mounting hub 254 defines the parameters of the hollow interior portion 281 of the second mounting hub 254 in which the mounting post 294 of the brace member 290 is at least partially received in a threaded engagement.

Similarly, in the cross-sectional view of FIG. 34, the lower mounting portion 274 of the holder member 270 is rotatably coupled to the first mounting hub 252 at the annular inner surface 260 of the first mounting hub 252. As shown, the lower mounting portion 274 of the holder member 270 includes a threaded portion 263 that is complimentary to the threaded portion 262 of the first mounting hub 252. In this way, the holder member 270 is vertically adjustable relative to the first mounting hub 252 as threadingly coupled thereto at the respective threaded portions 262, 263. The collar portion 272 of the holder member 270 surrounds the hollow interior portion 271 of the holder member 270. The annular inner surface 260 of the first mounting hub 252 defines the parameters of the hollow interior portion 261 of the first mounting hub 252 in which the mounting portion 274 of the holder member 270 is at least partially received in a threaded engagement. In this way, the hollow interior portion 271 of the holder member 270 aligns with the hollow interior portion 261 of the first mounting hub 252 when the holder member 270 is threadingly engaged with the first mounting hub 252 to define the combined hollow interior portion 331. As further shown in FIG. 34, only portions of the annular inner surfaces 260, 280 of the first and second mounting hubs 252, 254, respectively, include threaded portions 262, 282. It is contemplated that the threaded portions 262, 282 of the respective first and second mounting hubs 252, 254 may cover an entirety of the annual inner surfaces 260, 280, respectively.

As further shown in FIG. 34, the annular inner surface 332 of the collar portion 272 is shown disposed at an inwardly directed angle from the upper portion 334 of the annular inner surface 332 to the lower portion 336 of the annular inner surface 332.

Figure 35:
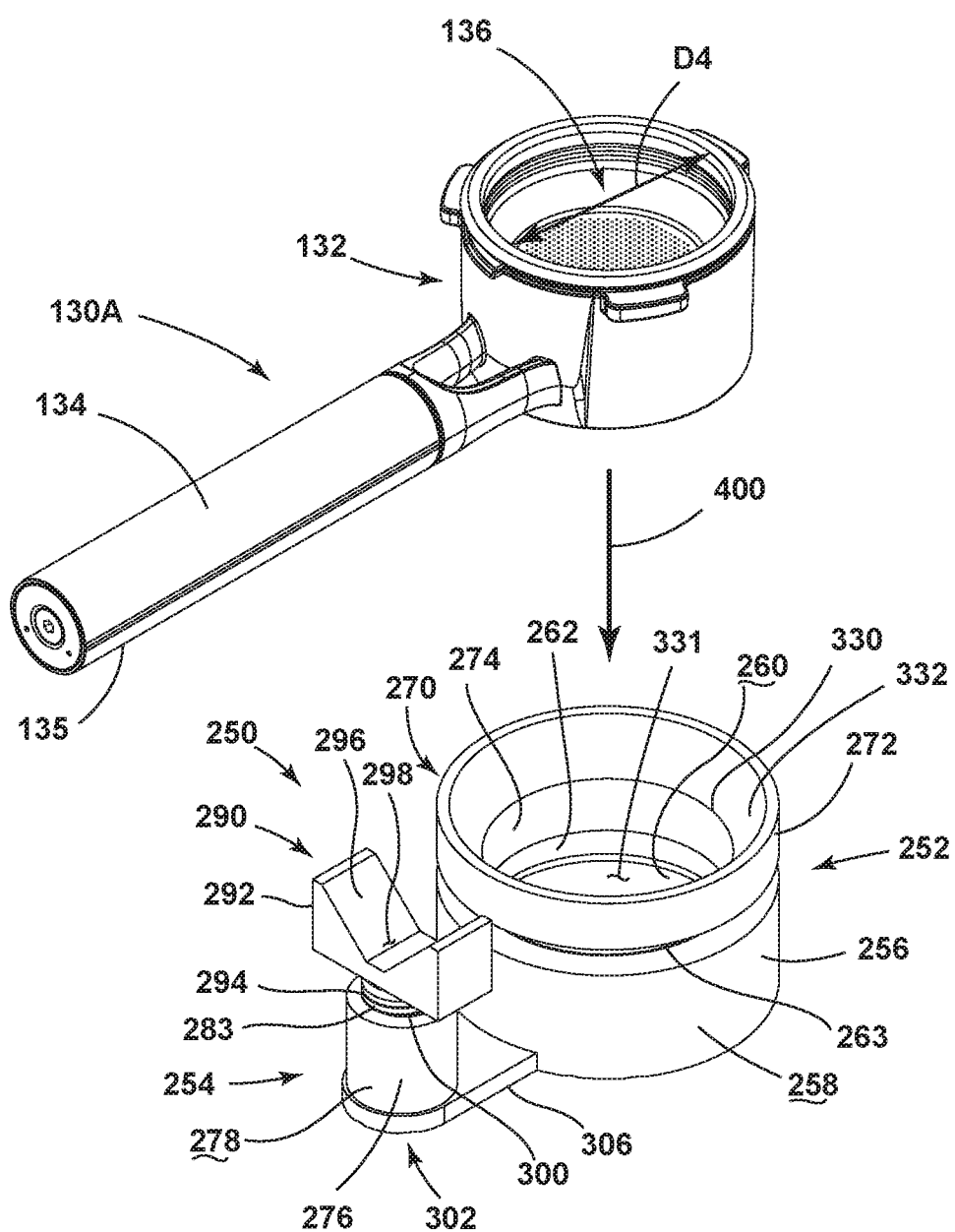
FIG. 35 is a top perspective view of the holder assembly of FIG. 30 having the portafilter assembly of FIG. 10 exploded away therefrom.
Figure 36:
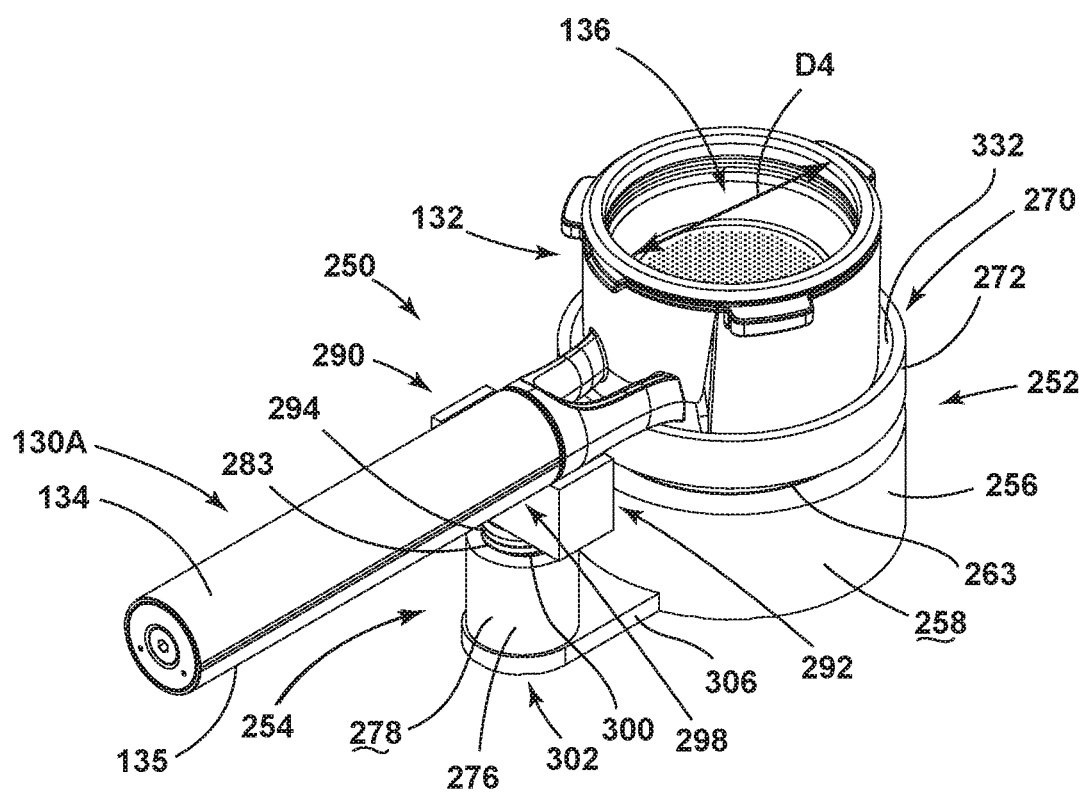
FIG. 36 is a top perspective view of the holder assembly of FIG. 35 supporting the portafilter assembly of FIG. 35.

Referring now to FIG. 35, the portafilter assembly 130A, described above, is shown disposed above the holder assembly 250. The portafilter assembly 130A is configured for vertical reception on the holder assembly 250 in the direction as indicated by arrow 400, wherein the cup portion 132 of the portafilter assembly 130A is configured to be received within the collar portion 272 of the holder member 270, as shown in FIG. 36. It is contemplated that the cup portion 132 abuts the annular inner surface 332 of the collar portion 272 of the holder member 270, such that the cup portion 132 is cradled within the cradle defined by the collar portion 272 and the annular inner surface 332 thereof. With the beveled or angled annular inner surface 332 of the collar portion 272, the collar portion 272 is configured to support portafilter assemblies having various sized cup portions. In this way, the angled annular inner surface 332 of the collar portion 272 acts as a centering feature for the cup portion 132 of the portafilter assembly 130A as received thereon. As noted above, the cup portion 132 of the portafilter assembly 130A includes a diameter D4 of approximately 58 mm.

As further shown in FIG. 35, the handle portion 134 of the portafilter assembly 130A is shown disposed above the brace member 290 of the holder assembly 250. The handle portion 134 of the portafilter assembly 130A is configured to be received on the pedestal portion 292 of the brace member 290 at an underside 135 thereof, as the portafilter assembly 130A is vertically loaded on the holder assembly 250 in the direction as indicated by arrow 400. With reference to FIG. 36, the handle portion 134 of the portafilter assembly 130A is shown cradled within the notch 298 of the pedestal portion 292 of the brace member 290. The configuration of the notch 298 with the angled portions 316, 318 acts as a centering feature for the handle portion 134 of the portafilter assembly 130A as received on the holder assembly 250.

Referring now to FIG. 37, the holder assembly 250 is shown supporting the portafilter assembly 130A in the receiving area 20 of the coffee grinding apparatus 10. The base plate 302 of the holder assembly 250 is supported on the support surface 15 of the support base 14 of the coffee grinding apparatus 10. The position of the holder assembly 250 on the support base 14 in FIG. 37 aligns the cup portion 132 of the portafilter assembly 130A to receive ground coffee along the path as indicated by arrow 150.

Referring now to FIG. 38, the holder assembly 250 is again shown supporting a portafilter assembly 130B in the receiving area 20 of the coffee grinding apparatus 10. In relation to the portafilter assembly 130A shown in FIG. 37, the portafilter assembly 130B includes a handle portion 134 that is disposed at a higher location on the cup portion 132 as compared to portafilter assembly 130A. Thus, it is contemplated that the brace member 290 was rotated in the direction as indicated by arrow R4 to raise the brace member 290, and the pedestal portion 292 thereof, when compared to the position of the brace member 290 shown in FIG. 37. By adjusting the position of the brace member 290, the holder assembly 250 can support the portafilter assembly 130B and a substantially horizontal manner. As noted above, the cup portion 132 of the portafilter assembly 130B includes a diameter D5 (FIG. 13) which may differ from the diameter D4 of the portafilter assembly 130A. Different diameters for a cup portion of a protafilter assembly are adequately supported by the angled inner annular surface 332 of the holder member 270 acting as a centering feature for supporting a cup portion of a protafilter assembly. As such, the holder assembly 250 of the present concept provides for adjustability at the holder member 270 and the brace member 290 for accommodating portafilter assemblies of various configurations.

While threading engagements between parts provides for the vertical adjustability of the component parts of the holder assembly 250, it is contemplated that other adjustment means can be used to vertically adjust the holder member 270 and the brace member 290, such as a ratcheting system, a ball and catch design, as well as a threaded design with largely spaced-apart threads that move the holder member 270 and the brace member 290 more rapidly than a tightly threaded engagement.

One aspect of the present concept includes a coffee grinding apparatus having a support base with a storage cavity and a removable cover assembly for selectively closing an opening to the storage cavity, wherein the removable cover assembly includes a support surface as positioned over the opening to the storage cavity. A pedestal portion extends upwardly from the support base and includes a first surface disposed adjacent to the support surface of the cover assembly. The first surface of the pedestal portion further includes an access aperture opening into an inwardly extending receiving hub. A motor housing is supported on and extends outwardly from the pedestal portion. A portion of the motor housing is disposed above and spaced-apart from the support surface of the cover assembly to define a receiving area therebetween. A holder assembly includes a stem and first and second arms spaced-apart from one another and outwardly extending from the stem to define a receiving area therebetween. Upper and lower tabs are disposed on the first arm and inwardly extend into the receiving area between the first and second arms. Upper and lower tabs are disposed on the second arm and inwardly extend into the receiving area between the first and second arms. The upper and lower tabs of the second arm are configured in an opposed manner relative to the upper and lower tabs of the first arm. The upper tab of the first arm is spaced-apart from the upper tab of the second arm a first distance, and the lower tab of the first arm is spaced-apart from the lower tab of the second arm a second distance that is different than the first distance.

According to another aspect of the present disclosure, the upper and lower tabs disposed on the first arm are vertically spaced-apart from one another.

According to another aspect of the present disclosure, the upper and lower tabs disposed on the second arm are vertically spaced-apart from one another.

According to another aspect of the present disclosure, the stem of the holder assembly is removeably received in the receiving hub of the pedestal portion.

According to another aspect of the present disclosure, the holder assembly is removeably received in the storage cavity of the support base.

According to another aspect of the present disclosure, the receiving area disposed between the first and second arms of the holder assembly is positioned above the support base when the stem of the holder assembly is received in the receiving hub of the pedestal portion.

According to another aspect of the present disclosure, a detent feature is disposed within the pedestal portion and includes a retractable detent member, wherein a distal end of the retractable detent member extends into the receiving hub and retracts from the receiving hub towards an interior portion of the pedestal portion.

According to another aspect of the present disclosure, the stem of the holder assembly includes a recess disposed on an upper surface thereof, and further wherein the distal end of the retractable detent member of the detent feature is received in the recess of the holder assembly when the stem of the holder assembly is received in the receiving hub.

According to another aspect of the present disclosure, a detent feature is disposed within the pedestal portion and includes a retractable detent member, wherein a distal end of the retractable detent member extends into the storage cavity of the support base and retracts from the storage cavity of the support base towards an interior portion of the pedestal portion.

According to another aspect of the present disclosure, the stem of the holder assembly includes a recess disposed on an upper surface thereof, and further wherein the distal end of the retractable detent member of the detent feature is received in the recess of the holder assembly when the holder assembly is received in the storage cavity of the support base.

According to another aspect of the present disclosure, the stem of the holder assembly includes first and second recesses spaced-apart from one another.

According to another aspect of the present disclosure, a first detent feature is disposed within the pedestal portion and includes a retractable detent member, wherein a distal end of the retractable detent member extends into the storage cavity of the support base and retracts from the storage cavity of the support base towards an interior portion of the pedestal portion.

According to another aspect of the present disclosure, a second detent feature is disposed above the first detent feature within the pedestal portion, wherein the second detent feature includes a retractable detent member having a distal end that extends into the receiving hub and retracts from the receiving hub towards the interior portion of the pedestal portion.

According to yet another aspect of the present disclosure, the distal end of the retractable detent member of the first detent feature is received in the second recess of the holder assembly when the holder assembly is received in the storage cavity of the support base, and further wherein the distal end of the retractable detent member of the second detent feature is received in the first recess of the holder assembly when the stem of the holder assembly is received in the receiving hub.

Another aspect of the present concept includes a holder assembly having an outwardly extending stem. First and second arms are spaced-apart from one another and outwardly extend from a front portion of the stem to define an open receiving area between the first and second arms. The first and second arms each include opposed upper and lower tabs vertically spaced-apart from one another and extending inwardly into the open receiving area. The upper tab of the first arm is spaced-apart from the upper tab of the second arm a first distance. The lower tab of the first arm is spaced-apart from the lower tab of the second arm a second distance that is greater than the first distance.

According to another aspect of the present disclosure, a slot is disposed between the first and second arms and the stem, wherein the slot includes a bottom surface.

According to yet another aspect of the present disclosure, a plurality of fins extend downwardly from the bottom surface of the slot.

Another aspect of the present concept includes a holder assembly for a coffee grinding apparatus, wherein the holder assembly includes a stem having front and rear portions with a first arm outwardly extending from the front portion of the stem. The first arm includes a sidewall having an inner surface with first and second tabs vertically spaced-apart from one another and inwardly extending from the outer surface of the sidewall of the first arm. A second arm outwardly extends from the front portion of the stem and includes a sidewall having an inner surface with first and second tabs vertically spaced-apart from one another and inwardly extending from the outer surface of the sidewall of the second arm. The first and second tabs of the second arm are configured in an opposed manner relative to the first and second tabs of the first arm to define a receiving area therebetween. The first and second tabs of the first arm and the first and second tabs of the second arm extend into the receiving area.

According to another aspect of the present disclosure, the sidewall of the first arm is an upright sidewall having upper and lower portions from which the first and second tabs of the first arm inwardly extend, respectively, and further wherein the sidewall of the second arm is an upright sidewall having upper and lower portions from which the first and second tabs of the second arm inwardly extend, respectively.

According to another aspect of the present disclosure, the first tab of the first arm is spaced-apart from the first tab of the second arm a first distance, and further wherein the second tab of the first arm is spaced-apart from the second tab of the second arm a second distance that is different than the first distance.

Another aspect of the present concept includes a coffee grinding apparatus having a support base with a storage cavity. A pedestal portion extends upwardly from the support base and includes a first surface with an access aperture opening into a receiving hub. A holder assembly includes a stem having front and rear portions and a head portion disposed on the front portion of the stem. The head portion includes a sidewall with upper and lower portions, wherein the sidewall is outwardly curved to define first and second arms spaced-apart from one another which further define a receiving area therebetween. The sidewall of the head portion includes a first abutment surface disposed on the lower portion of the sidewall. The holder assembly further includes a bracket having a first portion extending inwardly towards the receiving area, and a second portion extending downwardly from the first portion. The second portion of the bracket includes a second abutment surface disposed above the first abutment surface.

According to another aspect of the present disclosure, the first abutment surface is outwardly facing, and the second abutment surface is inwardly facing.

According to another aspect of the present disclosure, one or more bumper members are disposed on the first abutment surface, and one or more bumper members are disposed on the second abutment surface.

According to another aspect of the present disclosure, the rear portion of the stem of the holder assembly is removeably received in the receiving hub of the pedestal portion.

According to another aspect of the present disclosure, the holder assembly is removeably received in the storage cavity of the support base.

According to another aspect of the present disclosure, the receiving area disposed between the first and second arms of the holder assembly is positioned above the support base when the rear portion of the stem of the holder assembly is received in the receiving hub of the pedestal portion.

According to another aspect of the present disclosure, a detent feature is disposed within the pedestal portion and having a retractable detent member, wherein a distal end of the retractable detent member extends into the receiving hub and retracts from the receiving hub towards an interior portion of the pedestal portion.

According to another aspect of the present disclosure, the stem of the holder assembly includes a recess disposed on an upper surface thereof, and further wherein the distal end of the retractable detent member of the detent feature is received in the recess of the holder assembly when the rear portion of the stem of the holder assembly is received in the receiving hub.

According to another aspect of the present disclosure, a detent feature is disposed within the pedestal portion and having a retractable detent member, wherein a distal end of the retractable detent member extends into the storage cavity of the support base and retracts from the storage cavity of the support base towards an interior portion of the pedestal portion.

According to another aspect of the present disclosure, the stem of the holder assembly includes a recess disposed on an upper surface thereof, and further wherein the distal end of the retractable detent member of the detent feature is received in the recess of the holder assembly when the holder assembly is received in the storage cavity of the support base.

According to another aspect of the present disclosure, the stem of the holder assembly includes first and second recesses spaced-apart from one another.

According to another aspect of the present disclosure, a first detent feature is disposed within the pedestal portion and having a retractable detent member, wherein a distal end of the retractable detent member of the first detent feature is received in the second recess of the holder assembly when the holder assembly is received in the storage cavity of the support base.

According to another aspect of the present disclosure, a second detent feature is disposed above the first detent feature within the pedestal portion and having a retractable detent member, wherein a distal end of the retractable detent member of the second detent feature is received in the first recess of the holder assembly when the rear portion of the stem of the holder assembly is received in the receiving hub of the pedestal portion.

According to another aspect of the present disclosure, a magnetic member is disposed on the stem of the holder assembly, and a reciprocal magnetic member to the magnetic member of the holder assembly is positioned within the receiving hub of the pedestal portion, wherein the magnetic member and the reciprocal magnetic member are magnetically coupled when the rear portion of the stem of the holder assembly is received in the receiving hub of the pedestal portion.

According to another aspect of the present disclosure, at least one rail member is disposed on a sidewall of the receiving hub of the pedestal portion and inwardly extending into the receiving hub of the pedestal portion, and at least one inset channel is disposed on the rear portion of the stem, wherein the at least one rail member is received in the at least one inset channel of the stem when the rear portion of the stem of the holder assembly is received in the receiving hub of the pedestal portion.

Another aspect of the present disclosure includes a holder assembly for a coffee grinding apparatus having a stem with front and rear portions and a head portion disposed on the front portion of the stem. The head portion includes a sidewall with upper and lower portions. The sidewall is outwardly curved and includes a first abutment surface disposed on the lower portion of the sidewall and facing a first direction. A bracket having includes a first portion extending outwardly from the upper portion of the sidewall and a second portion extending downwardly from the first portion. The second portion of the bracket includes a second abutment surface disposed above the first abutment surface.

The second abutment surface is facing a second direction that is opposed to the first direction of the first abutment surface.

According to another aspect of the present disclosure, at least one bumper member is disposed on the first abutment surface.

According to another aspect of the present disclosure, at least one bumper member is disposed on the second abutment surface.

Another aspect of the present disclosure includes a holder assembly for a coffee grinding apparatus having a stem with front and rear portions and a bracket having a first portion extending outwardly from the front portion of the stem and a second portion extending downwardly from the first portion. The second portion of the bracket includes an inwardly facing abutment surface. A head portion is operably coupled to the stem and includes an upright sidewall with an outwardly facing abutment surface disposed on the sidewall.

According to another aspect of the present disclosure, the stem is comprised of a metal material, and the outwardly facing abutment surface of the head portion includes at least one bumper member disposed thereon.

One aspect of the present concept includes a coffee grinding apparatus having a support base. A pedestal portion extends upwardly from the support base. A motor housing is supported by the pedestal portion above the support base to define a receiving area therebetween. A holder assembly is configured to be removeably received in the receiving area. The holder assembly includes a first mounting hub having an upwardly extending hub body with an annular inner surface. A holder member includes an upper collar portion surrounding an aperture and a lower mounting portion, and the lower mounting portion of the holder member is rotatably coupled to the first mounting hub at the annular inner surface thereof. A second mounting hub is spaced-apart from the first mounting hub and includes an upwardly extending hub body with an annular inner surface. A brace member includes a pedestal portion disposed over a mounting post. The mounting post of the brace member is rotatably coupled to the second mounting hub at the annular inner surface thereof. The holder member is vertically adjustable relative to the first mounting hub, and the brace member is vertically adjustable relative to the second mounting hub.

According to another aspect of the present disclosure, the annular inner surface of the first mounting hub includes a threaded portion.

According to another aspect of the present disclosure, the lower mounting portion of the holder member includes a threaded portion that is complimentary to the threaded portion of the first mounting hub.

According to another aspect of the present disclosure, the annular inner surface of the second mounting hub includes a threaded portion.

According to another aspect of the present disclosure, the mounting post of the brace member includes a complimentary threaded portion to the threaded portion of the second mounting hub.

According to another aspect of the present disclosure, the holder member is threadingly engaged with the first mounting hub at the respective threaded portions, such that rotational movement of the holder member in a first direction lowers the upper collar portion, wherein rotational movement of the holder member in a second direction that is opposed to the first direction raises the upper collar portion.

According to another aspect of the present disclosure, the brace member is threadingly engaged with the second mounting hub at the respective threaded portions, such that rotational movement of the brace member in a first direction lowers the pedestal portion, wherein rotational movement of the brace member in a second direction that is opposed to the first direction raises the pedestal portion.

According to another aspect of the present disclosure, the pedestal portion includes an upper surface having an inwardly disposed notch.

Another aspect of the present concept includes a holder assembly having a first mounting hub with an annular inner surface surrounding a hollow interior portion. A second mounting hub includes an annular inner surface surrounding a hollow interior portion. The second mounting hub is spaced-apart from the first mounting hub. A holder member is operably coupled with the first mounting hub. The holder member includes a collar portion surrounding an open aperture and a mounting portion with an annular outer surface that is at least partially received in the hollow interior portion of the first mounting hub. A brace member includes a pedestal portion disposed over a mounting post. The mounting post of the brace member includes an annular outer surface at least partially received in the hollow interior portion of the second mounting hub.

According to another aspect of the present disclosure, the brace member is vertically adjustable relative to the second mounting hub.

According to another aspect of the present disclosure, the holder member is vertically adjustable relative to the first mounting hub.

According to another aspect of the present disclosure, the annular inner surface of the second mounting hub and the annular outer surface of the mounting post of the brace member include complimentary threaded portions that are threadingly engaged with one another.

According to another aspect of the present disclosure, the annular inner surface of the first mounting hub and the annular outer surface of the mounting portion of the holder member include complimentary threaded portions that are threadingly engaged with one another.

According to another aspect of the present disclosure, the collar portion includes a beveled inner surface surrounding the open aperture.

According to another aspect of the present disclosure, the pedestal portion includes a notch disposed on an upper surface thereof.

Another aspect of the present concept includes a holder assembly having a base plate with first and second mounting hubs spaced-apart from one another. A holder member is threadingly engaged with the first mounting hub and includes a collar portion and a mounting portion. The holder member is vertically adjustable relative to the first mounting hub. A brace member is threadingly engaged with the first mounting hub and includes a pedestal portion disposed over a mounting post. The holder member is vertically adjustable relative to the first mounting hub, and the brace member is vertically adjustable relative to the second mounting hub.

According to another aspect of the present disclosure, the collar portion of the holder member surrounds a hollow interior portion, and further wherein the collar portion includes an inner surface disposed at an angle, such that the inner surface of the collar portion tapers inwardly towards the hollow interior portion from an upper portion of the inner surface to a lower portion of the inner surface.

According to another aspect of the present disclosure, the second mounting hub includes a hollow interior portion in which the mounting post of the brace member is at least partially received.

According to another aspect of the present disclosure, the pedestal portion of the brace member includes an upper surface having a notch disposed thereon.

According to another aspect of the present disclosure, the first and second mounting hubs upwardly extend from the base plate.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A holder assembly, comprising:
   a first mounting hub and a second mounting hub, wherein the second mounting hub is spaced-apart from the first mounting hub;
   a holder member operably coupled with the first mounting hub, wherein the holder member includes a collar portion surrounding an open aperture and a mounting portion that is at least partially received in a hollow interior portion of the first mounting hub; and
   a brace member having a pedestal portion disposed over a mounting post, wherein the mounting post of the brace member is at least partially received in a hollow interior portion of the second mounting hub, and further wherein the pedestal portion includes a notch disposed on an upper surface thereof.

2. The holder assembly of claim 1, wherein the holder member is vertically adjustable relative to the first mounting hub, and further wherein the brace member is vertically adjustable relative to the second mounting hub.

3. The holder assembly of claim 2, wherein the first mounting hub and the second mounting hub include annular inner surfaces, and further wherein the mounting portion and the mounting post include annular outer surfaces.

4. The holder assembly of claim 3, wherein the annular inner surface of the second mounting hub and the annular outer surface of the mounting post of the brace member include complimentary threaded portions that are threadingly engaged with one another.

5. The holder assembly of claim 3, wherein the annular inner surface of the first mounting hub and the annular outer surface of the mounting portion of the holder member include complimentary threaded portions that are threadingly engaged with one another.

6. The holder assembly of claim 1, wherein the collar portion includes a beveled inner surface surrounding the open aperture.

7. A holder assembly, comprising:
   a base plate having first and second mounting hubs spaced-apart from one another;
   a holder member threadingly engaged with the first mounting hub and having a collar portion and a mounting portion, wherein the holder member is vertically adjustable relative to the first mounting hub, and further wherein the collar portion of the holder member surrounds a hollow interior portion, and further wherein the collar portion includes an inner surface disposed at an angle, such that the inner surface of the collar portion tapers inwardly towards the hollow interior portion from an upper portion of the inner surface to a lower portion of the inner surface; and
   a brace member threadingly engaged with the second mounting hub and having a pedestal portion disposed over a mounting post, wherein the brace member is vertically adjustable relative to the second mounting hub.

8. The holder assembly of claim 7, wherein the second mounting hub includes a hollow interior portion in which the mounting post of the brace member is at least partially received.

9. The holder assembly of claim 7, wherein the pedestal portion of the brace member includes an upper surface having a notch disposed thereon.

10. The holder assembly of claim 7, wherein the first and second mounting hubs upwardly extend from the base plate.

* * * * *